United States Patent
Kimura et al.

(10) Patent No.: US 7,327,663 B2
(45) Date of Patent: Feb. 5, 2008

(54) RECORDING REPRODUCING OPTICAL SYSTEM, OBJECTIVE LENS, AND ABERRATION CORRECTING OPTICAL ELEMENT

(75) Inventors: Tohru Kimura, Tokyo (JP); Norikazu Arai, Tokyo (JP)

(73) Assignee: Konica Corporation, Tokyo (JP)

( * ) Notice: Subject to any disclaimer, the term of this patent is extended or adjusted under 35 U.S.C. 154(b) by 730 days.

(21) Appl. No.: 10/420,911

(22) Filed: Apr. 23, 2003

(65) Prior Publication Data

US 2003/0202451 A1    Oct. 30, 2003

(30) Foreign Application Priority Data

Apr. 26, 2002   (JP)   .............................. 2002-125269
Apr. 17, 2003   (JP)   .............................. 2003-112827

(51) Int. Cl.
  *G11B 7/00*   (2006.01)
(52) U.S. Cl. .............................. 369/112.08; 369/112.23
(58) Field of Classification Search ...................... None
   See application file for complete search history.

(56) References Cited

U.S. PATENT DOCUMENTS

| | | | |
|---|---|---|---|
| 5,629,799 A | 5/1997 | Maruyama et al. | |
| 6,191,889 B1 | 2/2001 | Maruyama | |
| 6,876,501 B2 * | 4/2005 | Kimura et al. | 359/719 |
| 2004/0036972 A1 * | 2/2004 | Kimura et al. | 359/570 |

FOREIGN PATENT DOCUMENTS

| | | |
|---|---|---|
| EP | 1 022 731 A2 | 7/2000 |
| EP | 1 067 530 A2 | 1/2001 |
| EP | 1 081 692 A2 | 3/2001 |
| EP | 1 154 417 A2 | 11/2001 |
| EP | 1 199 717 A2 | 4/2002 |
| EP | 1 202 260 A2 | 5/2002 |
| EP | 1 304 689 A2 | 4/2003 |
| EP | 1 329 881 A2 | 7/2003 |

OTHER PUBLICATIONS

European Search Report dated Oct. 17, 2006.

* cited by examiner

*Primary Examiner*—Thang V. Tran
*Assistant Examiner*—Lixi Chow
(74) *Attorney, Agent, or Firm*—Finnegan, Henderson, Farbow, Garrett & Dunner, L.L.P.

(57) ABSTRACT

A recording reproducing optical system for an optical information recording medium is provided with a light source; an objective lens; and an aberration correcting optical element provided on an optical path between the light source and the objective lens. The objective lens includes an aspherical surface and one diffractive surface on which a diffractive structure structured by a plurality of concentric ring-shaped zonal steps is formed and the objective lens is a plastic lens structured in one element in one group. The aberration correcting optical element comprises at least one plastic lens on which a diffractive structure structured by a plurality of concentric ring-shaped zonal steps is formed. The following formulas are satisfied: PD1>0 (PD1 is a diffractive power ($mm^{-1}$)), PD2<0 (PD2 is a diffractive power ($mm^{-1}$)) and PR2>0 (PR2 is a refractive power ($mm^{-1}$) as a refractive lens).

56 Claims, 37 Drawing Sheets

SPHERICAL ABERRATION

LONGITUDINAL CHROMATIC ABERRATION

SPHERICAL ABERRATION

LONGITUDINAL CHROMATIC ABERRATION

SPHERICAL ABERRATION
LONGITUDINAL CHROMATIC ABERRATION

LONGITUDINAL CHROMATIC ABERRATION

RECORDING REPRODUCING OPTICAL SYSTEM, OBJECTIVE LENS, AND ABERRATION CORRECTING OPTICAL ELEMENT

BACKGROUND OF THE INVENTION

The present invention relates to a recording reproducing optical system by which at least one of recording and reproducing of the information is conducted onto an optical information recording medium, objective lens, aberration correcting optical element, optical pick-up apparatus and recording reproducing apparatus.

Recently, the investigation and development of a new high density optical disk system in which a blue violet semiconductor laser light source of about 400 nm wavelength, and an objective lens whose numerical aperture (NA) is heightened to about 0.85, are used, is advanced. As an one example, in an optical disk of NA 0.85 and using wavelength 400 nm (hereinafter, in the present specification, called "high density DVD"), in the same dimension as the DVD (NA 0.6, using wavelength 650 nm, storage capacity 4.7 GB), the information of 20-30 CB can be recorded.

As a high NA objective lens appropriate for the high density DVD system, the objective lens of two lenses in two groups composition disclosed in Japanese Tokkaihei No. 10-123410 is publicly known. This objective lens is a lens in which, by dividing the refractive force of the optical surface to the ray of light of the high NA into 4 surfaces, the production error sensitivity of each lens is decreased, however, there is a problem that the production cost is increased by the amount in which a process is necessary by which each lens is assembled. From the view point of the production cost, also in such a high density DVD system, as in the CD system or DVD system, it is desired that the objective lens is structured by one lens in one group composition. Then, for the more cost reduction, it is more desirable that the objective lens for the high density DVD system is a plastic lens.

As the plastic objective lens appropriate for the high density DVD system, one of inventors of the present invention proposed, together with another inventor, an objective lens as described in Japanese Tokkai No. 2001-324673. However, in the plastic lens of NA of about 0.85, when the environmental temperature changes, the change of the wave front aberration which is generated due to the change of the refractive index of the plastic is large, it is a problem in the practical use. In FIG. 1, as an example, the situation of the wave front aberration change of the plastic lens of one lens in one group composition whose NA is 0.85, focal distance is 2.2 mm, and designed reference wavelength is 405 nm to the temperature change, is shown. From FIG. 1, in the plastic lens of NA of 0.85, because the wave front aberration exceeds the Marechal's criterion at the temperature change of ±15° C., it can not be used for the objective lens of the optical disk player in the state as it is.

Accordingly, in the case where high NA plastic objective lens is used in the optical disk player, it is necessary that, by any means, the change of the wave front aberration is corrected. One of the present inventors proposes, as an optical pick-up apparatus for correcting the change of the wave front aberration due to the temperature change of the high NA plastic objective lens, the optical pick-up apparatus as described in Japanese Tokkai No. 2002-08228.

However, in this optical pick-up apparatus, because it is necessary that the aberration correction means for correcting the change of the wave front aberration is operated while the change of the wave front aberration due to the temperature change is dynamically detected by an optical detector, by an amount in which the means for dynamically detecting the change of the wave front aberration due to the temperature change, and the means for operating an aberration correcting means corresponding to the detection result are necessary, the production cost of the optical pick-up apparatus is increased.

SUMMARY OF THE INVENTION

In view of the above conditions, the present invention is attained, and an object of the present invention is, in a recording reproducing optical system of the optical disk which uses a plastic objective lens of the high NA one lens in one group composition, to provide the recording reproducing optical system which can compensate the change of the wave front aberration due to the temperature change of the objective lens. Particularly, the object of the present invention is to provide the recording reproducing optical system in which it is not necessary that the change of the wave front aberration due to the temperature change of the objective lens is dynamically detected, and which can be produced at low cost.

Further, the object of the present invention is to provide an optical pick-up apparatus of the optical disk on which this recording reproducing optical system is mounted, and a recording reproducing-apparatus of the optical disk on which this optical pick-up apparatus is mounted.

Further, the object of the present invention is also to provide an objective lens and an aberration correcting optical element which are appropriate for the recording reproducing optical system which can compensate the change of the wave front aberration due to the temperature change of the plastic objective lens of the high NA one lens in one group composition.

In order to attain the above-described objects, the first recording reproducing optical system according to the present invention is characterized in that: in a recording reproducing optical system which conducts the recording of the information and/or reproducing of the information, onto an optical information recording medium, including a light source, an objective lens which converges the light flux emitted from the light source onto the information recording surface of the optical information recording medium, and an aberration correcting optical element located in an optical path between the light source and the objective lens, the objective lens is a plastic lens of one lens in one group composition having at least one surface of the aspheric surface, and at least one diffractive surface on which a diffractive structure formed of a plurality of concentric ring-shaped zone step differences is formed; and the aberration correcting optical system has at least one plastic lens in which the diffractive structure formed of a plurality of concentric ring-shaped zone step differences is formed on at least one surface, and satisfies the following expressions (1), (2) and (3).

$$PD1 > 0 \quad (1)$$

$$PD2 < 0 \quad (2)$$

$$PR2 > 0 \quad (3)$$

Where, PD1: when the optical difference $\Phi_{bi}$ (mm) which is added to the wavefront through which the light transmits the diffractive structure formed on the i-th surface of the objective lens, is expressed as a function of the height hi (mm) from the optical axis, by the optical path difference function defined by $\Phi_{bi}=ni\cdot(b_{2i}\cdot hi^2+b_{4i}\cdot hi^4+b_{6i}\cdot hi^6+\ldots)$ (A)

(herein, ni is the diffraction order of the diffracted light having the maximum diffracted-light amount of the diffracted rays generated in the diffractive structure formed on the i-th surface, and $b_{2i}$, $b_{4i}$, $b_{6i}$, ... are optical path difference function coefficients of respective 2nd order, fourth order, sixth order, ..., (it is called also diffractive surface coefficient)), PD1 is the diffracting power (mm$^{-1}$) as the diffractive lens defined by PD1=$\Sigma(-2\cdot b_{2i}\cdot ni)$, PD2: when the optical path difference $\Phi_{bj}$ (mm) added to the wavefront through which the light transmits the diffractive structure formed on the j-th surface of the plastic lens of the aberration correcting optical element is expressed by the optical path difference function defined by $\Phi_{bi}=nj\cdot(b_{2j}\cdot hj^2+b_{4j}\cdot hj^4+b_{6j}\cdot hj^6+\ldots)$ (B)

as a function of the height hj (mm) from the optical axis, (herein, nj is the diffraction order of the diffracted light having the maximum diffracted-light amount of the diffracted rays generated in the diffractive structure formed on the j-th surface, and $b_{2j}$, $b_{4j}$, $b_{6j}$, ... are optical path difference function coefficients of respective 2nd order, fourth order, sixth order, ..., (it is called also diffractive surface coefficient)), PD2 is the diffracting power (mm$^{-1}$) as the diffractive lens defined by PD2=$\Sigma(-2\cdot b_{2j}\cdot nj)$, and PR2: PR2 is the refracting power (mm$^{-1}$) as the refractive lens of the plastic lens of the aberration correcting optical element.

As well known, in the plastic lens, because the refractive index changes to the direction in which it becomes small due to the temperature rise, when the plastic lens is structured by one lens in one group, the spherical aberration changes to the over correction direction due to the temperature rise. The first recording reproducing optical system according to the present invention is, to cancel the change of the spherical aberration due to the change of the temperature, provided with an aberration correcting optical element having the plastic lens having a positive refracting power which is located in the optical path between the light source and an objective lens which is one lens in one group composition plastic lens and which satisfies expression (3).

Because the refracting force of the plastic lens becomes small due to the temperature rise, the inclination angle of the upper marginal ray of the light flux emitted from the aberration correcting optical element changes, when the plastic lens included in the aberration correcting optical element satisfies the expression (3), to the direction in which the lateral magnification of the objective lens decreases. When the lateral magnification of the objective lens is decreased, because the spherical aberration in the under correction direction is generated, the spherical aberration of the objective lens changed to the over correction direction due to the refractive index change can be cancelled.

However, as shown in FIG. 1, in the high NA plastic lens, because the changed amount of the spherical aberration due to the temperature change is large, there is a possibility that the change of the spherical aberration due to the temperature change can not be cancelled, and it remains. Accordingly, the diffractive structure formed of a plurality of the concentric ring-shaped zone step differences is formed on at least one surface of the plastic lens of the aberration correcting optical element, and its diffracting power is made to satisfy the expression (2). Thereby, the changed amount of the inclination angle of the upper marginal ray of the light flux emitted from the aberration correcting optical element can be arbitrarily selected. As the result, even when the high NA plastic objective lens in which the changed amount of the spherical aberration due to the temperature change is large is used, while the total power of the plastic lens of the aberration correcting optical element is maintained constant, when the absolute value of the ratio of the diffracting power to the total power is set large, because the desired refractive power can be obtained, the change of the spherical aberration of the objective lens due to the temperature change can be finely cancelled.

In this connection, when the aberration correcting optical element has a plurality of plastic lenses, the PR2 in the expression (3) is a total sum of the refracting power of all plastic lenses included in the aberration correcting optical element, and the aberration correcting optical element is structured in such a manner that at least one plastic lens of the plastic lenses included in the aberration correcting optical element has at least one diffractive surface. In this case, the PD2 in the expression (2) is a total sum of the diffracting powers of all diffractive surfaces formed on the plastic lens included in the aberration correcting optical element.

Hereupon, when the short wavelength light source such as the blue violet semiconductor laser is used, the longitudinal chromatic aberration generated in the optical system is a problem. Although it is considered that the laser light emitted from the semiconductor laser is generally a single wavelength (single mode) and the longitudinal chromatic aberration is not generated, in practice, there is a case where the mode hopping in which the central wavelength is hopped instantly by several nms, occurs due to the temperature change or output change. Although the change of the wavelength by the mode hopping is several nms which is very small, when the blue violet semiconductor laser whose wavelength is about 400 nm and short, is used, even when it is a very small change of the wavelength by the mode hopping, the longitudinal chromatic aberration generated in the objective lens is a large amount. This is, in the wavelength range of 400 nm, for the reason that the dispersion of the optical material becomes very large. Accordingly, when the blue violet semiconductor laser is used for the light source, it is necessary that the longitudinal chromatic aberration of the optical system is corrected.

However, because the diffracting power of the plastic lens of the aberration correcting optical element satisfies the expression (2), the longitudinal chromatic aberration generated in the aberration correcting optical element is larger than the case where the plastic lens of the aberration correcting optical element is not a diffractive lens. Accordingly, in the case where the short wavelength light source such as the blue violet semiconductor laser is used, when the mode hopping occurs, the fine light converging performance can not be maintained.

Accordingly, the diffractive structure formed of a plurality of concentric ring-shaped zone step differences is formed on at least one surface of the objective lens, and it is made in such a manner that its diffracting power satisfies the expression (1). Thereby, because the longitudinal chromatic aberration which is increased by the diffractive structure of the plastic lens of the aberration correcting optical element can be cancelled, the light flux which transmits the aberration correcting optical element and objective lens, and is converged on the information recording surface of the optical information recording medium is in the condition in which the longitudinal chromatic aberration is always suppressed small.

Further, when the diffracting power of the objective lens satisfies the expression (1), because the refracting power as the refractive lens of the objective lens is more decreased by an mount of the diffracting power than in the case where the diffractive structure is not formed on the objective lens, the changed amount of the spherical aberration of the objective lens by the refractive index change at the time of the temperature change is decreased. Accordingly, because it is enough that the refracting power of the plastic lens of the aberration correcting optical element is small, the plastic lens of the aberration correcting optical element can be easily produced.

That is, according to the first recording reproducing optical system according to the present invention, the light flux which transmits the aberration correcting optical element and objective lens, and is converged on the information recording surface of the optical information recording medium is, even when the temperature changes, in the condition that the spherical aberration is suppressed small, and even when the semiconductor laser light source causes the mode hopping, because it is in the condition that the longitudinal chromatic aberration is suppressed small, the good light converging performance can be always maintained. Particularly, because it is not necessary that the change of the wavefront aberration of the objective lens due to the temperature change is dynamically detected as in the optical pick-up apparatus described in Japanese Tokkai No. 2002-082280, the optical pick-up apparatus on which the first recording reproducing optical system according to the present invention is mounted, can be produced at low cost.

In the first recording reproducing optical system, it is preferable that the light source generates the ray of the wavelength not larger than 500 nm, and for the objective lens, the numerical aperture on the optical information recording medium side is not smaller than 0.75, and more preferably, the numerical aperture on the optical information recording medium side is not smaller than 0.80.

Further, in the first recording reproducing optical system, it is preferable that the objective lens has the wavelength characteristic satisfying the following expression (4).

$$f2<f0<f1 \quad (4)$$

Where, f0: a focal distance (mm) of the overall objective lens system in the wavelength of the ray generated by the light source, f1: a focal distance (mm) of the overall objective lens system in the wavelength which is shorter by a predetermined wavelength difference than the wavelength of the ray generated by the light source, f2: a focal distance (mm) of the overall objective lens system in the wavelength which is longer by a predetermined wavelength difference than the wavelength of the ray generated by the light source.

The above expression (4) means that, when the wavelength of the ray incident on the objective lens is decreased by a predetermined wavelength difference by the action of the diffractive structure, it changes to the direction in which the back focus of the objective lens is increased, and when the wavelength of the ray incident on the objective lens is increased by a predetermined wavelength difference, it changes to the direction in which the back focus of the objective lens is decreased. Thereby, the change of the spherical aberration of the objective lens by the temperature change can be finely cancelled by the action of the aberration correcting optical element, and the longitudinal chromatic aberration of the light flux which transmits the aberration correcting optical element and objective lens and which is converged on the information recording surface of the optical information recording medium, can be suppressed small.

In the recording reproducing optical system in which the recording of the information and/or the reproduction of the information is conducted onto the optical information recording medium including at least 2 kinds of light sources whose wavelength is different, and the objective lens by which the light flux of at least 2 different wavelength emitted from the light sources is converged on the information recording surface of at least 2 kinds of optical information recording media whose thickness of the protective layer to protect the information recording surface is different, the second recording reproducing optical system according to the present invention is characterized in that: the recording reproducing optical system has an aberration correcting optical system element placed in the optical path between the light source which generates the light flux of the shortest wavelength of the light flux of at least 2 different wavelength, and the objective lens; the objective lens is a plastic lens of one lens in one group composition having at least one diffractive surface whose at least one surface is an aspheric surface and on which a plurality of concentric ring-shaped zone step differences are formed; the diffracted light of the light flux of at least 2 different wavelength has the wavelength characteristic so as to form a good wavefront on the information recording surface of the respective optical information recording media in a predetermined numerical aperture on the optical information recording medium side necessary to conduct the recording of the information and/or reproducing of the information onto at least 2 kinds of optical information recording media; and the aberration correcting optical element has at least one plastic lens on whose at lest one surface the diffractive structure formed of a plurality of concentric ring-shaped zone step differences is formed, and satisfies the following expressions (5), (6) and (7).

$$PD1>0 \quad (5)$$

$$PD2<0 \quad (6)$$

$$PR2>0 \quad (7)$$

Where, PD1: when the optical path difference $\Phi_{bi}$ (mm) which is added to the wavefront which transmits the diffractive structure formed on the i-th surface of the objective lens, is expressed as a function of the height hi (mm) from the optical axis, by the optical path difference function defined by $\Phi_{bi}=ni\cdot(b_{2i}\cdot hi^2+b_{4i}\cdot hi^4+b_{6i}\cdot hi^6+\ldots)$, (herein, ni is the diffraction order of the diffracted light having the maximum diffracted-light amount of the diffracted light generated in the diffractive structure formed on the i-th surface, and $b_{2i}$, $b_{4i}$, $b_{6i}$, ... are optical path difference function coefficients of respective 2nd order, fourth order, sixth order, ... , (it is called also diffractive surface coefficient)), PD1 is the diffracting power (mm$^{-1}$) as the diffractive lens defined by PD1=$\Sigma(-2\cdot b_{2i}\cdot ni)$, PD2: when the optical path difference $\Phi_{bj}$ (mm) added to the wavefront which transmits the diffractive structure formed on the j-th surface of the plastic lens of the aberration correcting optical element is expressed by the optical path difference function defined by $\Phi_{bj}=nj\cdot(b_{2j}\cdot hj^2+b_{4j}\cdot hj^4+b_{6j}\cdot hj^6+\ldots)$ as a function of the height hj (mm) from the optical axis, (herein, nj is the diffraction order of the diffracted light having the maximum diffracted-light amount of the diffracted light generated in the diffractive structure formed on the j-th surface, and $b_{2j}$, $b_{4j}$, $b_{6j}$, ... are optical path difference function coefficients of respective 2nd order, fourth order, sixth order, . . . , (it is called also diffractive surface coefficient)), PD2 is the diffracting power (mm$^{-1}$) as the diffractive lens defined by PD2=$\Sigma(-2\cdot b_{2j}\cdot nj)$, and PR2: the refracting power (mm$^{-1}$) as the refractive lens of the plastic lens of the aberration correcting optical element.

That is, the second recording reproducing optical system is characterized in that: in the recording reproducing optical system by which the recording reproducing of the information can be conducted onto a plurality of kinds of optical information recording media whose thickness of the protective layer is different, by one objective lens, when the plurality of rays whose wavelength is respectively different are converged onto respective information recording surfaces of the optical information recording media whose thickness of the protective layers is different, an aberration correcting optical element is arranged in the optical path between the light source which generates the ray of the shortest wavelength of the wavelength, and the objective lens.

When the diffractive structure formed on the objective lens has the wavelength characteristic in which the diffracted light of the light flux of the short wavelength forms the good wavefront to the optical information recording medium whose protective layer is thin, and the diffracted light of the light flux of long wavelength forms the good wavefront to the optical information recording medium whose protective layer is thick, to a plurality of kinds of optical information recording media whose thickness of the protective layers is different, when the wavelength of ray used for conducting the recording reproducing of the information is selectively selected, because the ray of respective wavelength can be converged onto respective information recording surfaces, the recording reproducing of the information can be conducted onto the plurality of kinds of the optical information recording media whose thickness of the protective layers is different, by a single objective lens.

Further, when the diffractive structure is determined so that the ray of the wavelength not longer than 500 nm is converged so as to be in the diffraction limit in the numerical aperture not smaller than 0.75 to the optical information recording medium whose protective layer is thinnest of the plurality of kinds of optical information recording media whose thickness of the protective layers is different, the high density DVD, DVD and/or CD can be compatibly recorded and reproduced by a single objective lens.

More preferably, the ray of the wavelength not longer than 500 nm is converged so as to be within the diffraction limit in the numerical aperture not smaller than 0.80 to the optical information recording medium whose protective layer is thinnest of the plurality of kinds of optical information recording media whose thickness of the protective layers is different.

In this case, as the light beam for the recording reproducing, it is preferable that, in the high density DVD, the high order diffracted ray not lower than 2nd order is used, and in the DVD and/or CD, the diffracted light of lower order than that, is used. Thereby, the high diffraction efficiency can be obtained to the light of respective wavelength ranges of a wavelength range of the high density DVD of the wavelength 400 nm, the wavelength range of the DVD of the wavelength 650 nm, and/or the wavelength range of the CD of the wavelength 780 nm. For example, in the case of the objective lens compatible to the high density DVD and DVD, it is preferable that, in the high density DVD, the second order diffracted ray, in the DVD, the first order diffracted ray, or in the high density DVD, the third order diffracted ray, in the DVD, the second order diffracted ray is used. Further, it is preferable that, in the case of the objective lens compatible to the high density DVD, DVD and CD, in the high density DVD, the second order diffracted ray, in the DVD, the first order diffracted ray, in the CD, the first order diffracted ray, or in the high density DVD, the 6-th order diffracted ray, in the DVD, the fourth-order diffracted ray, in the CD, the third order diffracted ray is used.

Then, this objective lens is a plastic lens of one lens in one group composition, and the diffractive structure formed on the objective lens has the diffracting power to satisfy the expression (5).

Further, the aberration correcting optical element has at least one plastic lens, and the refracting power of the plastic lens satisfies the expression (7). Further, the diffractive structure is formed on at least one surface of this plastic lens, and the diffracting power satisfies the expression (6).

That is, in the second recording reproducing optical system according to the present invention, in the case where the recording reproducing of the information is conducted onto the high density DVD, by the same effect as the first recording reproducing optical system, the light flux whose wavelength is shortest, converged on the information recording surface of the optical information recording medium which transmits the aberration correcting optical element and objective lens is, even when the temperature changes, in the condition that the spherical aberration is suppressed small, and even when the semiconductor laser light source causes mode hopping, because it is in the condition that the longitudinal chromatic aberration is suppressed small, the good light converging performance can be maintained always to the high density DVD, and the recording reproducing of the information can be stably conducted onto the high density DVD.

In the above-described second recording reproducing optical system, it is preferable that the objective lens has the wavelength characteristic to satisfy the following expression (8).

$$f2 < f0 < f1 \tag{8}$$

Where, f0: a focal distance (mm) of the overall objective lens system in the shortest wavelength in the light flux of at least 2 different wavelength, f1: a focal distance (mm) of the overall objective lens system in the wavelength which is shorter by a predetermined wavelength difference than the shortest wavelength, in the light flux of at least 2 different wavelength, f2: a focal distance (mm) of the overall objective lens system in the wavelength which is longer by a predetermined wavelength difference than the shortest wavelength, in the light flux of at least 2 different wavelength.

The above expression (8) means that, by the action of the diffractive structure, when the wavelength of the ray of the shortest wavelength is decreased by a predetermined wavelength difference, it changes to the direction in which the back focus of the objective lens is increased, and when the wavelength of the ray of the shortest wavelength is increased by a predetermined wavelength difference, it changes to the direction in which the back focus of the objective lens is decreased. Thereby, at the time of the recording reproducing of the information onto the high density DVD, the change of the spherical aberration of the objective lens by the temperature change can be finely cancelled by the action of the aberration correcting optical element, and the longitudinal chromatic aberration of the light flux which transmits the aberration correcting optical element and objective lens and which is converged on the information recording surface of the optical information recording medium, can be suppressed small.

In the above first and second recording reproducing optical system, in order to have the wavelength characteristic for the objective lens to satisfy the expression (4) or (8), when the diffractive structure is determined so that the diffracting power of the objective lens satisfies the following expression (9), it is right.

$$0.05 < PD1/PT1 < 0.7 \tag{9}$$

PT1: power of the objective lens overall system (mm$^{-1}$)

In not lower than the lower limit of the above expression (9), to the power of the objective lens overall system, because the diffracting power is not too insufficient, the longitudinal chromatic aberration when the aberration correcting optical element to satisfy the expression (2) or (6) and the objective lens are combined, is not under correction. Further, in not higher than the upper limit of the expression (9), to the power of the objective lens overall system, because the diffracting power is not too sufficient, the longitudinal chromatic aberration when the aberration correcting optical element to satisfy the expression (2) or (6) and the objective lens are combined, is not over correction.

In the recording reproducing optical system according to the present invention, when, in the maximum numerical aperture on the optical information recording medium side, the ring-shaped zone interval in the direction vertical to the optical axis of the diffractive surface is Pf (mm), and the ring-shaped zone interval in the direction vertical to the optical axis of the diffractive surface in a half numerical aperture of the maximum numerical aperture, is Ph (mm), it is preferable that at least one diffractive surface in the diffractive surfaces of the objective lens satisfies the following expression (11).

$$0 < |(Ph/Pf) - 2| < 10 \tag{11}$$

The above expression (11) is a condition so that, when the wavelength of the ray incident on the objective lens is changed, the changed amount of the spherical aberration is a desired value. In the objective lens of the recording reproducing optical system according to the present invention, when the wavelength of the ray incident on the objective lens is changed, it is preferable that the diffractive structure is determined so that it satisfies any one of the following.

The first is a case where, even when the wavelength of the ray incident on the objective lens is changed, the spherical aberration of the objective lens scarcely changes. Thereby, because the light source whose oscillation wavelength is dislocated by the production error, can be used, it is not necessary that the light source is selected, and by that amount, the recording reproducing optical system can be produced at low cost.

The second is a case where, when the wavelength of the ray incident on the objective lens is increased, the spherical aberration of the objective lens is changed to the under correction direction. In the semiconductor laser light source, the oscillation mode of the ray is changed due to the temperature rise, and the oscillation wavelength is changed to the long wavelength side. On the one hand, in the plastic lens of one lens in one group composition, because the refractive index of the plastic is decreased due to the temperature rise, the spherical aberration is changed to the over correction direction. That is, by the diffractive action, in the case where the wavelength of the ray incident on the objective lens is increased, when the spherical aberration of the objective lens is made to change in the under correction direction, the change of the spherical aberration due to the wavelength change at the time of the temperature change, and the change of the spherical aberration due to the refractive index change can be cancelled. Accordingly, because the changed amount of the spherical aberration of the objective lens single body due to the temperature change can be decreased, it is satisfied that the diffracting power of the aberration correcting optical element and/or the refracting power are small. As the result, the aberration correcting optical element is easily produced.

In the recording reproducing optical system according to the present invention, when the thickness of the lens on the optical axis of the objective lens is d (mm), focal distance is f (mm), it is preferable that they satisfy the following expression (12).

$$0.8 \leq d/f \leq 2.4 \tag{12}$$

The above expression (12) is a condition to obtain the sufficient edge thickness, working distance, and good image height characteristic, in the high NA plastic objective lens of one lens in one group composition.

In an area of not lower than the lower limit of the expression (12), because the edge thickness it not too small, the molding is easily conducted. Further, because a prospective angle (angle formed between the normal line of the aspheric surface and the optical axis) at the maximum effective diameter position of the aspheric surface of the light flux incident surface is not too large, the metallic molding can be accurately conducted. In an are not smaller than the upper limit of the expression (12), because the generation of the astigmatism component of the wave front aberration is not large when the slanting light flux is incident on the objective lens, the objective lens of the good image height characteristic is obtained. Further, because the lens thickness on the optical axis is not too large, the objective lens can be of light weight, and further, the working distance can be sufficiently secured. In this connection, when the objective lens is a compatible objective lens to a plurality of kinds of the optical information recording medium whose thickness of the protective layers is different, "f" in the expression (12) is the focal distance of the objective lens overall system in the shortest wavelength.

In the recording reproducing optical system according to the present invention, it is preferable that the lateral magnification M of the objective lens single body satisfies the expression (10). More preferably, the lateral magnification M of the objective lens single body satisfies the expression (13).

$$0 < M < 1 \tag{10}$$

$$0 < M < 0.25 \tag{13}$$

When, in the objective lens, when the aberration correction is conducted so that the aberration is the minimum to the convergent light flux from the imaginary object point, the change of the spherical aberration due to the temperature change can be more reduced than the case where the aberration correction is conducted so that the aberration is the minimum to the parallel light flux from the object point at infinity. Thereby, because the burden of the aberration correcting optical element when the change of the spherical aberration of the objective lens is cancelled, is reduced, it is enough that the diffracting power of the aberration correcting optical element and/or the refracting power are small. As the result, the aberration correcting optical element can be easily produced.

In this connection, in the case where the objective lens is a compatible objective lens to a plurality of kinds of optical information recording media whose thickness of the protective layers are different, M in the expression (10) is the lateral magnification of the objective lens single body when the recording reproducing of the information is conducted onto the optical information recording medium whose thickness of the protective layer is thinnest. In this case, the lateral magnification of the objective lens single body when the recording reproducing of the information is conducted onto the optical information recording medium whose thickness of the protective layer is thinnest, and the lateral magnification of the objective lens single body when the recording reproducing of the information is conducted onto the optical information recording medium whose thickness of the protective layer is thick may be the same or different.

Further, when the lateral magnification of the objective lens single body satisfies the expression (10), it is preferable that the recording reproducing optical system according to the present invention has a coupling lens to convert the divergent light flux from the light source into the convergent light flux in the optical path between the light source and objective lens. This coupling lens may be the same optical element as the aberration correcting optical element, or respectively separated optical elements, however, from a viewpoint of the reduction of the number of parts and cost reduction of the recording reproducing optical system, it is preferable that it is the same optical element. Then, it is preferable that the convergent light flux through the coupling lens is converged onto one point within the diffraction limit.

In the recording reproducing system according to the present invention, the compensation of the change of the spherical aberration of the objective lens due to the temperature change and compensation of the longitudinal chromatic aberration of the optical system are stood together, the interval (hereinafter, in the present specification, called "ring-shaped zone pitch") in the direction vertical to the optical axis of the adjoining diffraction ring-shaped zones of the objective lens is about several μms. When the ring-shaped zone pitch is small, because the influence on the lowering of the diffraction efficiency by the production error of the diffraction ring-shaped zone shape is large, there is a possibility that a sufficient ray using efficiency can not be obtained. Further, when the ring-shaped zone pitch is not higher than about 10 times of the wavelength, the influence on the diffraction efficiency in the polarizing direction of the light incident on the diffractive structure can not be neglected, and the theoretical value of the diffraction efficiency becomes a value lower than 100%. Therefore, in order to soften the ring-shaped zone pitch of the objective lens, it is preferable that, when the ring-shaped zone-like diffractive structure is formed on both surfaces of the objective lens and the both surfaces of the objective lens are made the diffractive surface and the diffracting power is distributed to 2 diffractive surfaces, the ring-shaped zone pitch per one diffractive surface is softened.

Further, in order to soften the ring-shaped zone pitch of the objective lens, it may be allowed that, in the diffracted light generated in the diffractive structure of the objective lens, the higher order diffracted ray than 2nd order is made to have the maximum diffracted-light amount, and this higher order diffracted ray is used as the ray beam for the recording reproducing of the optical information recording medium. For example, when the 2nd order diffracted ray is used as the ray beam for the recording reproducing, the ring-shaped zone pitch can be made 2 times comparing to the case where the first order diffracted ray is used. When both surfaces of the objective lens are made the diffractive surfaces, the diffractive structure of either one of the diffractive surfaces may be determined so that the higher order diffracted ray than 2nd order has the maximum diffracted light, however, it is preferable that the diffractive surfaces may be determined, on both diffractive surfaces, so that the high order diffracted ray has the maximum diffracted-light amount.

In the present specification, the phrase that the diffractive structure is determined so that the higher order diffracted ray than 2nd order has the maximum diffracted-light amount, is the same meaning as the relational expression $d=m\lambda/(N\lambda-1)$ is realized among the step difference amount d (mm) in the direction parallel to the optical axis of the diffraction ring-shaped zone in the vicinity of the optical axis, integer m more than 2, the wavelength $\lambda$ (mm) of the ray to conduct the recording reproducing of the information onto the optical information recording medium (when the recording reproducing optical system is compatible to a plurality of kinds of the optical information recording media whose thickness of the protective layers are different, it is the wavelength of the ray to conduct the recording reproducing of the information onto the optical information recording medium whose thickness of the protective layer is thinnest), and the refractive index $N\lambda$ of the objective lens at the wavelength $\lambda$.

Further, the diffractive structure formed on the surfaces of the objective lens has a saw-toothed-shape blazed structure, and it is preferable that the blazed structure is produced by using the electronic beam painting technology, or by the molding by the molding die produced by using the electronic beam painting technology.

As the technology to produce the fine blazed structure with the small shape errors, the technology to form the blazed structure by which, after the electronic beam is irradiated onto the resist on the lens substrate while the irradiation amount is controlled, the film thickness of the resist is changed by the developing processing, and blazed structure is formed, is well known, however, when it is produced by this electronic beam painting technology, or by the molding using the molding die produced by the electronic beam painting technology, even in the case of the objective lens in which the ring-shaped zone pitch tends to be decreased, it can be produced with the small shape errors.

In the recording reproducing optical system according to the present invention, the aberration correcting optical element can be structured by the coupling lens to convert the divergent light flux from the light source. When the objective lens is the compatible objective lens to a plurality of kinds of optical information recording media whose thickness of the protective layers are different, the aberration correcting optical element can be structured by the coupling lens to convert the divergent light flux from the light source which generates the light of the shortest wavelength. Then, the coupling lens has at least one plastic lens having the refracting power satisfying the expression (3) or (7), and this plastic lens has at least one diffractive surface, and the total sum of the diffracting power of the diffractive surface satisfies the expression (2) or (6).

The coupling lens may also be (1) a lens to convert the divergent light flux from the light source into the divergent light flux whose diverging angle is smaller, (2) a collimator lens to convert the divergent light flux from the light source into practically the parallel light flux, or (3) a lens to convert the divergent light flux from the light source into the convergent light flux. In the case of (1), because it is enough that the refracting power of the coupling lens is small, the coupling lens can be easily produced. In the case of (2), because there is no change of the object point position of the objective lens by focusing, the good focusing characteristic can be obtained. Further, in the case of (3), as compared to the cases of (1) and (2), because the change of the spherical aberration of the objective lens due to the temperature change is small, the burden of the coupling lens is decreased when the change of the spherical aberration due to the temperature change of the objective lens is cancelled, therefore, the coupling lens is easily produced.

Further, the coupling lens as the aberration correcting optical element may be structured by a plurality of lenses, however, from the view point of the reduction of the number of parts of the recording reproducing optical system and the low cost, it is preferable that it is a plastic lens of one lens in one group composition. Then, in this case, it is more preferable that the numerical aperture on the light source side of the coupling lens is not smaller than 0.15 and not larger than 0.50, thereby, because the changed amount of the inclination angle of the marginal ray of the emitted light flux from the coupling lens by the change of the refracting power at the time of the temperature change can be sufficiently largely secured, it is advantageous for the correction of the spherical aberration of the objective lens at the time of the temperature change.

In the recording reproducing optical system according to the present invention, the aberration correcting optical element can be structured by 2 groups of the positive lens group and negative lens group. In this case, the recording reproducing optical system has a coupling lens for converting the divergent light flux from the light source, and the aberration correcting optical element is arranged in the optical path between this coupling lens and the objective lens. When the objective lens is a compatible objective lens to a plurality of kinds of optical information recording media whose thickness of the protective layers are different, the aberration correcting optical element is structured by 2 groups of the positive lens and the negative lens arranged in the optical path between the coupling lens for converting the divergent light flux from the light source which generates the ray whose wavelength is shortest, and the objective lens. As the aberration correcting optical element having such a mode, for example, there is a beam expander structured by 2 groups of the positive lens and negative lens, which is arranged in the parallel light flux by the collimator lens and objective lens. In this case, when the collimator lens is a glass lens, because the light flux between the collimator lens and the aberration correcting optical element can be always maintained to the parallel light flux, it is preferable because the beam shaping prism is easily arranged. Then, the aberration correcting optical element has at least one plastic lens having the diffracting power satisfying the expression (3) or (7), and this plastic lens has at least one diffractive surface and the total sum of the diffracting power of the diffractive surface satisfies the expression (2) or (6).

Further, the aberration correcting optical element structured by 2 groups of the positive lens group and negative lens group may be structured by a plurality of lenses, however, from the viewpoint of the reduction of the number of parts of the recording reproducing optical system, it is preferable that the aberration correcting optical element is two lenses in two groups composition. Furthermore, from the viewpoint of the cost reduction, it is preferable that it is a plastic lens of two lenses in two groups two lenses in two groups composition.

On the one hand, in order to make the ring-shaped zone pitch of the diffractive structure of the aberration correcting optical element not too small, the positive lens group is the plastic lens in which the diffractive structure formed of a plurality of concentric ring-shaped zone step difference is formed on at least one surface, and the negative lens group is the glass lens whose Abbe's number is smaller than the plastic lens of the positive lens group, and when the focal distance of the positive lens group is fP (mm) and the focal distance of the negative lens group is fN (mm), it is preferable that they satisfy the following expression (14).

$$1.2 \leq |fP/fN| \leq 2.4 \quad (14)$$

As described above, when the positive lens is formed of the plastic lens having at lest one diffractive surface and the negative lens is formed of the glass lens, and they are structured so as to satisfy the above expression (14), the ring-shaped zone pitch of the diffractive structure of the aberration correcting optical element can be softened by the amount in which the changed amount of the inclination angle of the marginal ray beam of the emitted light flux from the aberration correcting optical element can be sufficiently largely secured. Furthermore, in this case, it is more preferable that, as the glass lens for the negative lens, the saltpeter material which is larger than Abbe's number of the plastic lens of the positive lens is selected, thereby, it is advantageous for suppressing the generation of the longitudinal chromatic aberration of the optical system small.

In the recording reproducing optical system according to the present invention, the aberration correcting optical element can be structured by the plastic lens of one lens in one group composition arranged in the optical path between the coupling lens for converting the divergent light flux from the light source and the objective lens. When the objective lens is an objective lens compatible to a plurality of kinds of optical information recording media whose thickness of the protective layers are different, the plastic lens of one lens in one group composition as the aberration correcting optical element is arranged in the optical path between the coupling lens to convert the divergent light flux from the light source generating the ray whose wavelength is shortest, and the objective lens. The plastic lens as the aberration correcting optical element has the refracting power satisfying the expression (3) or (7), and has at least one diffractive surface, and the total sum of the diffracting power of the diffractive surface satisfies the expression (2) or (6). Thereby, the aberration correcting optical element of the very simple structure of one lens in one group composition can be obtained. Particularly, when the absolute value of the refracting power of the aberration correcting optical element is made the same as the absolute value of the diffracting power, and its sign is reversed each other, because the power of the total system of the aberration correcting optical element becomes zero, such an aberration correcting optical element can be easily arranged in the parallel light flux and it is preferable.

Further, in the recording reproducing optical system according to the present invention, when 2 or more diffractive surfaces are formed on the plastic lens of the aberration correcting optical element, and the diffracting power is distributed to a plurality of diffractive surfaces, because the ring-shaped zone pitch per one diffractive surface can be softened, the influence on the lowering of the diffraction efficiency by the production error of the diffraction ring-shaped zone shape is decreased and preferable.

Further, it may be allowed that, in order to soften the ring-shaped zone pitch of the plastic lens of the aberration correcting optical element, in the diffracted light generated in the diffractive structure of the plastic lens of the aberration correcting optical element, the high order diffracted ray not smaller than second order is made to have the maximum diffracted-light amount, and this high order diffracted ray is made to be incident on the objective lens. For example, when the second order diffracted ray is made to be incident on the objective lens, the ring-shaped zone pitch can be made 2 times comparing to the case of first order diffracted ray.

Further, in the recording reproducing optical system according to the present invention, it is preferable that the diffractive structure having the blaze structure having the diffracting power to satisfy the expression (2) or (6), is formed on the surface which is macroscopically convex. Because the apex angle of the blaze becomes large as compared to the case where the diffractive structure is formed on macroscopically flat surface or the surface which is convex, when such a blaze structure is produced by the molding using the molding die, even when it is the fine blaze structure, it can be finely transferred. In this connection, in the present specification, the shape of the surface is "macroscopically convex (concave or flat surface)" is the same meaning as "the envelope of the top of each ring-shaped zone step difference is convex (concave or flat surface)".

Further, in the recording reproducing optical system according to the present invention, when the chromatic aberration correcting optical element structured by the glass lens is arranged in the optical path between the light source and the objective lens, the function to correct the longitudinal chromatic aberration of the recording reproducing optical system can be distributed to the chromatic aberration correcting optical element, and the diffractive structure formed on the objective lens. Thereby, as compared to the case where the chromatic aberration correcting optical element is not arranged in the recording reproducing optical system, because the diffracting power of the objective lens can be reduced, the ring-shaped zone pitch of the objective lens can be softened. As the result, the objective lens in which the lowering of the diffraction efficiency by the production error of the diffraction ring-shaped zone shape is small and the light using efficiency is good, can be obtained. As such a chromatic aberration correcting optical element, for example, there is a tablet type chromatic aberration correcting optical element structured by the positive lens in which relatively Abbe's number is large, and the negative lens in which relatively Abbe's number is small, which are proximately arranged each other, or a diffraction type chromatic aberration correcting optical element of the one lens in one group composition in which the diffractive structure having the positive diffracting power is formed. The recording reproducing optical system may also be structured in such a manner that these chromatic aberration correcting optical element are included in the aberration correcting optical element, or these chromatic aberration correcting optical element are not included in the aberration correcting optical element.

The optical pick-up apparatus of the optical information recording medium according to the present invention is characterized in that: it is an optical pick-up apparatus of the optical information recording medium which is at least provided with: the light source; light converging optical system by which the light flux emitted from the light source is converged onto the information recording surface of the optical information recording medium; and light detector by which the light flux reflected on the information recording surface is received, and the electric signal corresponding to its light amount is outputted, and the light converging optical system is the recording reproducing optical system of the above-described optical information recording medium.

Further, the recording reproducing apparatus according to the present invention is mounted with the above optical pick-up apparatus, and can conduct the recording of the voice and/or the image, and/or the reproducing of the voice and/or the image.

Hereupon, in the present specification, the aberration correcting optical element is an optical element arranged in the optical path between the light source and the plastic objective lens of one lens in one group composition, and to the wave front aberration amount of the wavefront which transmits the plastic objective lens of one lens in one group composition when the temperature changes from a predetermined temperature by a predetermined temperature difference, an optical element by which the wave front aberration amount of the wavefront which transmits the optical element when the temperature changes from a predetermined temperature by a predetermined temperature difference, and the plastic objective lens of one lens in one group composition can be reduced.

Further, in the present specification, the chromatic aberration correcting optical element is an optical element arranged in the optical path between the light source and the plastic objective lens of one lens in one group composition, and an optical element by which the longitudinal chromatic aberration of the wavefront in which the ray whose wavelength is different from a predetermined wavelength by a predetermined wavelength difference transmits this optical element, aberration correcting optical element and plastic objective lens of one lens in one group composition, can be reduced, comparing to the longitudinal chromatic aberration of the wavefront which transmits the aberration correcting optical element and the plastic objective lens of one lens in one group composition.

Further, in the present specification, "the optical element of A is included in the optical element B" is the same meaning as respective transmit wave front aberrations of the optical element of A and the optical element of B are larger than the Marechal's criterion, however, the wave front aberration of the wavefront which transmits both of the optical element of A and the optical element B is within the Marechal's criterion. Then, "the optical element of A is not included in the optical element of B" or "the optical element of A and the optical element of B are separated optical elements" is the same meaning as respective transmit wave front aberrations of the optical element of A and the optical element of B are within the Marechal's criterion.

Further, in the present specification, the diffractive surface or the (optical) surface on which the diffractive structure is formed, means the surface of the optical element, for example, the relief is provided on the surface of the lens and the surface made to have the action by which the incident light flux is diffracted, and when there are areas in which the diffraction is generated on the same optical surface, and the diffraction is not generated, it means the area in which the diffraction is generated. Further, the diffractive structure or diffraction pattern means this area in which the diffraction is generated. As the shape of the relief, for example, on the surface of the optical element, the almost concentric circle ring-shaped zone is formed around the optical axis, and when the cross section is viewed on the plane including the optical axis, it is well known that each ring-shaped zone is a saw toothed-like or step-like shape, however, such a shape is included.

Further, in the present specification, the recording and reproducing of the information means that the information is recorded on the information recording surface of the optical information recording medium as described above, and the information recorded on the information recording surface is reproduced. The recording reproducing optical system of the present invention may also be an optical system which is used for conducting only the recording or only reproducing, or for conducting both the recording and reproducing. Further, it may also be an optical system used for conducting the recording onto a certain optical information recording medium, and for conducting the reproducing onto another optical information recording medium, or for conducting the recording or reproducing onto a certain optical information recording medium, and for conducting the recording and reproducing onto another optical information recording medium. In this connection, the reproducing herein includes simply reading the information.

DETAILED DESCRIPTION OF THE PREFERRED EMBODIMENT

Figure 1:
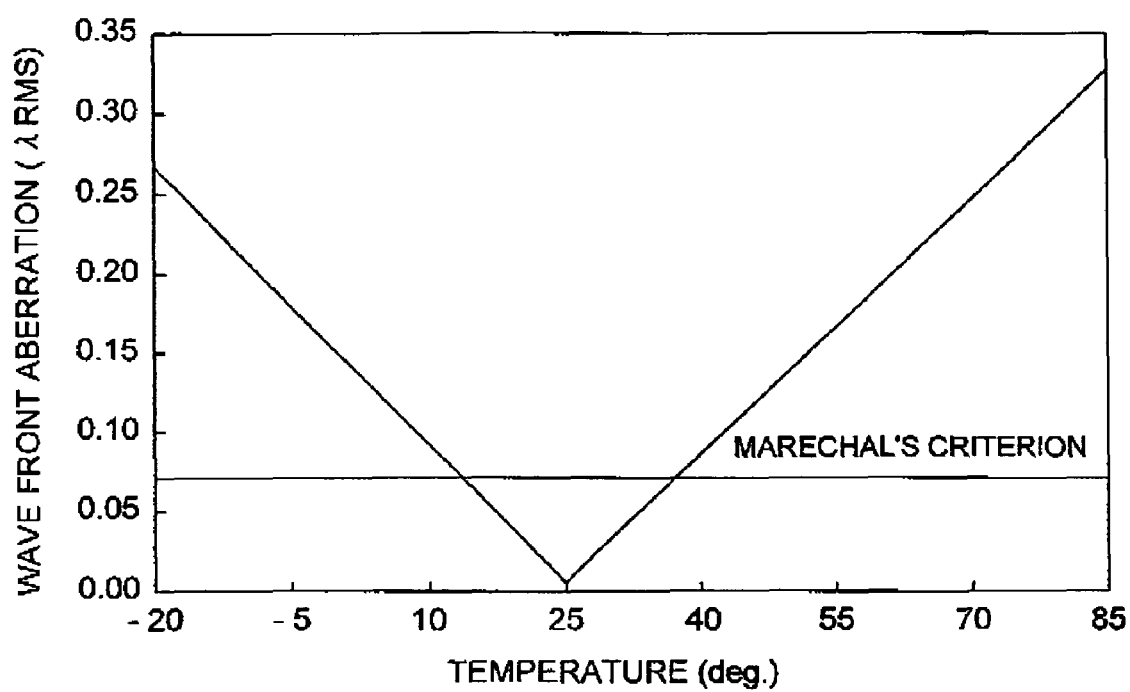
FIG. 1 is a view showing a situation of a wave front aberration change to the temperature change of the conventional plastic lens of one lens in one group composition of NA 0.85, focal distance 2.2 mm, and design reference wavelength 405 nm.

Referring to the drawings, the first and the second embodiments will be described below.

The First Embodiment

Figure 2:
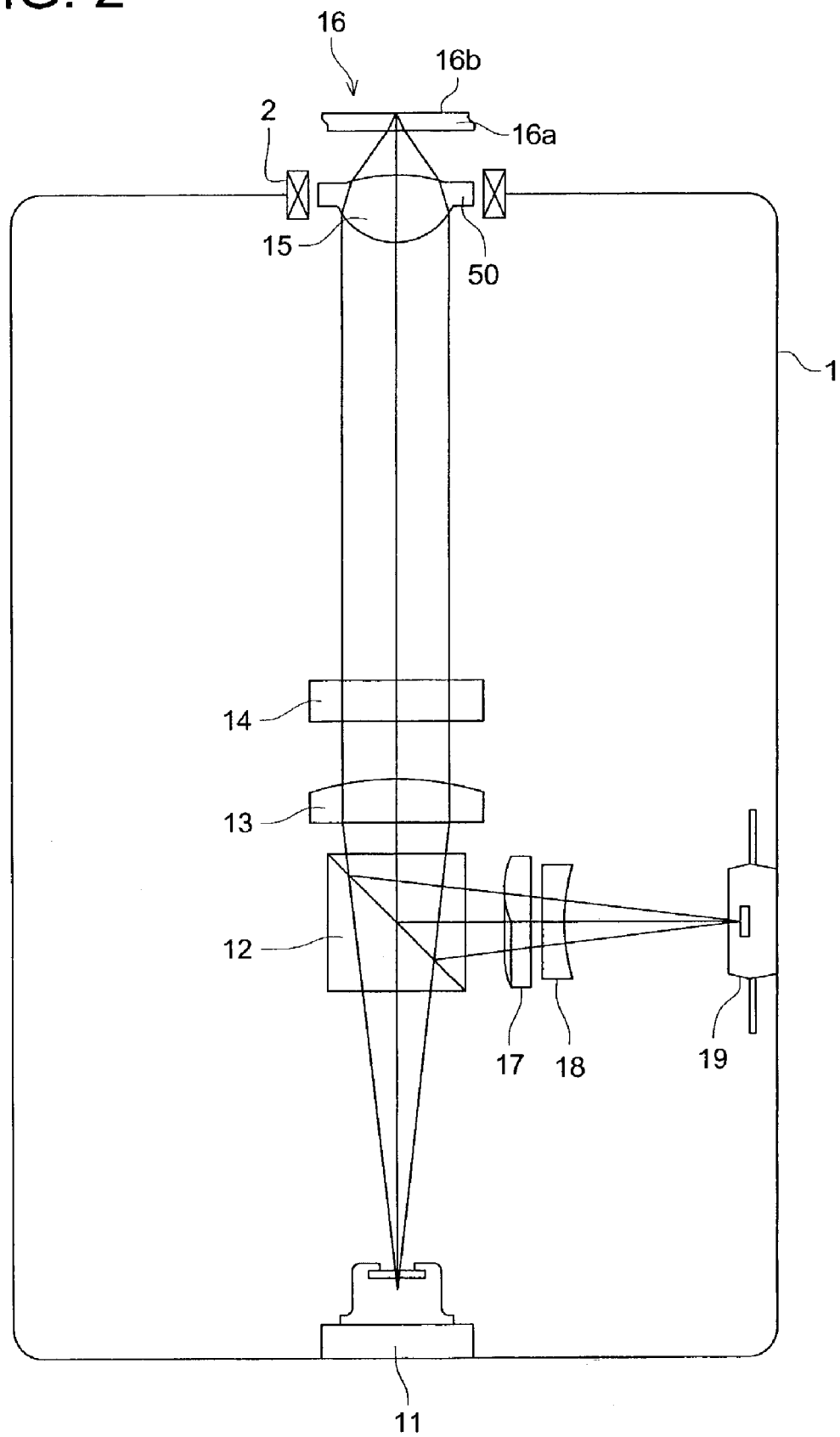
FIG. 2 is a view conceptually showing the structure of the first optical pick-up apparatus in which a recording reproducing optical system according to the first embodiment is mounted.

FIG. 2 is a view conceptually showing the structure of the first optical pick-up apparatus on which the recording reproducing optical system according to the first embodiment is mounted. The optical pick-up apparatus 1 in FIG. 2 has a semiconductor laser 11 as the light source, hybrid refractive-diffractive coupling lens 13 (a diffraction-integrated type coupling lens), and hybrid refractive-diffractive objective lens 15 (a diffraction-integrated type objective lens).

The semiconductor laser 11 is a GaN series blue violet laser which emits the light flux of wavelength of about 400 nm. Further, as the light source to emit the light flux of wavelength of about 400 nm, other than the above GaN series blue violet laser, a SHG blue violet laser using the secondary harmonics may also be used.

The hybrid refractive-diffractive coupling lens 13 is a collimator lens which converts the divergent light flux from the semiconductor laser 11 into the parallel light flux parallel to the optical axis, and is the plastic lens. In this connection, as the hybrid refractive-diffractive coupling lens 13, a lens by which the diverging angle of the divergent light flux from the semiconductor laser 11 is more decreased, and a lens by which the divergent light flux from the semiconductor laser 11 is converted into the convergent light flux may also be used.

Further, on the surface of the hybrid refractive-diffractive objective lens 15 side of the hybrid refractive-diffractive coupling lens 13, almost concentric circular diffraction pattern is provided. The diffraction pattern of the hybrid refractive-diffractive coupling lens 13 is determined so as to satisfy the above expression (2). In this connection, the almost concentric circular diffraction pattern may also be provided on the surface of the semiconductor laser 11 side of the hybrid refractive-diffractive coupling lens 13, or may also be provided on both of the surface of the semiconductor laser 11 side, and the surface of the hybrid refractive-diffractive objective lens 15 side. Further, the diffraction pattern of the hybrid refractive-diffractive coupling lens 13 is almost concentric circular to the optical axis, however, the diffraction pattern other than this may also be used.

The hybrid refractive-diffractive objective lens 15 is a lens which converges the light flux from the hybrid refractive-diffractive coupling lens 13 onto the information recording surface 16b through the protective layer 16a of the optical disk for the high density recording within the diffraction limit, and the numerical aperture on the optical disk 16 side is determined as not smaller than 0.75.

The hybrid refractive-diffractive objective lens 15 is an aspheric surface plastic lens of one lens in one group composition, and on the surface of the hybrid refractive-diffractive coupling lens 13 side of the hybrid refractive-diffractive objective lens 15, almost concentric circular diffraction pattern is provided. The diffraction pattern of the hybrid refractive-diffractive objective lens 15 is determined so as to satisfy the above-described expressions (1), (4), (9), and (11). Further, in the hybrid refractive-diffractive objective lens 15, its lens thickness on the optical axis is determined so as to satisfy the above-described expression (12).

In this connection, almost concentric circular diffraction pattern may also provided on the surface of the hybrid refractive-diffractive coupling lens 13 side of the hybrid refractive-diffractive objective lens 15, or on both of the surface of the hybrid refractive-diffractive coupling lens 13 side and the surface of the optical disk 16 side. Further, the diffraction pattern of the hybrid refractive-diffractive objective lens 15 is described as almost concentric circular to the optical axis, however, the diffraction pattern other than this may also be provided.

Further, the hybrid refractive-diffractive objective lens 15 has a flange portion 50 which has the surface vertically extended to the optical axis, and by this flange portion 50, the hybrid refractive-diffractive objective lens 15 can be accurately attached to the optical pick-up apparatus 1.

The divergent light flux emitted from the semiconductor laser 11 is made the parallel light flux by the hybrid refractive-diffractive coupling lens 13 after it transmits the polarizing beam splitter 12, becomes the circular polarizing light through a ¼ wavelength plate 14, and after it passes a diaphragm, not shown, it is converged on the information recording surface 16b through the protective layer 16a of the optical disk 16 by the hybrid refractive-diffractive objective lens 15, and becomes a spot. The hybrid refractive-diffractive objective lens 15 is focus controlled and tracking controlled by an actuator arranged in its periphery.

The reflection light flux modulated by the information pit on the information recording surface 16b becomes a straight line polarized light after it passes again the hybrid refractive-diffractive objective lens 15, diaphragm, and ¼ wavelength plate 14, and by the hybrid refractive-diffractive coupling lens 13, it is made the convergent light flux, reflected by the polarizing beam splitter 12, and the astigmatism is given by passing through a cylindrical lens 17 and concave lens 18, and it is converged onto the light detector 19. Then, by using the output signal of the light detector 19, the information recorded on the optical disk 16 can be read.

In the present embodiment, because the hybrid refractive-diffractive objective lens 15 is the plastic lens of one lens in one group composition, when the temperature of the hybrid refractive-diffractive objective lens 15 is risen by the radiation from the actuator 2, or rising of the environmental temperature, it changes to the direction in which the refractive index is decreased and its spherical aberration changes to the over correction direction. On the one hand, because the hybrid refractive-diffractive coupling lens 13 is a plastic lens and its refracting power satisfies the above-described expression (3), when the temperature of the hybrid refractive-diffractive coupling lens 13 is risen by the radiation from the actuator 2, or rising of the environmental temperature, it changes to the direction in which the refractive index is decreased, and the light flux emitted from the hybrid refractive-diffractive coupling lens 13 becomes the convergent light flux. Because this is corresponding to that the lateral magnification of the hybrid refractive-diffractive objective lens 15 is decreased, by this change of the lateral magnification, in the hybrid refractive-diffractive objective lens 15, the spherical aberration is changed to the under correction direction. Because the refracting power and the diffracting power of the hybrid refractive-diffractive coupling lens 13 are determined so that they are just cancelled with the spherical aberration change to the over correction direction due to the temperature change and the spherical aberration change to the under correction direction by the lateral magnification change, of the hybrid refractive-diffractive objective lens 15, the light flux emitted from the semiconductor laser 11 is, by passing through the hybrid refractive-diffractive coupling lens 13 and the hybrid refractive-diffractive objective lens 15, even when the temperature changes, converged on the information recording surface 16b of the optical disk 16, almost without the change of the spherical aberration.

Further, when the hybrid refractive-diffractive objective lens 15 is provided with almost concentric circular diffraction pattern satisfying the above-described expression (1) on the optical surface, to the oscillation wavelength of the semiconductor laser 11, the longitudinal chromatic aberration which is the inverse sign to the longitudinal chromatic aberration generated by the diffraction pattern of the hybrid refractive-diffractive coupling lens 13 and its absolute value is almost the same, is generated. Accordingly, the light flux emitted from the semiconductor laser 11 is converged on the information recording surface 16b of the optical disk 16 almost without the longitudinal chromatic aberration, by passing through the hybrid refractive-diffractive coupling lens 13 and the hybrid refractive-diffractive objective lens 15.

The Second Embodiment

Figure 3:
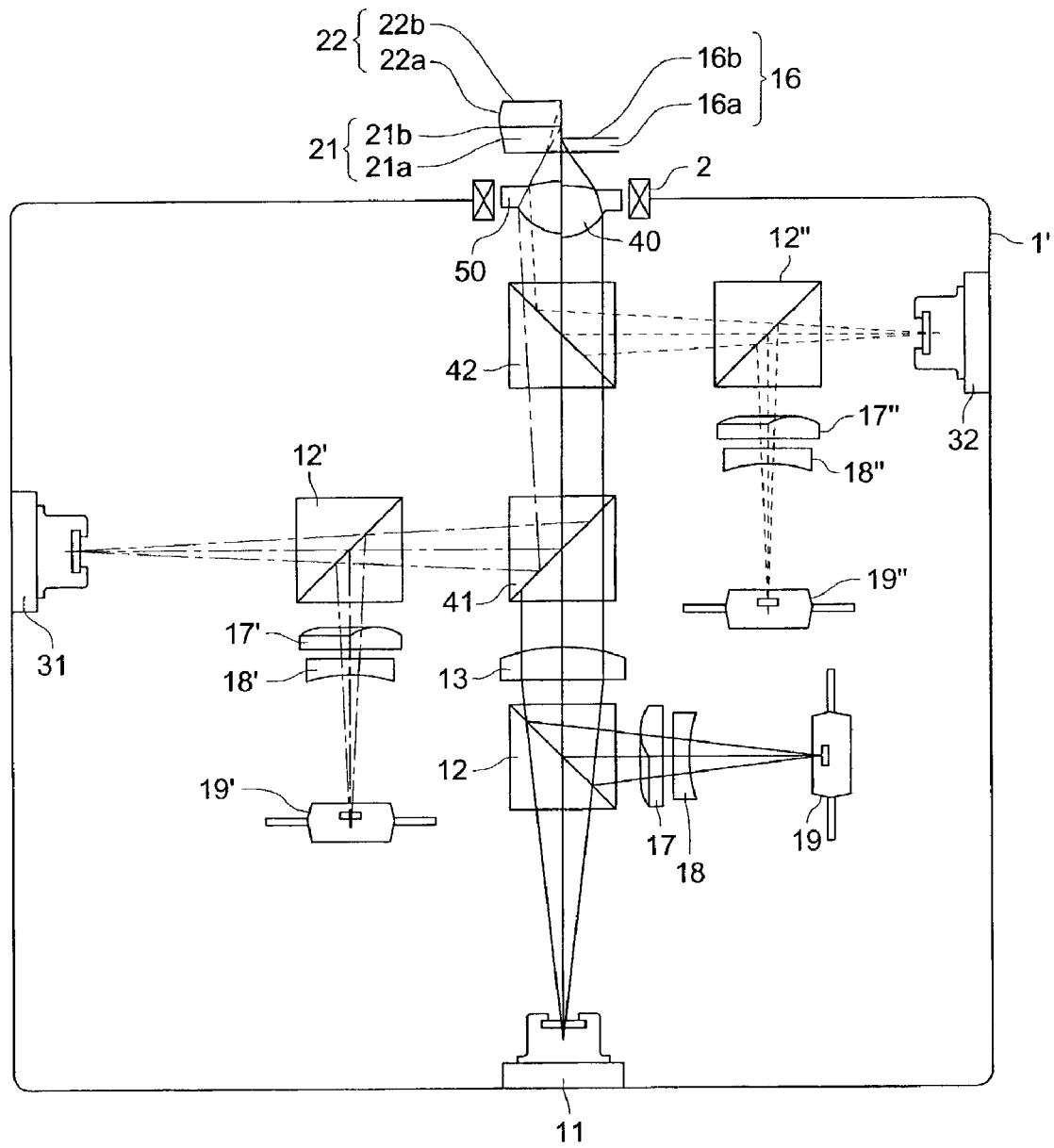
FIG. 3 is a view conceptually showing the structure of the second optical pick-up apparatus in which the recording reproducing optical system according to the second embodiment is mounted.

FIG. 3 is a view generally showing +the structure of the second optical pick-up apparatus on which the recording reproducing optical system according to the second embodiment is mounted. The optical pick-up apparatus of the present embodiment is an optical pick-up apparatus on which the recording reproducing optical system which can conduct the recording reproducing of the information onto 3 kinds of optical disks whose thickness of the protective layers are different by one objective lens compatibly, by using the ray from 3 kinds of light sources whose wavelength are different, is mounted.

The 3 kinds of optical disks whose thickness of the protective layers are different are the first optical disk 16 which is the high density DVD in which the protective layer is thinnest and the recording density is largest, the second optical disk 21 which is any one of each kind of DVD such as a DVD whose protective layer is 0.6 mm, DVD-ROM, DVD-RAM, DVD-R, DVD-RW, and DVD+RW, and the third optical disk 22 which is any one of each kind of CD such as a CD whose protective layer is 1.2 mm, CD-R, CD-RW, CD-video, and CD-ROM.

The optical pick-up apparatus 1' of FIG. 3 is provided with 3 kinds of semiconductor lasers of the semiconductor laser 11 which is the first light source which generates the ray for the recording reproducing of the first optical disk 16, the semiconductor laser 31 which is the second light source which generates the ray for the recording reproducing of the second optical disk 21, and the semiconductor laser 32 which is the third light source which generates the ray for the recording reproducing of the third optical disk 22, and these semiconductor lasers are selectively light-emitted corresponding to the thickness of the protective layers of the optical disks on which the information is recorded and reproduced.

The semiconductor laser 11 is a GaN series blue violet laser which emits the light flux of the wavelength of about 400 nm. Further, as a light source which emits the light flux of the wavelength of about 400 nm, other than the above GaN series blue violet laser, an SHG blue violet laser by using the secondary harmonics may also be used. The semiconductor laser 31 is a red semiconductor laser which emits the light flux of the wavelength of about 650 nm, and the semiconductor laser 32 is an infrared semiconductor laser which emits the light flux of the wavelength of about 780 nm.

Further, the optical pick-up apparatus 1' has the hybrid refractive-diffractive coupling lens 13 as the collimator lens to convert the divergent light flux from the semiconductor laser 11 into the parallel light flux parallel to the optical axis, and the hybrid refractive-diffractive objective lens 40.

The hybrid refractive-diffractive objective lens 40 is a lens which converges the light flux which is emitted from the semiconductor laser 11 and passes through the hybrid refractive-diffractive coupling lens 13, onto the information recording surface 16b through the protective layer 16a of the first optical disk 16 which is the high density DVD so that it is within the diffraction limit in the first numerical aperture, further, converges the divergent light flux emitted from the semiconductor laser 31 onto the information recording surface 21b through the protective layer 21a of the second optical disk 21 which is the DVD so that it is within the diffraction limit in the second numerical aperture, and further, converges the divergent light flux emitted from the semiconductor laser 32 onto the information recording surface 22b through the protective layer 22a of the third optical disk 22 which is the CD so that it is within the diffraction limit in the third numerical aperture, and the first numerical aperture is made not lower than 0.75, the second numerical aperture is made 0.60 to 0.65, and the third numerical aperture is made 0.45 to 0.50.

The hybrid refractive-diffractive objective lens 40 is an aspheric surface plastic lens of one lens in one group composition, and on the surface of the hybrid refractive-diffractive coupling lens 13 side of the hybrid refractive-diffractive objective lens 40, the almost concentric circular diffraction pattern is provided. The diffraction pattern of the hybrid refractive-diffractive objective lens 40 is determined so that the diffracted light of the short wavelength light flux forms a good wavefront to the optical disk whose protective layer is thin and the diffracted light of the long wavelength light flux forms a good wavefront to the optical disk whose protective layer is thick.

Further, the diffraction pattern of the hybrid refractive-diffractive objective lens 40 is determined so that the above expressions (5), (8), (9) and (11) are satisfied. Further, in the hybrid refractive-diffractive objective lens 40, its lens thickness on the optical axis is determined so that the above expression (12) is satisfied.

In this connection, the almost concentric circular diffraction pattern may also be provided on the surface of the hybrid refractive-diffractive coupling lens 13 side of the hybrid refractive-diffractive objective lens 40, or may also be provided on both of the surface of the hybrid refractive-diffractive coupling lens 13 side and the surface of the optical disk side. Further, the diffraction pattern of the hybrid refractive-diffractive objective lens 40 is made almost concentric circular to the optical axis, however, the diffraction pattern other than this may also be provided. Further, the hybrid refractive-diffractive objective lens 40 has a flange portion 50 which has the surface vertically extending to the optical axis, and by this flange portion 50, the hybrid refractive-diffractive objective lens 40 can be accurately attached onto the optical pick-up apparatus 1'.

The hybrid refractive-diffractive coupling lens 13 is a collimator lens which converts the divergent light flux from the semiconductor laser 11 into the parallel light flux which is parallel to the optical axis, and the plastic lens. In this connection, as the hybrid refractive-diffractive coupling lens 13, a lens by which the divergent angle of the divergent light flux from the semiconductor laser 11 is more decreased, and a lens by which the divergent light flux from the semiconductor laser 11 is converted into the convergent light flux, may also be used.

Further, on the surface of the hybrid refractive-diffractive objective lens 40 side of the hybrid refractive-diffractive coupling lens 13, the almost concentric circular diffraction pattern is provided. Then, the diffraction pattern of the hybrid refractive-diffractive coupling lens 13 is determined so as to satisfy the above expression (6). In this connection, the almost concentric circular diffraction pattern may also be provided on the surface of the semiconductor laser 11 side of the hybrid refractive-diffractive coupling lens 13, or on both of the surface of the semiconductor laser 11 side and the surface of the hybrid refractive-diffractive objective lens 40 side. The diffraction pattern of the hybrid refractive-diffractive coupling lens 13 is made almost concentric circular to the optical axis, however, the diffraction pattern other than this may also be provided.

The divergent light flux emitted from the semiconductor laser 11 is, after it transmits the polarizing beam splitter 12, made a parallel light flux by the hybrid refractive-diffractive coupling lens 13, and after passing through the polarizing beam splitter 41, polarizing beam splitter 42, and diaphragm, not shown, it is converged on the information recording surface 16b through the protective layer 16a of the first optical disk 16 by the hybrid refractive-diffractive objective lens 40 and becomes a spot. The hybrid refractive-diffractive objective lens 40 is focus-controlled and tracking-controlled by the actuator 2 arranged in its periphery.

The reflected light flux modulated by the information pit on the information recording surface 16b is, after passing again through the hybrid refractive-diffractive objective lens 40, diaphragm, polarizing beam splitter 42, and polarizing beam splitter 41, made the convergent light flux by the hybrid refractive-diffractive coupling lens 13, reflected by the polarizing beam splitter 12, astigmatism is given by passing through the cylindrical lens 17 and concave lens 18, and it is converged to the light detector 19. Then, by using the output signal of the light detector 19, the information recorded on the first optical disk 16 can be read.

In the present embodiment, because the hybrid refractive-diffractive objective lens 40 is a plastic lens of one lens in one group composition, when the temperature of the hybrid refractive-diffractive objective lens 15 is risen by the radiation from the actuator 2, or rising of the environmental temperature, it changes to the direction in which the refractive index is decreased and its spherical aberration changes to the over correction direction. On the one hand, because the hybrid refractive-diffractive coupling lens 13 is a plastic lens and its refracting power satisfies the above-described expression (7), when the temperature of the hybrid refractive-diffractive coupling lens 13 is risen by the radiation from the actuator 2, or rising of the environmental temperature, it changes to the direction in which the refractive index is decreased, and the light flux emitted from the hybrid refractive-diffractive coupling lens 13 becomes the convergent light flux. Because this is corresponding to that the lateral magnification of the hybrid refractive-diffractive objective lens 40 is decreased, by this change of the lateral magnification, the spherical aberration is changed to the under correction direction in the hybrid refractive-diffractive objective lens 40. Because the refracting power and the diffracting power of the hybrid refractive-diffractive coupling lens 13 are determined so that they are just cancelled with the spherical aberration change to the over correction direction due to the temperature change and the spherical aberration change to the under correction direction by the lateral magnification change, of the hybrid refractive-diffractive objective lens 15, the light flux emitted from the semiconductor laser 11 is, by passing through the hybrid refractive-diffractive coupling lens 13 and the hybrid refractive-diffractive objective lens 40, even when the temperature changes, converged on the information recording surface 16b of the optical disk 16, almost without the change of the spherical aberration.

Further, when the hybrid refractive-diffractive objective lens 40 is provided with almost concentric circular diffraction pattern satisfying the above-described expression (5) on the optical surface, to the oscillation wavelength of the semiconductor laser 11, the longitudinal chromatic aberration which is the inverse sign to the longitudinal chromatic aberration generated by the diffraction pattern of the hybrid refractive-diffractive coupling lens 13 and its absolute value is almost the same, is generated.

Accordingly, the light flux emitted from the semiconductor laser 11 is converged on the information recording surface 16b of the optical disk 16 almost without the longitudinal chromatic aberration, by passing through the hybrid refractive-diffractive coupling lens 13 and the hybrid refractive-diffractive objective lens 40.

Further, the divergent light flux emitted from the semiconductor laser 31 is, after it transmits the polarizing beam splitter 12', reflected by the polarizing beam splitter 41, and after passing through the polarizing splitter 42 and diaphragm, not shown, it is converged on the information recording surface 21b, by the hybrid refractive-diffractive objective lens 40, through the protective layer 21a of the second optical disk 21, and becomes a spot. The hybrid refractive-diffractive objective lens 40 is focus-controlled and tracking-controlled by the actuator 2 arranged in its periphery.

The reflected light flux modulated by the information pit on the information recording surface 21b is, after passing again through the hybrid refractive-diffractive objective lens 40, diaphragm, polarizing beam splitter 42, and after reflected by the polarizing beam splitter 41, reflected by the polarizing beam splitter 12', the astigmatism is given by passing through the cylindrical lens 17' and concave lens 18', and it is converged to the light detector 19'. Then, by using the output signal of the light detector 19', the information recorded on the second optical disk 21 can be read.

Further, the divergent light flux emitted from the semiconductor laser 32 is, after it transmits the polarizing beam splitter 12", reflected by the polarizing beam splitter 42, and after passing through the diaphragm, not shown, it is converged on the information recording surface 22b, by the hybrid refractive-diffractive objective lens 40, through the protective layer 22a of the third optical disk 22, and becomes a spot. The hybrid refractive-diffractive objective lens 40 is focus-controlled and tracking-controlled by the actuator 2 arranged in its periphery.

The reflected light flux modulated by the information pit on the information recording surface 22b is, after passing again through the hybrid refractive-diffractive objective lens 40 and diaphragm, and after reflected by the polarizing beam splitter 42 and the polarizing beam splitter 12", the astigmatism is given by passing through the cylindrical lens 17" and concave lens 18", and it is converged to the light detector 19". Then, by using the output signal of the light detector 19", the information recorded on the third optical disk 22 can be read.

In this connection, the optical pick-up apparatus 1' is provided with the ¼ wavelength plates, not shown, in respective optical paths between the semiconductor laser 11 and the hybrid refractive-diffractive objective lens 40, between the semiconductor laser 31 and the hybrid refractive-diffractive objective lens 40, and between the semiconductor laser 32 and the hybrid refractive-diffractive objective lens 40.

The optical pick-up apparatus 1' as shown in FIG. 3 is, for example, can be mounted on the recording apparatus and/or reproducing apparatus of the voice and/or image of devices such as a player or drive, compatible to the optical information recording media such as, each kind of CD such as the CD, CD-R, CD-RW, CD-Video, CD-ROM, each kind of DVD such as DVD, DVD-ROM, DVD-RAM, DVD-R, DVD-RW, DVD+RW, and MD, or an AV device including them, a personal computer, and other information terminal equipment.

The Third Embodiment

Figure 46:
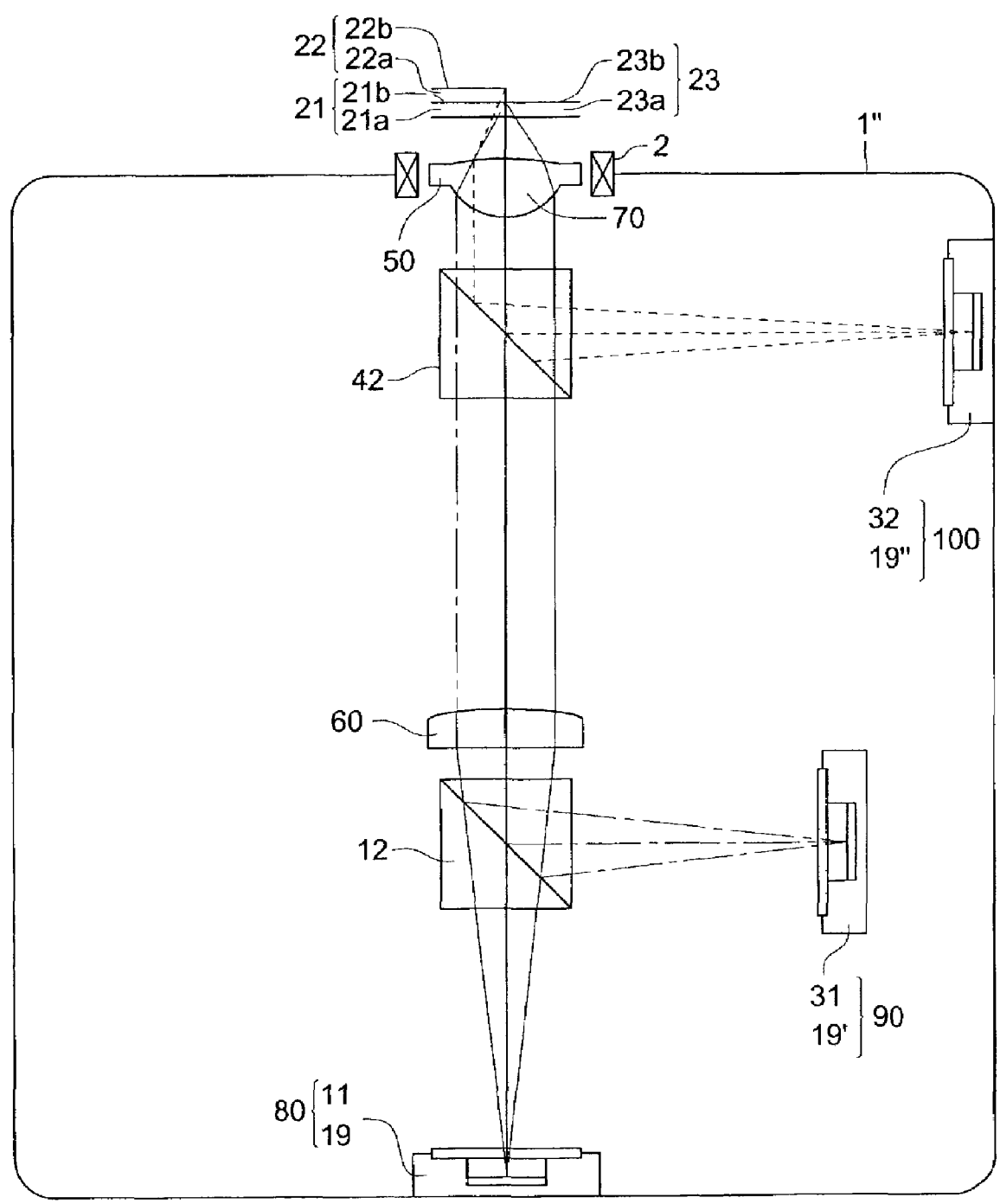
FIG. 46 is a view conceptually showing the structure of the third optical pick-up apparatus in which a recording reproducing optical system according to the third embodiment is mounted.

FIG. 46 is a view generally showing the structure of the third optical pickup apparatus in which the recording reproducing optical system according to the third embodiment is mounted. An optical pickup apparatus of the present embodiment is an optical pickup apparatus in which a recording reproducing optical system by which the recording reproducing of the information can be compatibly conducted by an objective lens, is mounted, by using the light from 3 kinds of light sources whose wavelength is different from each other, on 3 kinds of optical disks whose recording density is different from each other.

The 3 kinds of optical disks comprise the first optical disk 23 as the high density DVD whose recording density is the largest and the protective layer is 0.6 mm in thickness uses the shortest wavelength light flux of wavelength of about 400 nm for recording reproducing of the information, and the second optical disk 21 which is any one of each kind of DVDs such as a DVD, DVD-ROM, DVD RAM, DVD-R, DVD-RW, and DVD+RW, whose protective layer is 0.6 mm in thickness and the third optical disk 22 as each kind of CDs such as CD, CD-R, CD-RW, CD-video, CD-ROM, whose protective layer is 1.2 mm in thickness.

The optical pickup apparatus 1" is provided with: a module 80 for the first optical disk which is integrated with a semiconductor laser 11 as the first light source which generates a light flux for recording reproducing of the first optical disk 23 and a photo-detector 19; a module 90 for the second optical disk which is integrated with a semiconductor laser 31 as the second light source which generates a light flux for the recording reproducing of the second optical disk 21 and a photo-detector 19'; and a module 100 for the third optical disk which is integrated with a semiconductor laser 32 as the third light source which generates a light flux for the recording reproducing of the third optical disk 22 and a photo-detector 19", and these semiconductor lasers whose wavelengths are different, are selected so as to emit a light flux in accordance with the recording density of the optical disk which records and reproduces the information.

The semiconductor laser 11 is a GaN series blue-violet laser which emits the light flux of the wavelength of about 400 nm. Further, as the light source which emits the light flux of the wavelength of about 400 nm, other than the GaN series blue violet laser, an SHG blue violet laser using the second harmonic generation may also be used. The semiconductor laser 31 is a red semiconductor laser which emits the light flux of the wavelength of about 650 nm, and the semiconductor laser 32 is an infrared semiconductor laser which emits the light flux of the wavelength of about 780 nm.

Further, the optical pickup apparatus 1" has a hybrid refractive-diffractive coupling lens 60 as the collimator lens which converts the divergent light flux from the semiconductor laser 11 and semiconductor laser 31 into the parallel light flux which is parallel to the optical axis, and this hybrid refractive-diffractive coupling lens 60 is arranged in the optical path through which both of the light fluxes from the semiconductor laser 11 and semiconductor laser 31 pass.

A hybrid refractive-diffractive objective lens 70 is a lens which converges the light flux which is emitted from the semiconductor laser 11 and though the hybrid refractive-diffractive coupling lens 60, on the information recording surface 23b through the protective layer 23a of the first optical disk 23, so as to be in the diffraction limit in the first numerical aperture, and the light flux which is emitted from the semiconductor laser 31 and though the hybrid refractive-diffractive coupling lens 60, on the information recording surface 21b through the protective layer 21a of the second optical disk 21 which is the DVD, so as to be in the diffraction limit in the second numerical aperture, and the divergent light flux which is emitted from the semiconductor laser 32, on the information recording surface 22b through the protective layer 22a of the third optical disk 22 which is the CD, so as to be in the diffraction limit in the third numerical aperture, and whose first numerical aperture is almost 0.65, the second numerical aperture is 0.60 to 0.65, and the third numerical aperture is 0.45 to 0.50.

The hybrid refractive-diffractive objective lens 70 is 1 group 1 aspheric plastic lens, and on the surface of the hybrid refractive-diffractive coupling lens 60 side of the hybrid refractive-diffractive objective lens 70, almost concentric ring-shaped diffractive patterns are provided. Then, the diffraction pattern of the hybrid refractive-diffractive objective lens 70 satisfies the formula (PD1>0, where PD1 is a diffractive power ($mm^{-1}$) as a diffractive lens), and because it has the wavelength characteristic by which, to the diffraction order (n1 is defined) of the diffracted ray having the maximum diffraction efficiency among the diffracted rays generated when the light flux emitted from the semiconductor laser 11 is incident, the diffraction orders (respectively n2, n3 are defined) of the diffracted ray having the maximum diffraction efficiency among the diffracted rays generated when the light fluxes emitted from the semiconductor laser 31 and the semiconductor laser 32 are incident, are determined so as to be lower orders, and the diffracted ray of the light flux emitted from the semiconductor laser 11 forms a good wave front on the information recording surface 23a of the first optical disk 23 whose recording density is highest, the diffracted ray of the light flux emitted from the semiconductor laser 31 forms a good wave front on the information recording surface 21a of the second optical disk 21, and the diffracted ray of the light flux emitted from the semiconductor laser 32 forms a good wave front on the information recording surface 31a of the third optical disk 31, while the high diffraction efficiency is maintained to the wavelength range of respective semiconductor lasers, the recording reproducing of the information on respective optical disks can be compatibly conducted. Specifically, as a combination of n1, n2 and n3, any one of (n1, n2, n3)=(2, 1, 1), (4, 3, 2), (6, 4, 3), (8, 5, 4), (10, 6, 5) may be selected.

Hereupon, in the case of the optical pickup apparatus in which the recording reproducing optical system by which the recording reproducing of the information on 2 kinds of optical disks of the high density DVD and DVD can be compatibly conducted by an objective lens is mounted, as a combination of n1 and n2, when any one of (n1, n2)=(2, 1), (3, 2), (4, 2), (5, 3), (6, 4), (7, 4), (8, 5), (9, 6), (10, 6) is selected, the high diffraction efficiency can be maintained to respective wavelength ranges from the semiconductor laser 11 and semiconductor laser 31, and the light amount loss can be suppressed.

Hereupon, almost concentric ring-shaped diffractive pattern may also be provided on the surface of the hybrid refractive-diffractive coupling lens 60 side of the hybrid refractive-diffractive objective lens 70, or it may also be provided on both of the surface of the hybrid refractive-diffractive coupling lens 60 side and the surface of the optical disk side. Further, the diffraction pattern of the hybrid refractive-diffractive objective lens 70 is defined as almost concentric rings to the optical axis, however, the diffraction pattern other than this, may also be provided. Further, the hybrid refractive-diffractive objective lens 70 has a flange portion 50 having a surface vertically extending to the optical axis, and by this flange portion 50, the hybrid refractive-diffractive objective lens 70 can be accurately attached to the optical pickup apparatus 1".

The hybrid refractive-diffractive coupling lens 60 is a collimator lens which converts the divergent light fluxes from the semiconductor laser 11 and semiconductor laser 31 into the parallel light fluxes parallel to the optical axis, and is a plastic lens. In this connection, as the hybrid refractive-diffractive coupling lens 60, a lens by which the divergent angle of the divergent light flux from the semiconductor laser 11 and the semiconductor laser 31 is more reduced, or a lens by which the divergent light flux from the semiconductor laser 11 and the semiconductor laser 31 is converted into a convergent light flux, may also be used. Further, a lens by which the divergent light flux from the semiconductor laser 11 is converted into the parallel light flux, and the divergent angle of the divergent light flux from the semiconductor 31 is more reduced, may also be allowable, or a lens by which the divergent light flux from the semiconductor laser 11 is converted into the parallel light flux, and the divergent light flux from the semiconductor 31 is converted into the convergent light flux, may also be allowed. Or, a lens by which the divergent light flux from the semiconductor laser 31 is converted into the parallel light flux, and the divergent angle of the divergent light flux from the semiconductor 11 is more reduced, may also be allowable, or a lens by which the divergent light flux from the semiconductor laser 31 is converted into the parallel light flux, and the divergent light flux from the semiconductor 11 is converted into the convergent light flux, may also be allowed. Alternatively, in the semiconductor laser 11 and the semiconductor laser 31, a lens by which the divergent angle of the divergent light flux from one hand semiconductor laser is more reduced, and the divergent light flux from the other semiconductor laser is converted into the convergent light flux, may also be allowable.

Further, almost concentric ring-shaped diffractive pattern is provided on the surface of the hybrid refractive-diffractive objective lens 70 side of the hybrid refractive-diffractive coupling lens 60. Then, the diffraction pattern of the hybrid refractive-diffractive coupling lens 60 is designed so as to satisfy the formula (PD2<0, PD2 is a diffractive power ($mm^{-1}$) as a diffractive lens), and because, to the diffraction order (n1' is defined) of the diffracted ray having the maximum diffraction efficiency in the diffracted ray generated when the light flux emitted from the semiconductor laser 11 is incident, the diffraction order (n2' is defined) of the diffracted ray having the maximum diffraction efficiency in the diffracted ray generated when the light flux emitted from the semiconductor laser 31 is incident, is determined so as to be lower order, the high diffraction efficiency can be maintained to the wavelength ranges of respective semiconductor lasers, and the divergent light fluxes from respective semiconductor lasers can be collimated onto the hybrid refractive-diffractive objective lens 70 under the condition that the light amount loss is suppressed small.

Specifically, as a combination of n1' and n2', any one of (n1', n2')=(2, 1), (3, 2), (4, 2), (5, 3), (6, 4), (7, 4), (8, 5), (9, 6), (10, 6), may be selected.

Hereupon, in the case where the hybrid refractive-diffractive coupling lens 60 is arranged in the optical path through which the light fluxes from the semiconductor laser 11, semiconductor laser 31, and semiconductor laser 32 pass together, (in FIG. 46, in the optical path between the polarizing beam splitter 42 and the hybrid refractive-diffractive objective lens 70), when the diffraction order of the diffracted ray having the maximum diffraction efficiency in the diffracted ray generated when the light flux emitted from the semiconductor laser 32is incident, is n3', as a combination of n1', n2' and n3', when any one of (n1', n2', n3')=(2, 1, 1), (4, 3, 2), (6, 4, 3), (8, 5, 4), (10, 6, 5) is selected, the high diffraction efficiency can be maintained to respective wavelength regions from the semiconductor laser 11, semiconductor laser 31, and semiconductor laser 32, and the light amount loss can be suppressed.

In this connection, the almost concentric ring-shaped diffractive pattern may also be provided on the surface of the semiconductor laser 11 side of the hybrid refractive-diffractive coupling lens 60, or may also be provided on both of the surface of the semiconductor laser 11 side and the surface of the hybrid refractive-diffractive objective lens 70 side. Further, the diffraction pattern of the hybrid refractive-diffractive coupling lens 60 is defined as almost concentric rings to the optical axis, however, the diffraction pattern other than this may also be provided.

After the divergent light flux emitted from the semiconductor laser 11 passes through the polarizing beam splitter 12, it is made the parallel light flux by the hybrid refractive-diffractive coupling lens 60, and after passing through the polarizing splitter 42 and a stop, not shown, it becomes a spot converged on the information recording surface 23b through the protective layer 23a of the first optical disk 23 by the hybrid refractive-diffractive objective lens 70. The hybrid refractive-diffractive objective lens 70 is focus-controlled and tracking-controlled by an actuator 2 arranged in its periphery.

After the reflected light flux modulated by the information pit on the information recording surface 23b passes again through the hybrid refractive-diffractive objective lens 70, stop, polarizing beam splitter 42, it is made a convergent light flux by the hybrid refractive-diffractive coupling lens 60, and converged on the light receiving surface of the photo-detector 19. Then, by using the output signal of the photo-detector 19, the information recorded on the first optical disk 23 can be read.

Further, after the divergent light flux emitted from the semiconductor laser 31 is reflected by the polarizing beam splitter 12, and it is made the parallel light flux by the hybrid refractive-diffractive coupling lens 60 after passes through the polarizing beam splitter 42 and a stop, not shown, it becomes a spot converged on the information recording surface 21b through the protective layer 21a of the second optical disk 21 by the hybrid refractive-diffractive objective lens 70. The hybrid refractive-diffractive objective lens 70 is focus-controlled and tracking-controlled by the actuator 2 arranged in its periphery.

After the reflected light flux modulated by the information pit on the information recording surface 21b passes again through the hybrid refractive-diffractive objective lens 70, stop, polarizing beam splitter 42, it is made a convergent light flux by the hybrid refractive-diffractive coupling lens 60, it is reflected by the polarizing beam splitter 12, and converged on the light receiving surface of the photo-detector 19'. Then, by using the output signal of the photo-detector 19', the information recorded on the second optical disk 21 can be read.

In the present embodiment, because the hybrid refractive-diffractive objective lens 70 is a plastic lens structure in one element in one group, by the heat radiation from the actuator 2 or the rise of the environmental temperature, when the temperature of the hybrid refractive-diffractive objective lens 70 is risen, it changes to the direction in which the refractive index is reduced, and its spherical aberration changes to the over-corrected direction. On the one hand, the hybrid refractive-diffractive coupling lens 60 is a plastic lens, and because its refractive power satisfies the formula (PR2>0, where PR2 is a refractive power (mm$^{-1}$) as a refractive lens), when the temperature of the hybrid refractive-diffractive coupling lens 60 is risen by the heat radiation from the actuator 2 or the environmental temperature rise, it changes to the direction in which the refractive index is reduced, and the light flux emitted from the hybrid refractive-diffractive coupling lens 60 becomes the convergent light flux. Because this corresponds to the fact that the lateral magnification of the hybrid refractive-diffractive objective lens 70 is decreased, by this change of the lateral magnification, in the hybrid refractive-diffractive objective lens 70, the spherical aberration changes to the under-corrected direction. Because the refractive power and the diffraction power of the hybrid refractive-diffractive coupling lens 60 are determined in such a manner that the spherical aberration change to the over-corrected direction by the temperature change and the spherical aberration change to the under-corrected direction by the lateral magnification change of the hybrid refractive-diffractive objective lens 70 are just cancelled, when the light flux emitted from the semiconductor laser 11 and the semiconductor laser 31 passes through the hybrid refractive-diffractive coupling lens 60 and hybrid refractive-diffractive objective lens 70, even when the temperature changes, the light is converged on respective information recording surfaces of the first optical disk 23 and the second optical disk 21 almost without the spherical aberration.

Further, when the hybrid refractive-diffractive objective lens 70 is provided with an almost concentric ring-shaped diffractive pattern satisfying the above formula (PD1>0) on the optical surface, to the oscillation wavelength of the semiconductor laser 11 and semiconductor 31, the axial chromatic aberration which is an inverse sign and its absolute value almost coincides with the axial chromatic aberration generated in the diffraction pattern of the hybrid refractive-diffractive coupling lens 60, is generated. Therefore, the light fluxes emitted from the semiconductor laser 11 and the semiconductor laser 31 are converged on respective information recording surfaces of the first optical disk 23 and the second optical disk 21 almost without axial chromatic aberration when they pass through the hybrid refractive-diffractive coupling lens 60 and the hybrid refractive-diffractive objective lens 70.

Further, after the divergent light flux emitted from the semiconductor laser 32is reflected by the polarizing beam splitter 42, it passes through a stop, not shown, and by the hybrid refractive-diffractive objective lens 70, it becomes a spot converged on the information recording surface 22b through the protective layer 22a of the third optical disk 22. The hybrid refractive-diffractive objective lens 70 is focus-controlled and tracking-controlled by the actuator 2 arranged in its periphery.

After the reflected light flux modulated by the information pit on the information recording surface 22b, passes again through the hybrid refractive-diffractive objective lens 70 and a stop, it is reflected by the polarizing beam splitter 42, and converged on the light receiving surface of the optical detector 19". Then, by using the output signal of the optical detector 19", the information recorded on the third optical disk 22 can be read.

The optical pickup apparatus 1" as shown in FIG. 46, can be mounted in a player or drive, or an AV device in which they are assembled, personal computer, a recording and/or reproducing apparatus of an audio and/or image of the other information terminal equipment, for example, which is compatible with the optical information recording medium such as each kind of CDs, such as CD, CD-R, CD-RW, CD-video, CD-ROM, each kind of DVDs such as DVD, DVD-ROM, DVD-RAM, DVD-R, DVD-RW, DVD+RW, and an MD.

Further, in the recording reproducing optical system of the present embodiment, the high density DVD for which the blue violet semiconductor laser is used as the light source for the recording reproducing, is defined as an optical disk in which the thickness of the protective layer is 0.6 mm, and the numerical aperture of the objective lens is almost 0.65, however, even when it is an optical disk (for example, the optical disk of the Blue-ray disk standard disclosed on February 2002) as the high density DVD in which the thickness of the protective layer is 0.1 mm, and the numerical aperture of the objective lens is almost 0.85, it is needless to say that the technology according to the present invention can be applied.

EXAMPLE

The present invention will be more specifically described below by the Examples 1 to 8, however, the present invention is not limited to these examples. In this connection, when the optical axis direction is X axis, the height in the direction vertical to the optical axis is h, and the radius of curvature of the refractive surface is r, the aspheric surface in each lens of the present example is shown by the following Arith. 1. Where, $\kappa$ is a conical coefficient, and $A_{2i}$ is an asheric surface coefficient.

$$X = \frac{h^2/r}{1 + \sqrt{1 - (1+\kappa)h^2/r^2}} + \sum_{i=2} A_{2i} h^{2i} \quad [\text{Arith. 1}]$$

Further, the ring-shaped zone-like diffractive structure provided on the objective lens of the present example can be expressed by the above expression (A) when the optical path difference function is made $\Phi_b$, and further, the ring-shaped zone-like diffractive structure provided on each aberration correcting optical element can be expressed by the above expression (B) when the optical path difference function is made $\Phi_b$.

Example 1

The Example 1 is a recording reproducing optical system appropriate for the optical pick-up apparatus in FIG. 2. The present example is an optical system in which the hybrid refractive-diffractive collimator lens and the hybrid refractive-diffractive objective lens are combined, and as the hybrid refractive-diffractive collimator lens, the plastic lens of one lens in one group composition of the focal distance 8 mm, NA 0.28 is used, and as the hybrid refractive-diffractive objective lens, the plastic lens of one lens in one group composition of the focal distance 2.2 mm, NA 0.85 is used. Then, the surface of the optical disk side of the hybrid refractive-diffractive collimator lens is the diffractive surface having the negative diffracting power, and the surface of the semiconductor laser side of the hybrid refractive-diffractive objective lens is the diffractive surface having the positive diffracting power. In Table 1, the data relating to the recording reproducing optical system of the Example 1 will be shown.

TABLE 1

| surface No. | r (mm) | d (mm) | N$\lambda$ | $\nu$d | Note |
|---|---|---|---|---|---|
| 0 | | 6.8314 | | | *1 |
| 1 | 22.1156 | 2.0000 | 1.52469 | 56.5 | *2 |
| 2 | −4.3868 | 10.0000 | | | |
| 3 | 1.5943 | 3.2000 | 1.52491 | 56.5 | *3 |
| 4 | −1.4072 | 0.4059 | | | |
| 5 | ∞ | 0.1000 | 1.61949 | 30.0 | *4 |
| 6 | ∞ | | | | |

| Aspheric surface coefficient | | | | |
|---|---|---|---|---|
| | first surface | second surface | third surface | fourth surface |
| $\kappa$ | −1.70020E+01 | −8.75470E−01 | −7.00150E−01 | −3.68897E+01 |
| A4 | −3.13030E−05 | −1.59370E−04 | 5.73480E−03 | 2.34529E−01 |
| A6 | | | 1.62780E−03 | −4.06108E−01 |
| A8 | | | 1.73310E−04 | 3.24212E−01 |
| A10 | | | 1.43140E−04 | −1.05497E−01 |
| A12 | | | −5.76550E−05 | 5.53253E−05 |
| A14 | | | −7.43870E−07 | |
| A16 | | | 5.59960E−06 | |
| A18 | | | −7.34190E−07 | |
| A20 | | | −1.04210E−07 | |

| Diffractive surface coefficient | | | |
|---|---|---|---|
| | first surface | second surface | third surface |
| b2 | 3.87370E−03 | 4.12640E−03 | −2.30000E−02 |
| b4 | | −6.24970E−05 | −3.15710E−03 |
| b6 | | | 2.28830E−04 |
| b8 | | | 2.54720E−05 |
| b10 | | | −3.06440E−05 |

Figure 4:
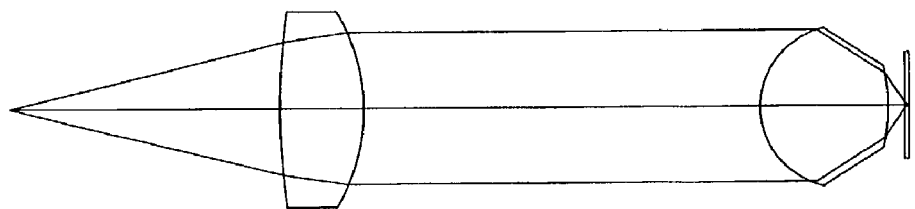
FIG. 4 is an optical path view of the recording reproducing optical system of Example 1.
Figure 5:
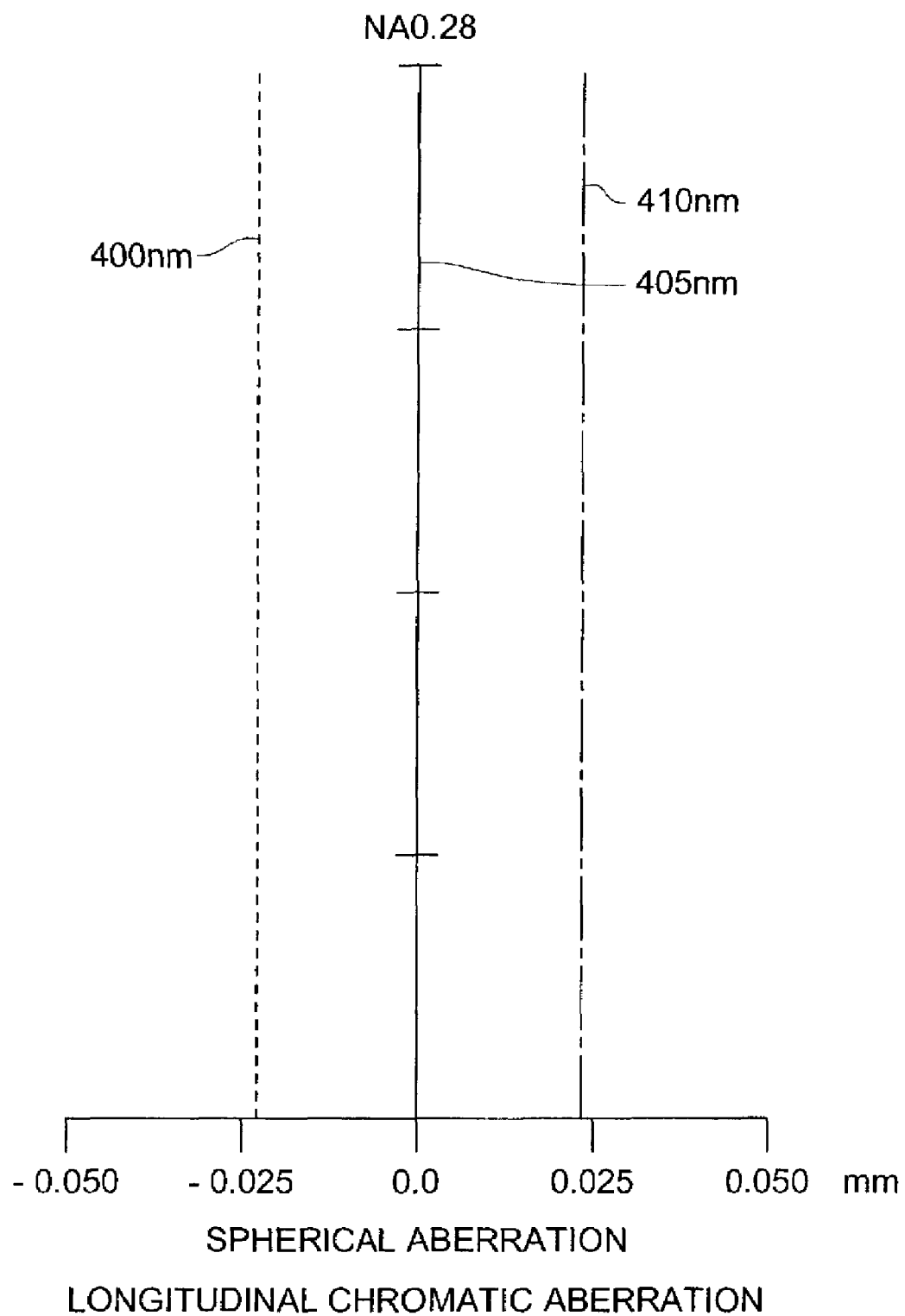
FIG. 5 is a graph showing the spherical aberration and longitudinal chromatic aberration in the wavelength 405±5 nm of a hybrid refractive-diffractive collimator lens of Example 1.
Figure 6:
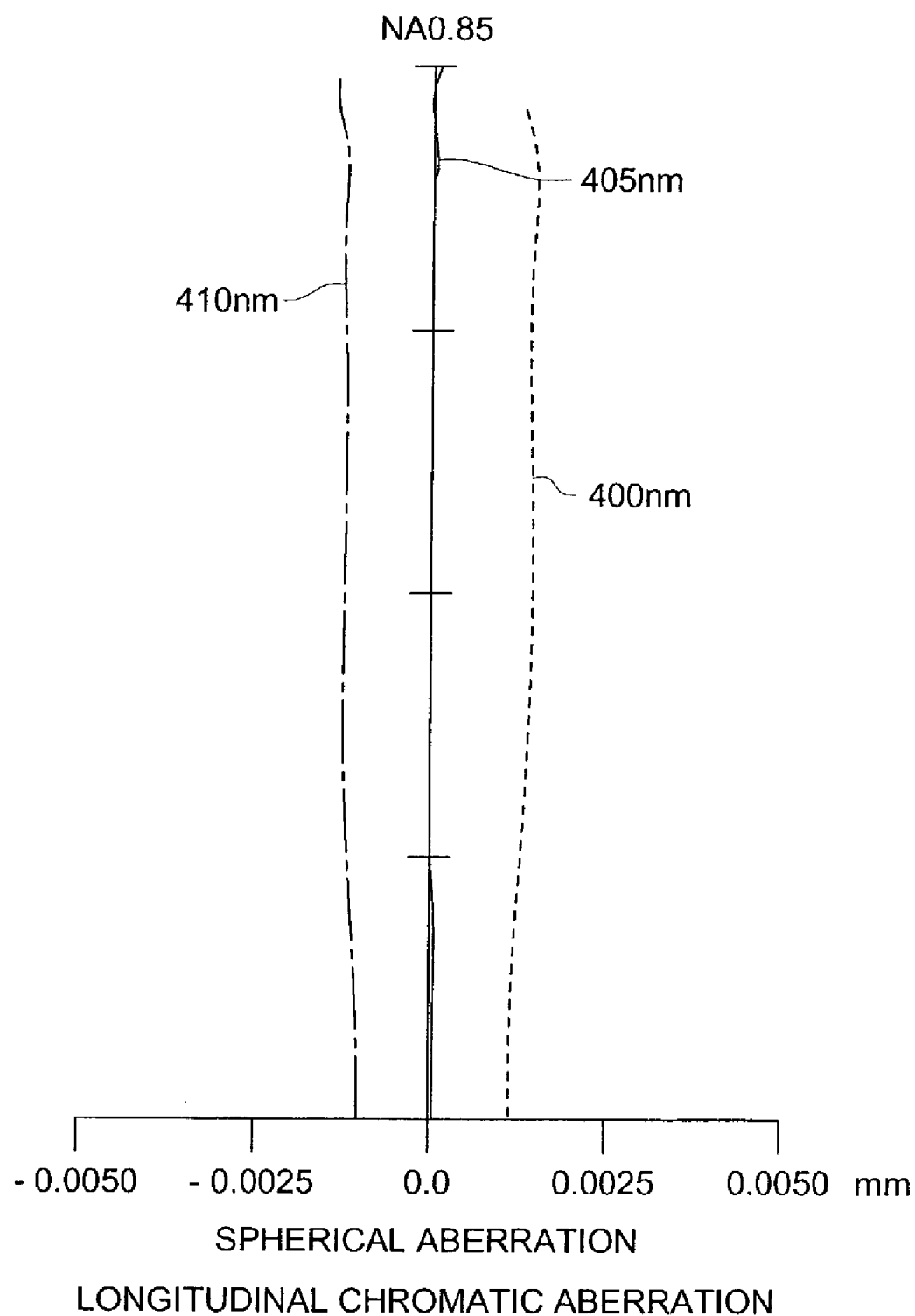
FIG. 6 is a graph showing the spherical aberration and longitudinal chromatic aberration in the wavelength 405±5 nm of a hybrid refractive-diffractive objective lens of Example 1.
Figure 7:
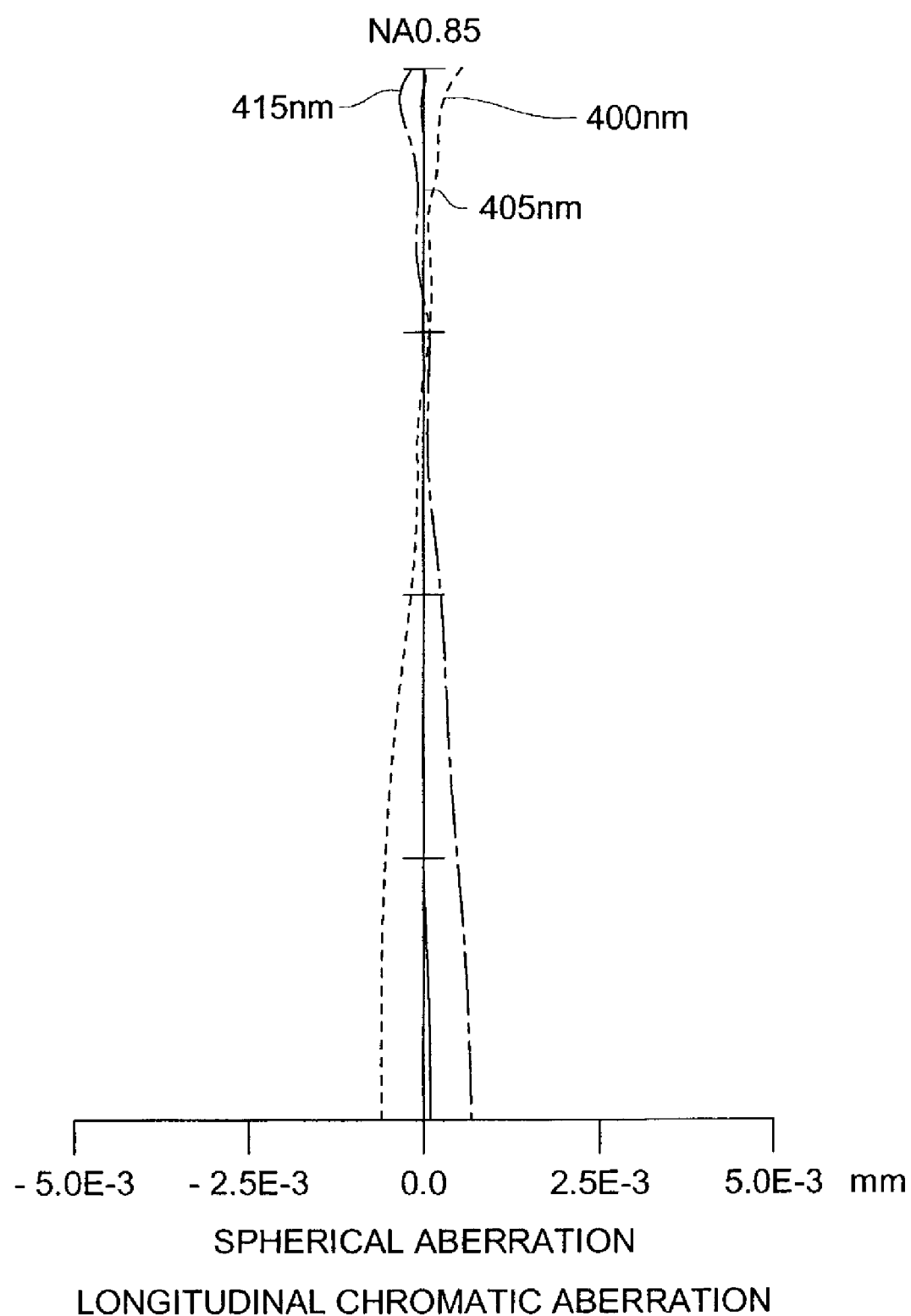
FIG. 7 is a graph showing the spherical aberration and longitudinal chromatic aberration in the wavelength 405±5 nm of the recording reproducing optical system in which the hybrid refractive-diffractive collimator lens and the hybrid refractive-diffractive objective lens of the Example 1 are combined.

Note:
*1: light source
*2: collimator lens
*3: objective lens
*4: protective layer In FIG. 4, the optical path view of the recording reproducing optical system of Example 1 will be shown. FIG. 5 is a graph showing the spherical aberration and longitudinal chromatic aberration at the wavelength 405±5 nm of the hybrid refractive-diffractive collimator lens of the present example, FIG. 6 is a graph showing the spherical aberration and longitudinal chromatic aberration at the wavelength 405±5 nm of the hybrid refractive-diffractive objective lens of the present example, and FIG. 7 is a graph showing the spherical aberration and longitudinal chromatic aberration at the wavelength 405±5 nm of the recording reproducing optical system in which the hybrid refractive-diffractive collimator lens and the hybrid refractive-diffractive objective lens are combined.

From FIG. 5, it is seen that, in the hybrid refractive-diffractive collimator lens of the present example, when the wavelength of the incident ray is changed to the long wavelength side, the focal point position is moved to the over side, and the wavelength of the incident ray is changed to the short wavelength side, the focal point position is moved to the under side. Further, from FIG. 6, it is seen that, in the hybrid refractive-diffractive objective lens of the present example, when the wavelength of the incident ray is changed to the long wavelength side, the focal point position is moved to the under side, and the wavelength of the incident ray is changed to the short wavelength side, the focal point position is moved to the over side. Further, from FIG. 7, it is seen that, in the recording reproducing optical system in which the hybrid refractive-diffractive collimator lens and the hybrid refractive-diffractive objective lens are combined, the focal point position is hardly changed in spite of the wavelength.

Figure 8:
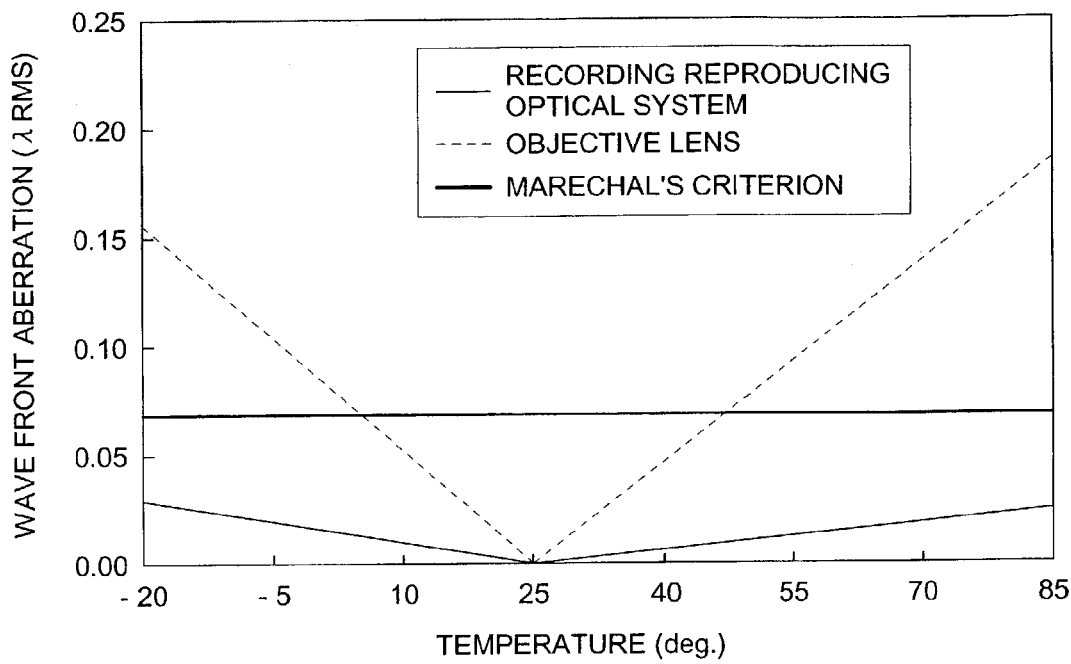
FIG. 8 is a view showing the temperature characteristic of the recording reproducing optical system of Example 1.

In FIG. 8, the temperature characteristic of the recording reproducing optical system of Example 1 is shown. As can be seen from FIG. 8, even in the case of the high NA plastic objective lens of one lens in one group in which, in a single body, the operable temperature range is −10 to 40° C. which is very narrow, when it is combined with the hybrid refractive-diffractive collimator lens, the good light converging characteristic can be maintained in the temperature range of −20 to +85° C.

In this connection, when the wave front aberration at the temperature change is calculated, the refractive index change (the changing rate is $-1.1 \times 10^{-4}/°$ C.) of the plastic lens to the temperature change and the wavelength change of the blue violet semiconductor laser (its changing rate is +0.05 nm/° C.) are considered, and because the influence of the shape change of the plastic lens on the change of the wave front aberration is very small comparing to the refractive index change, the shape change of the plastic lens is not considered. The condition when the wave front aberration at the above-described temperature change is calculated, is the same also in the examples 2 to 7 which will be described later.

Figure 9:
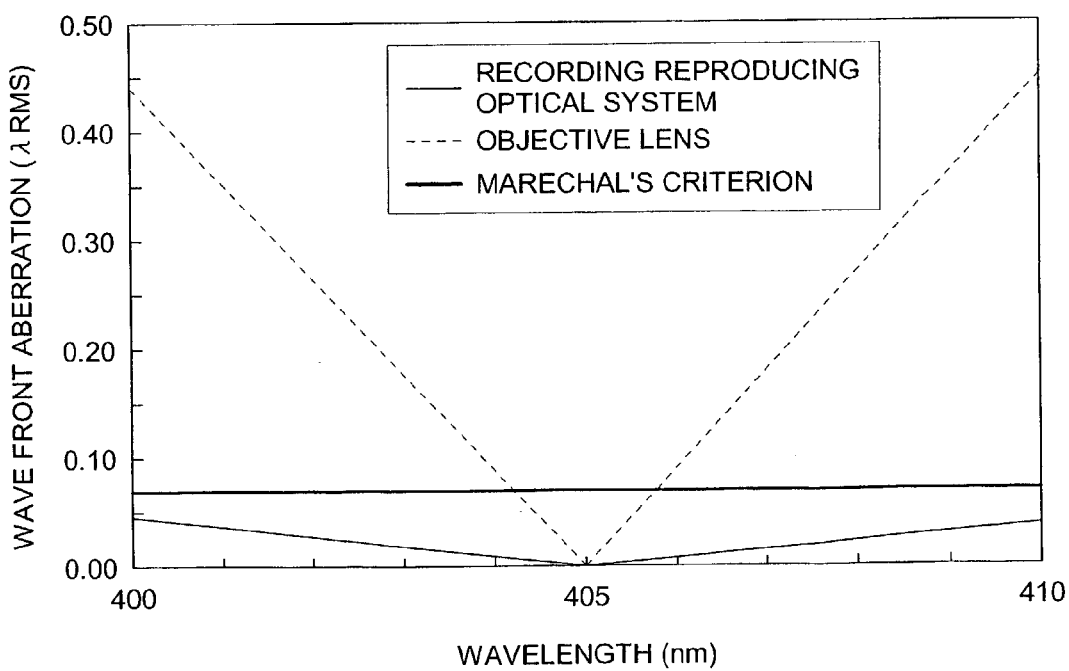
FIG. 9 is a view showing the wavelength characteristic of the recording reproducing optical system of Example 1.

In FIG. 9, the wavelength characteristic of the recording reproducing optical system of Example 1 is shown. It can be seen that, although, in the blue violet semiconductor laser, the wavelength is changed by 1 to 2 nm by the mode hopping, even the objective lens which, in a single body, by the wavelength change of 2 nm, largely exceeds the Marechal's criterion of 0.07 λ rms, when it is combined with the hybrid refractive-diffractive collimator lens, the good light converging characteristic can be maintained even when the wavelength is changed by 2 nm.

In this connection, in the case where the wave front aberration when the wavelength is changed by the mode hopping, is calculated, because the focusing of the objective lens is not conducted, the objective lens is fixed at the best image point position in 405 nm, and the wave front aberration in FIG. 9 includes the de-focus component by the movement of the best image point position. The condition in the case where the wave front aberration is calculated when the wavelength change by the above-described mode hopping occurs is the same also in examples 2 to 7 which will be described later.

Example 2

Example 2 is an optical system in which a diffraction integrated beam expander as the aberration correcting optical element and the hybrid refractive-diffractive objective lens are combined, and as the diffraction integrated beam expander, the plastic lens of two lenses in two groups composition of an entrance pupil diameter 3.16 mm, exit pupil diameter 4.50 mm, and angle magnification 1.47, is used, and as the hybrid refractive-diffractive objective lens, the plastic lens of one lens in one group composition of the focal distance 2.2 mm, and NA 0.85 is used. Then, both surfaces of the positive lens of the diffraction integrated beam expander are the diffractive surfaces having the negative diffracting power, and both surfaces of the hybrid refractive-diffractive objective lens are the diffractive surfaces having the positive diffracting power. In Table 2, the data relating to the recording reproducing optical system of Example 2 is shown.

TABLE 2

| surface No. | r (mm) | d (mm) | Nλ | νd | Note |
|---|---|---|---|---|---|
| 0 | ∞ | | | | *1 |
| 1 | −14.6582 | 1.0000 | 1.52491 | 56.5 | *2 |
| 2 | 6.9680 | 2.7535 | | | |
| 3 | 21.5525 | 1.8000 | 1.52491 | 56.5 | |
| 4 | −5.0607 | 10.0000 | | | |
| 5 | 1.7316 | 3.2700 | 1.52491 | 56.5 | *3 |
| 6 | −1.8541 | 0.4254 | | | |
| 7 | ∞ | 0.1000 | 1.61949 | 30.0 | *4 |
| 8 | ∞ | | | | |

| Aspheric surface coefficient | | | |
|---|---|---|---|
| | 1st surface | 2nd surface | 3rd surface |
| κ | 6.02232E+00 | −6.13661E+00 | 6.12260E+00 |
| A4 | −2.34616E−04 | 3.25639E−04 | −1.37260E−04 |
| A6 | | | |
| A8 | | | |
| A10 | | | |
| A12 | | | |
| A14 | | | |
| A16 | | | |
| A18 | | | |
| A20 | | | |

| | 4-th surface | 5-th surface | 6-th surface |
|---|---|---|---|
| κ | −3.42170E−01 | −6.56420E−01 | −6.64430E+01 |
| A4 | 3.56160E−04 | 6.41290E−03 | 2.57010E−01 |
| A6 | | 7.70850E−04 | −3.92280E−01 |
| A8 | | −1.14780E−04 | 3.25320E−01 |
| A10 | | 2.10380E−04 | −1.12520E−01 |
| A12 | | −3.51540E−05 | 5.53250E−05 |
| A14 | | −2.78870E−07 | |
| A16 | | 3.58030E−06 | |
| A18 | | −8.40940E−07 | |
| A20 | | 3.59040E−08 | |

| Diffractive surface coefficient | | | |
|---|---|---|---|
| | 3rd surface | 4-th surface | 5-th surface | 6-th surface |
|---|---|---|---|---|
| b2 | 1.33800E−02 | 1.24090E−02 | −3.00000E−02 | −6.50000E−02 |
| b4 | | | −1.36890E−03 | −1.48810E−02 |
| b6 | | | −1.73920E−04 | −1.15200E−03 |
| b8 | | | 3.06390E−05 | |
| b10 | | | 1.90120E−05 | |

Figure 10:
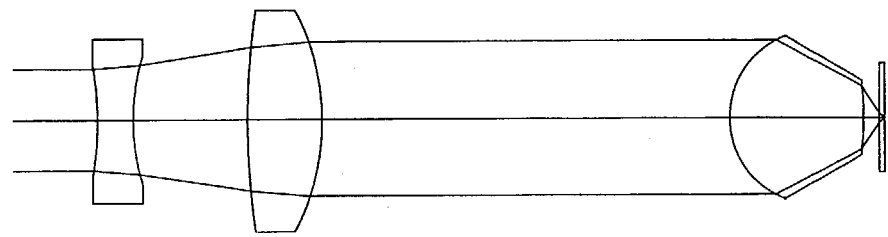
FIG. 10 is an optical path view of the recording reproducing optical system of Example 2.
Figure 11:
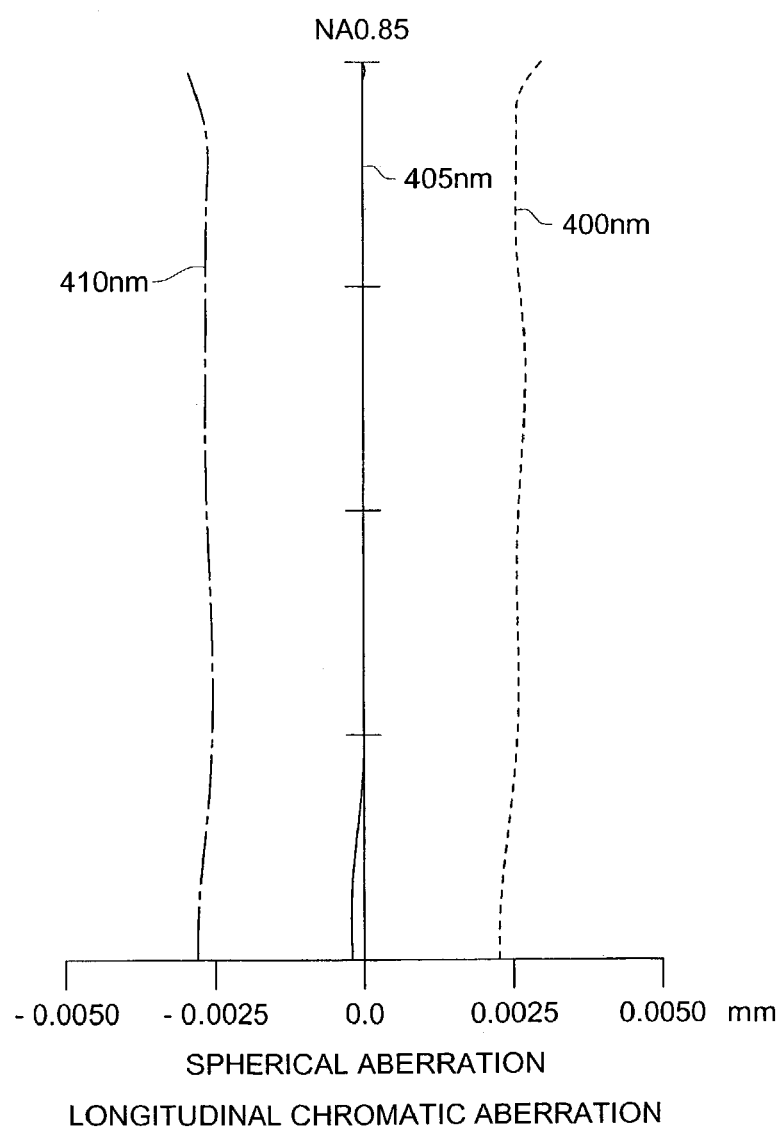
FIG. 11 is a graph showing the spherical aberration and longitudinal chromatic aberration in the wavelength 405±5 nm of the hybrid refractive-diffractive objective lens of Example 2.
Figure 12:
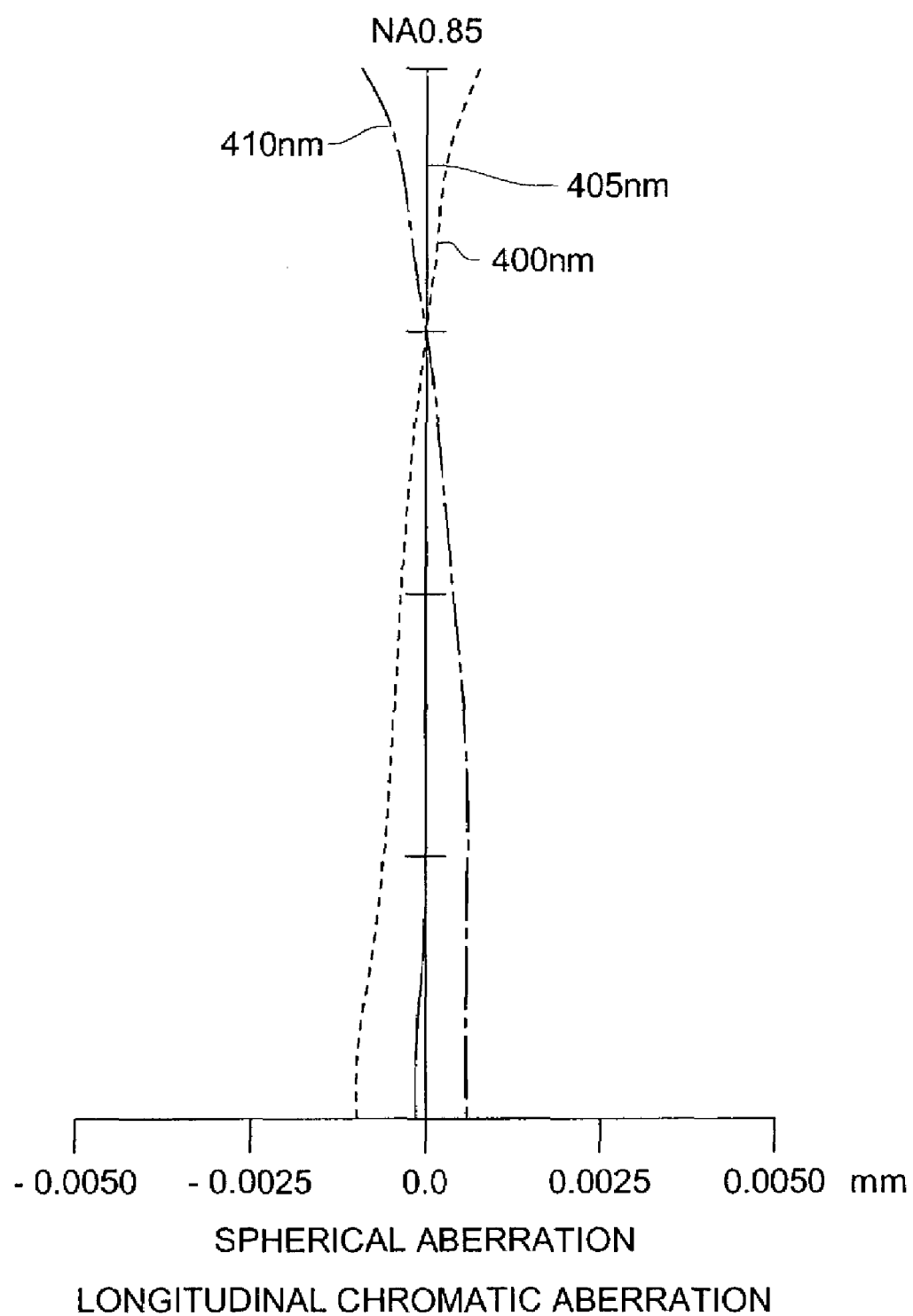
FIG. 12 is a graph showing the spherical aberration and longitudinal chromatic aberration in the wavelength 405±5 nm of the recording reproducing optical system in which the diffraction integrated beam expander of Example 2 and the hybrid refractive-diffractive objective lens are combined.

Note:
*1: light source
*2: beam expander
*3: objective lens
*4: protective layer In FIG. 10, the optical path view of the recording reproducing optical system of Example 2 is shown. FIG. 11 is a graph showing the spherical aberration and longitudinal chromatic aberration in wavelength 405±5 nm of the hybrid refractive-diffractive objective lens of the present example, and FIG. 12 is a graph showing the spherical aberration and longitudinal chromatic aberration in wavelength 405±5 nm of the recording reproducing optical system in which the diffraction integrated beam expander and the hybrid refractive-diffractive objective lens are combined.

From FIG. 11, it can be seen that, in the hybrid refractive-diffractive objective lens of the present example, when the wavelength of the incident ray is changed to the long wavelength side, the focal point position is moved to the under side, and when the wavelength of the incident ray is changed to the short wavelength side, the focal point position is moved to the over side. Further, from FIG. 12, it can be seen that, in the recording reproducing optical system in which the diffraction integrated beam expander and the hybrid refractive-diffractive objective lens are combined, the focal point position is hardly changed in spite of the wavelength.

Figure 13:
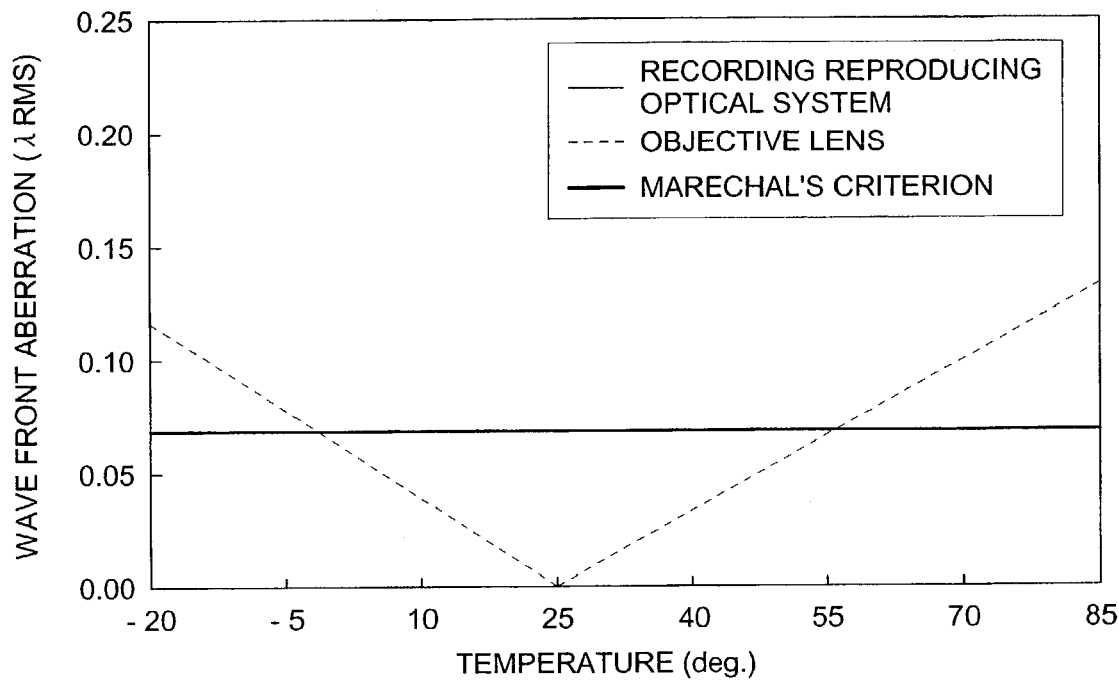
FIG. 13 is a view showing the temperature characteristic of the recording reproducing optical system of Example 2.

In FIG. 13, the temperature characteristic of the recording reproducing optical system of the present example is shown. As can be seen from 13, when the high NA plastic objective lens and diffraction integrated beam expander are combined, the good light converging characteristic can be maintained in the temperature range of −20 to +85° C.

Figure 14:
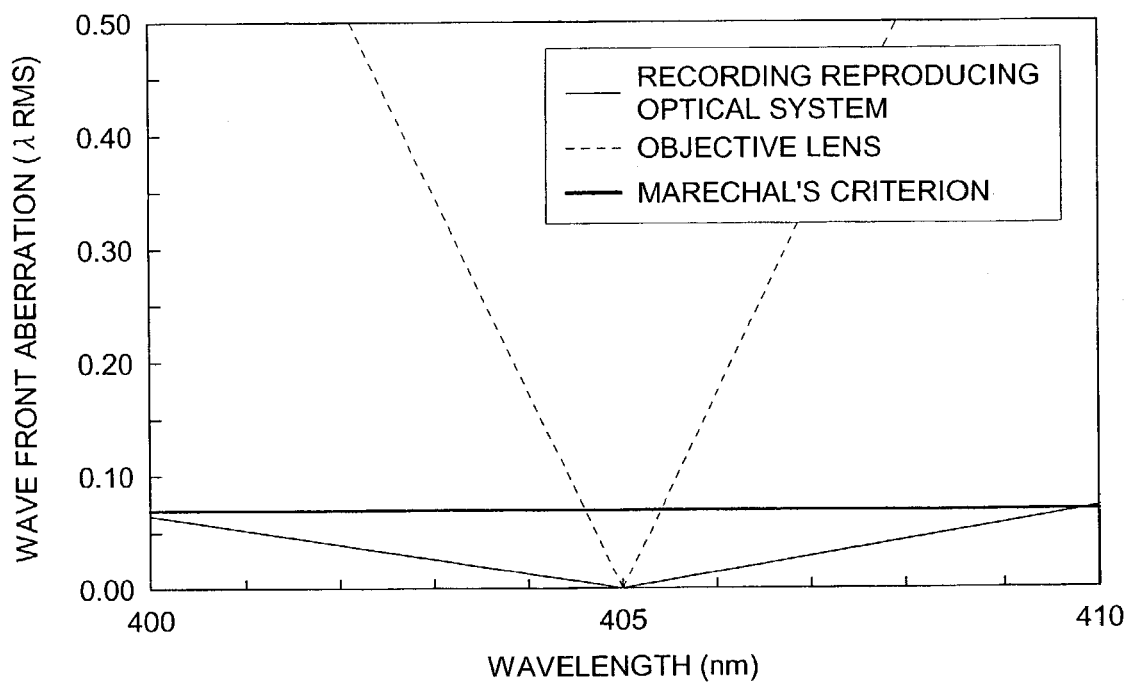
FIG. 14 is a view showing the wavelength characteristic of the recording reproducing optical system of Example 2.

In FIG. 14, the wavelength characteristic of the recording reproducing optical system of the present example is shown. As can be seen from FIG. 14, when the high NA plastic objective lens and diffraction integrated beam expander are combined, even when the wavelength change of 2 nm occurs, the good light converging characteristic can be maintained.

Example 3

Example 3 is an optical system in which the diffraction integrated beam expander as the aberration correcting optical system and the hybrid refractive-diffractive objective lens are combined, and as the diffraction integrated beam expander, the beam expander of two lenses in two groups composition of the entrance pupil diameter 2.47 mm, exit pupil diameter 4.50 mm, and angle magnification 1.84, is used, and as the hybrid refractive-diffractive objective lens, the plastic lens of one lens in one group composition of the focal distance 2.2 mm and NA 0.85, is used. The positive lens of the diffraction integrated beam expander is the plastic lens and the negative lens is a glass lens (made by HOYA co, FD110) whose Abbe's number is smaller than the positive lens. Then, the surface of the optical disk side of the positive lens of the diffraction integrated beam expander is the diffractive surface having the negative diffracting power, and the surface of the semiconductor laser side of the hybrid refractive-diffractive objective lens is the diffractive surface having the positive diffracting power. In Table 3, the data relating to the recording reproducing optical system of Example 3 is shown.

TABLE 3

| surface No. | r (mm) | d (mm) | Nλ | vd | Note |
| --- | --- | --- | --- | --- | --- |
| 0 | ∞ | | | | *1 |
| 1 | −4.9735 | 1.0000 | 1.84203 | 25.7 | *2 |
| 2 | ∞ | 3.2579 | | | |
| 3 | ∞ | 1.8000 | 1.52469 | 56.5 | |
| 4 | −4.3064 | 10.0000 | | | |
| 5 | 1.5943 | 3.2000 | 1.52491 | 56.5 | *3 |
| 6 | −1.4072 | 0.4059 | | | |
| 7 | ∞ | 0.1000 | 1.61949 | 30.0 | *4 |
| 8 | ∞ | | | | |

| Aspheric surface coefficient | | | |
| --- | --- | --- | --- |
| | 4-th surface | 5-th surface | 6-th surface |
| κ | −6.25720E−01 | −7.00150E−01 | −3.68897E+01 |
| A4 | 2.67860E−05 | 5.73480E−03 | 2.34529E−01 |
| A6 | | 1.62780E−03 | −4.06108E−01 |
| A8 | | 1.73310E−04 | 3.24212E−01 |
| A10 | | 1.43140E−04 | −1.05497E−01 |
| A12 | | −5.76550E−05 | 5.53253E−05 |
| A14 | | −7.43870E−07 | |
| A16 | | 5.59960E−06 | |
| A18 | | −7.34190E−07 | |
| A20 | | −1.04210E−07 | |

TABLE 3-continued

| Diffractive surface coefficient | | |
| --- | --- | --- |
| | 4-th surface | 5-th surface |
| b2 | 1.50000E−02 | −2.30000E−02 |
| b4 | | −3.15710E−03 |
| b6 | | 2.28830E−04 |
| b8 | | 2.54720E−05 |
| b10 | | −3.06440E−05 |

Figure 15:
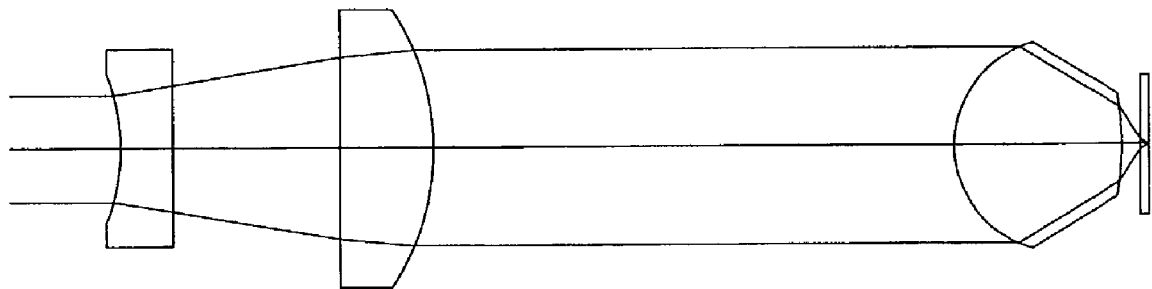
FIG. 15 is a view showing the optical path view of the recording reproducing optical system of Example 3.
Figure 16:
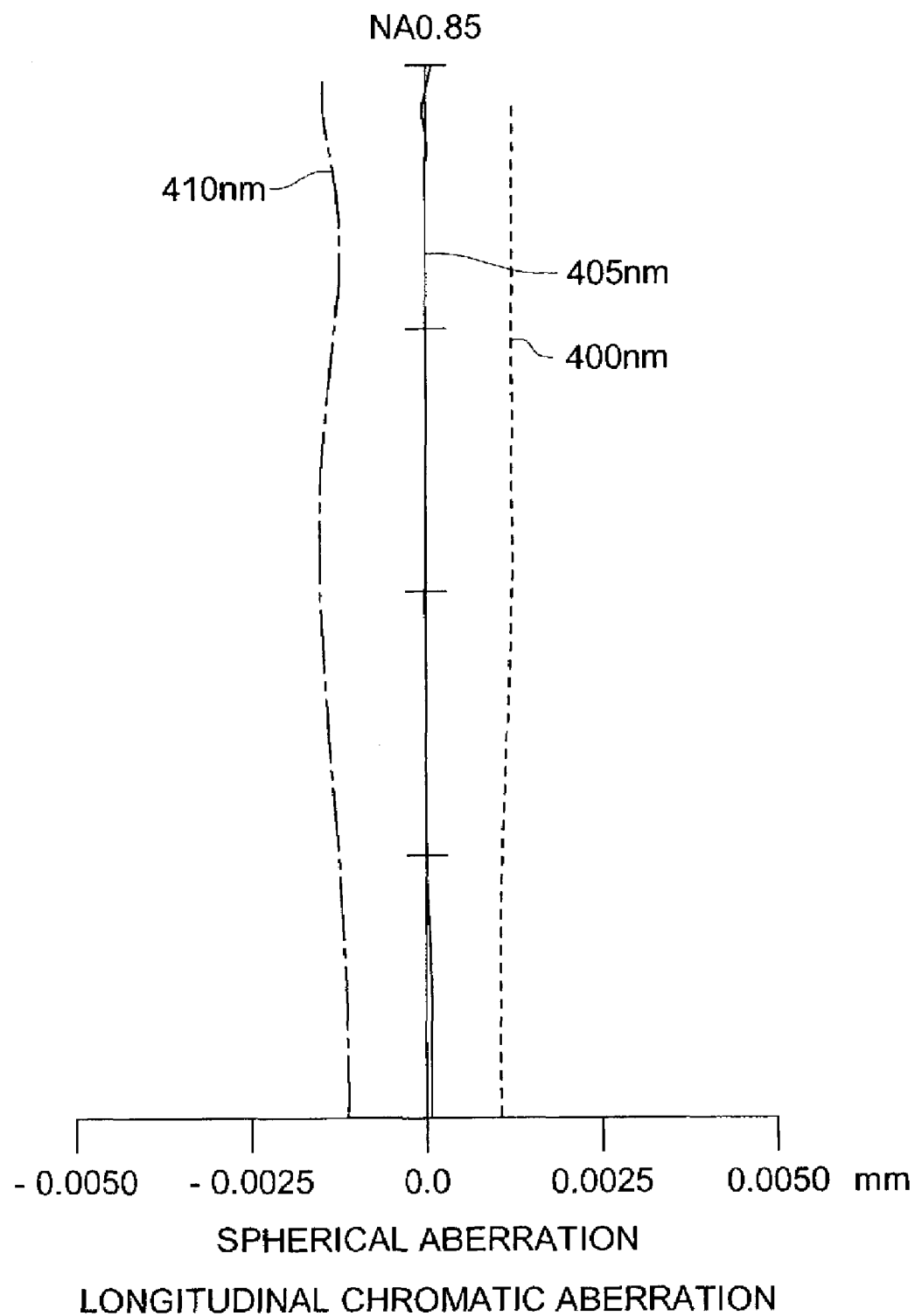
FIG. 16 is a graph showing the spherical aberration and longitudinal chromatic aberration in the wavelength 405±5 nm of the hybrid refractive-diffractive objective lens of Example 3.
Figure 17:
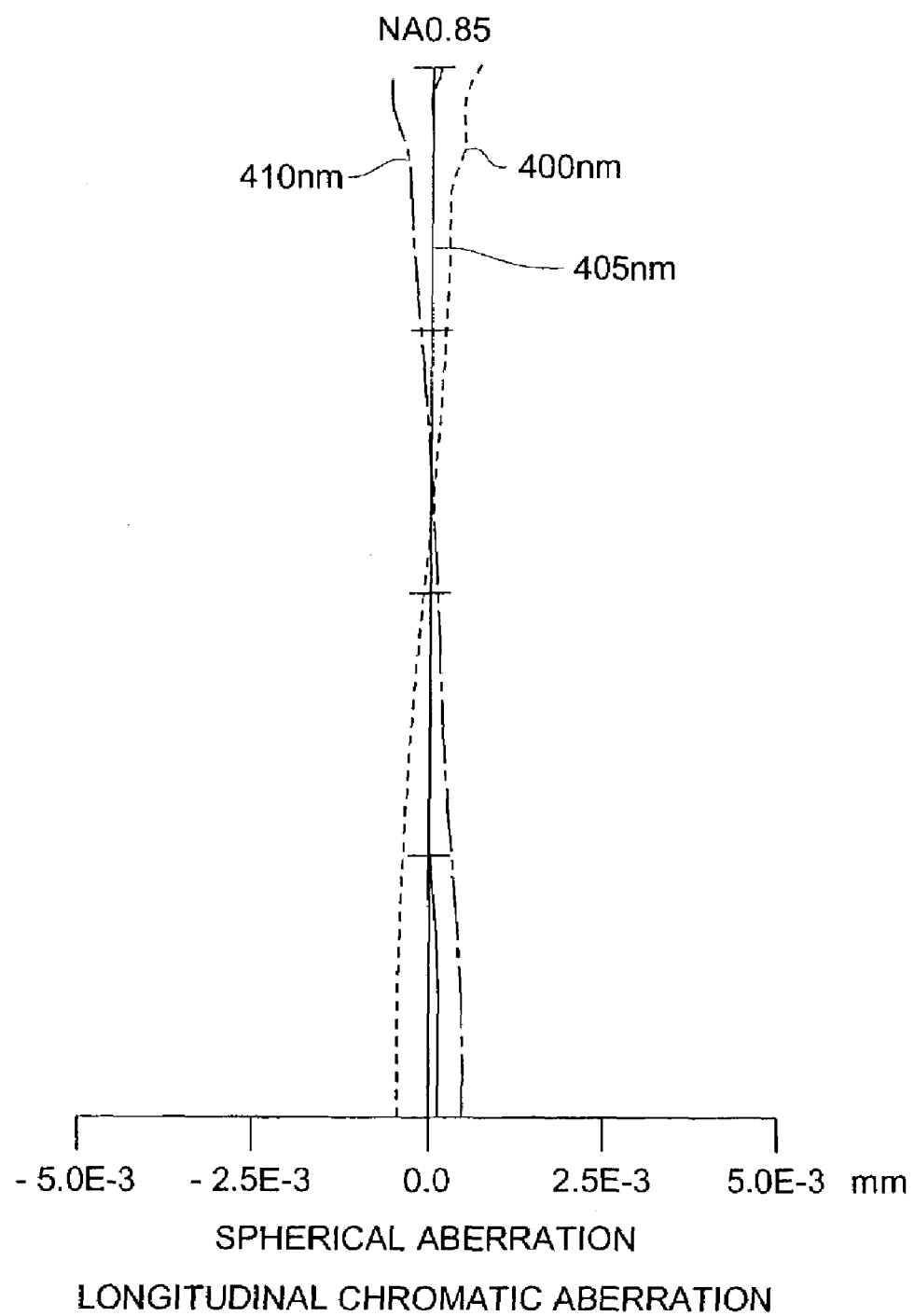
FIG. 17 is a graph showing the spherical aberration and longitudinal chromatic aberration in the wavelength 405±5 nm of the recording reproducing optical system in which the diffraction integrated beam expander of Example 3 and the hybrid refractive-diffractive objective lens are combined.

Note:
*1: light source
*2: beam expander
*3: objective lens
*4: protective layer In FIG. 15, the optical path view of the recording reproducing optical system of Example 3 is shown. FIG. 16 is a graph showing the spherical aberration and longitudinal chromatic aberration in wavelength 405±5 nm of the hybrid refractive-diffractive objective lens of the present example, and FIG. 17 is a graph showing the spherical aberration and longitudinal chromatic aberration in wavelength 405±5 nm of the recording reproducing optical system in which the diffraction integrated beam expander and the hybrid refractive-diffractive objective lens are combined.

From FIG. 16, it can be seen that, in the hybrid refractive-diffractive objective lens of the present example, when the wavelength of the incident ray is changed to the long wavelength side, the focal point position is moved to the under side, and when the wavelength of the incident ray is changed to the short wavelength side, the focal point position is moved to the over side. Further, from FIG. 17, it can be seen that, in the recording reproducing optical system in which the diffraction integrated beam expander and the hybrid refractive-diffractive objective lens are combined, the focal point position is hardly changed in spite of the wavelength.

Figure 18:
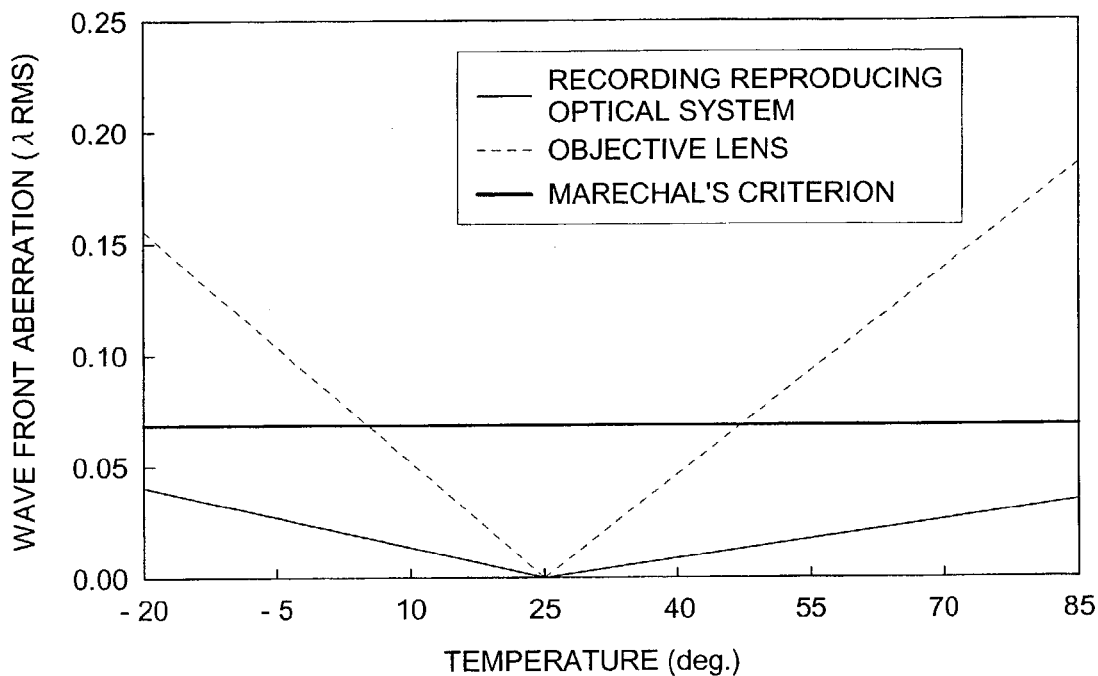
FIG. 18 is a view showing the temperature characteristic of the recording reproducing optical system of Example 3.

In FIG. 18, the temperature characteristic of the recording reproducing optical system of the present example is shown. As can be seen from FIG. 18, when the high NA plastic objective lens and diffraction integrated beam expander are combined, the good light converging characteristic can be maintained in the temperature range of −20 to +85° C.

Figure 19:
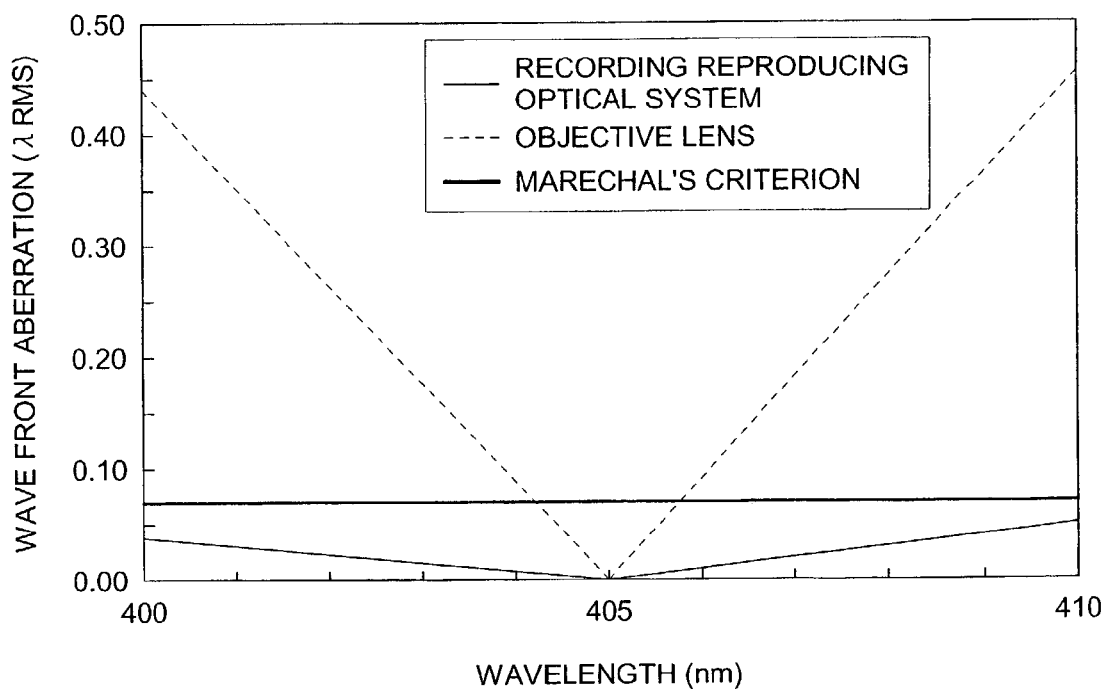
FIG. 19 is a view showing the wavelength characteristic of the recording reproducing optical system of Example 3.

In FIG. 19, the wavelength characteristic of the recording reproducing optical system of the present example is shown. As can be seen from FIG. 19, when the high NA plastic objective lens and diffraction integrated beam expander are combined, even when the wavelength change of 2 nm occurs, the good light converging characteristic can be maintained.

Example 4

Example 4 is an optical system in which the diffraction integrated plastic lens as the aberration correcting optical system and the hybrid refractive-diffractive objective lens are combined, and as the aberration correcting optical element, the plastic lens of one lens in one group composition of the entrance pupil diameter 4.50 mm, exit pupil diameter 4.70 mm, and numerical aperture 0, is used, and as the hybrid refractive-diffractive objective lens, the plastic lens of one lens in one group composition of the focal distance 2.2 mm and NA 0.85, is used. Then, the flat surface of the light source side of the aberration correcting optical element is the diffractive surface having the negative diffracting power, and the surface of the semiconductor laser side of the hybrid refractive-diffractive objective power. In Table 4, the data relating to the recording reproducing optical system of Example 4 is shown.

TABLE 4

| surface No. | r (mm) | d (mm) | Nλ | vd | Note |
|---|---|---|---|---|---|
| 0 | | ∞ | | | *1 |
| 1 | ∞ | 1.5000 | 1.52491 | 56.5 | *2 |
| 2 | −8.0797 | 5.0000 | | | |
| 3 | 1.6893 | 3.0500 | 1.52491 | 56.5 | *3 |
| 4 | −1.7971 | 0.4188 | | | |
| 5 | ∞ | 0.1000 | 1.61949 | 30.0 | *4 |
| 6 | ∞ | | | | |

Aspheric surface coefficient

| | 2nd surface | 3rd surface | 4-th surface |
|---|---|---|---|
| κ | −2.90480E−01 | −6.63850E−01 | −5.74856E+01 |
| A4 | 6.79410E−06 | 9.31590E−03 | 2.36118E−01 |
| A6 | | 7.52060E−04 | −4.12553E−01 |
| A8 | | −3.39780E−05 | −3.36605E−01 |
| A10 | | 1.72060E−04 | −1.12520E−01 |
| A12 | | −5.12150E−05 | 5.53253E−05 |
| A14 | | −1.30990E−06 | |
| A16 | | 5.05470E−06 | |
| A18 | | −6.42060E−07 | |
| A20 | | −8.07010E−08 | |

Diffractive surface coefficient

| | 1st surface | 3rd surface |
|---|---|---|
| b2 | 3.47010E−02 | −4.00000E−02 |
| b4 | | −1.54680E−03 |
| b6 | | −4.14050E−04 |
| b8 | | 6.91250E−05 |
| b10 | | −5.10040E−07 |

Figure 20:
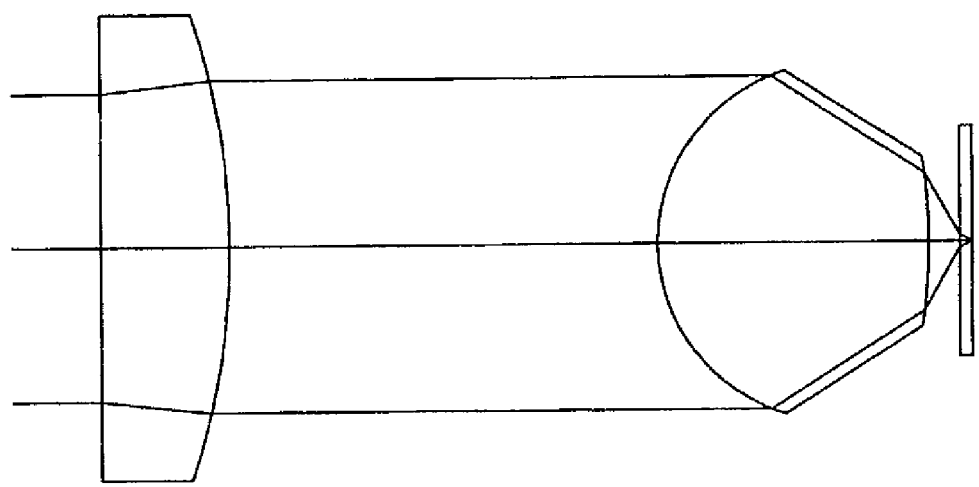
FIG. 20 is a view showing the optical path view of the recording reproducing optical system of Example 4.
Figure 21:
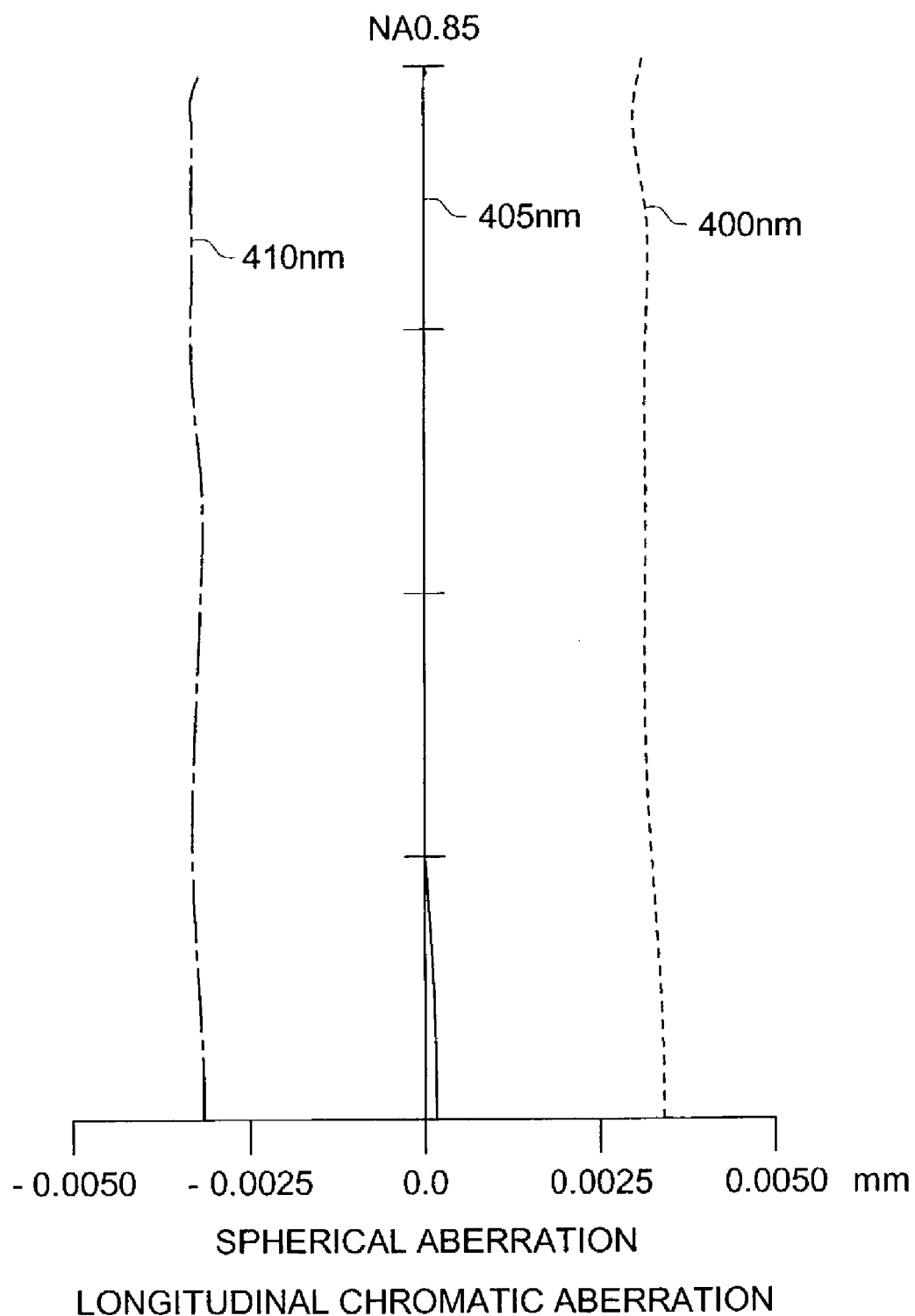
FIG. 21 is a graph showing the spherical aberration and longitudinal chromatic aberration in the wavelength 405±5 nm of the hybrid refractive-diffractive objective lens of Example 4.
Figure 22:
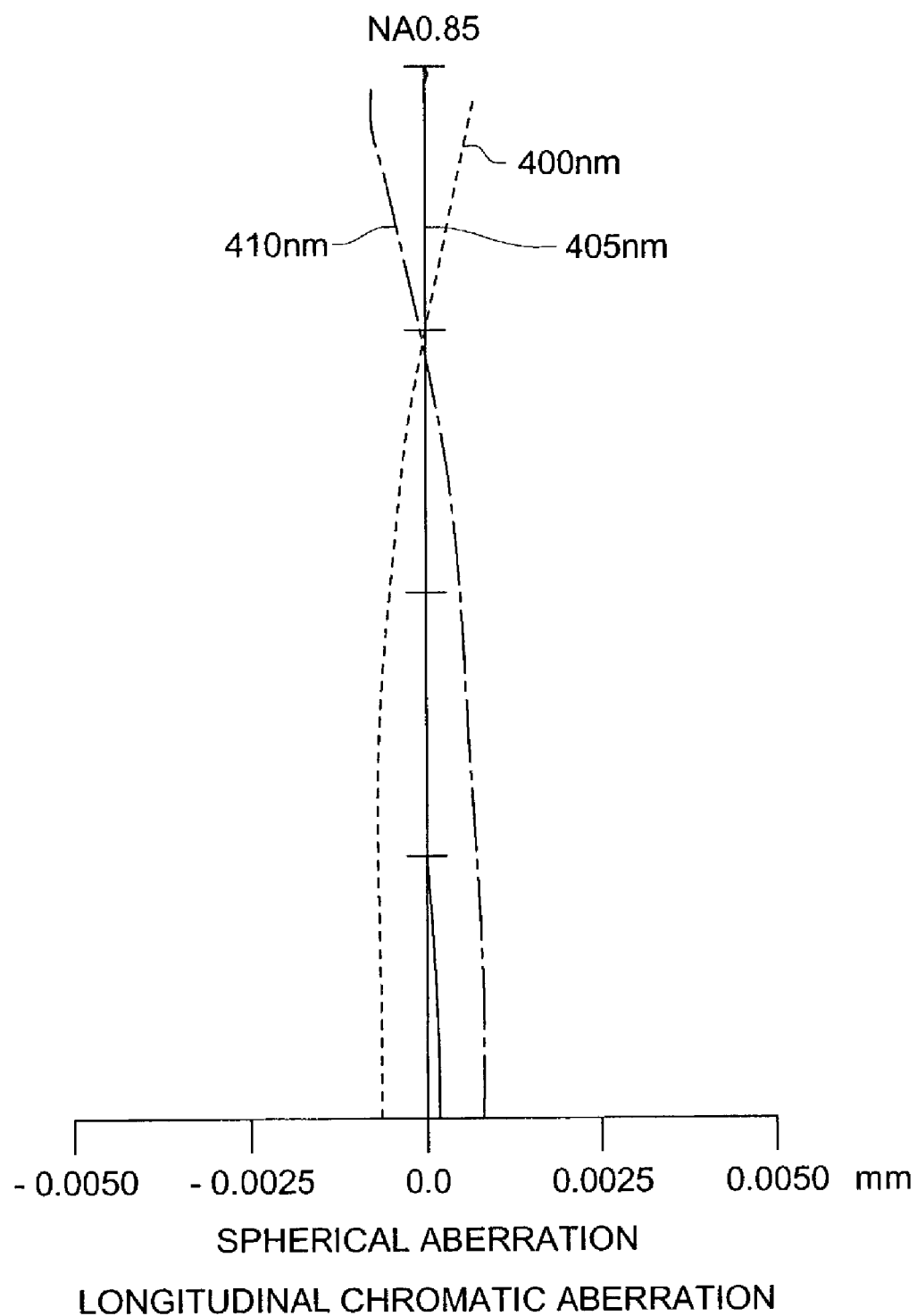
FIG. 22 is a graph showing the spherical aberration and longitudinal chromatic aberration in the wavelength 405±5 nm of the recording reproducing optical system in which the aberration correcting optical element of Example 4 and the hybrid refractive-diffractive objective lens are combined.

Note:
*1: light source
*2: aberration correcting optical element
*3: objective lens
*4: protective layer FIG. 20, the optical path view of the recording reproducing optical system of Example 4 is shown. FIG. 21 is a graph showing the spherical aberration and longitudinal chromatic aberration in wavelength 405±5 nm of the hybrid refractive-diffractive objective lens of the present example, and FIG. 22 is a graph showing the spherical aberration and longitudinal chromatic aberration in wavelength 405±5 nm of the recording reproducing optical system in which the aberration correcting optical element and the hybrid refractive-diffractive objective lens are combined.

From FIG. 21, it can be seen that, in the hybrid refractive-diffractive objective lens of the present example, when the wavelength of the incident ray is changed to the long wavelength side, the focal point position is moved to the under side, and when the wavelength of the incident ray is changed to the short wavelength side, the focal point position is moved to the over side. Further, from FIG. 22, it can be seen that, in the recording reproducing optical system in which the aberration correcting optical element and the hybrid refractive-diffractive objective lens are combined, the focal point position is hardly changed in spite of the wavelength.

Figure 23:
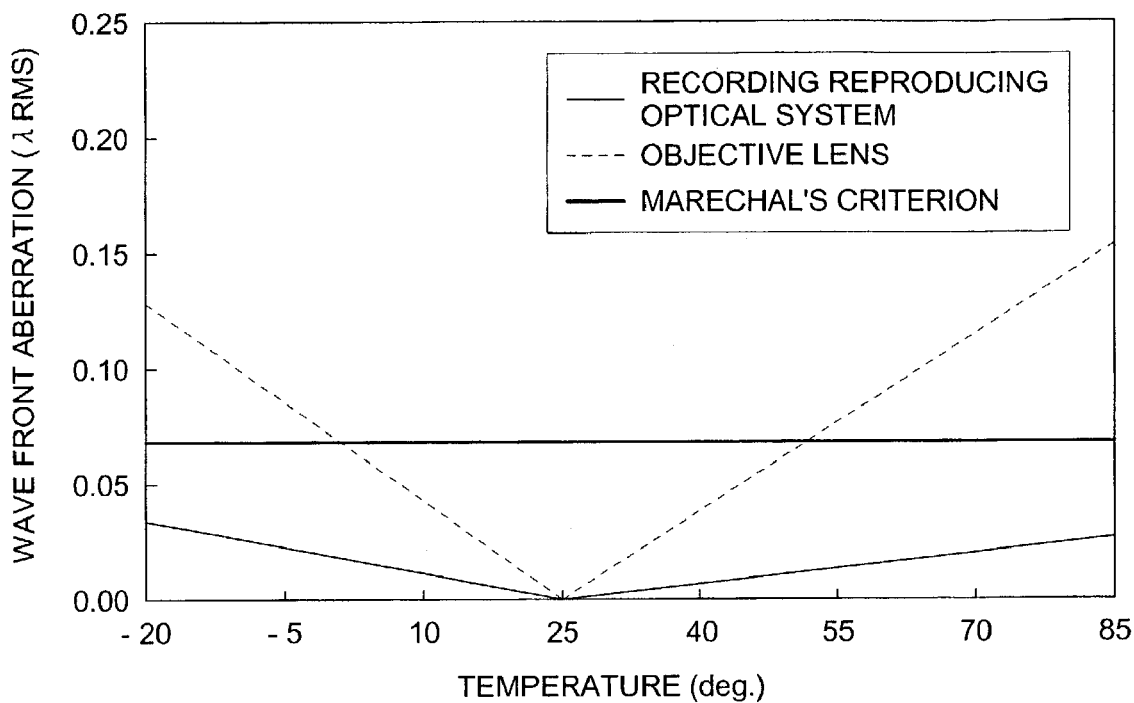
FIG. 23 is a view showing the temperature characteristic of the recording reproducing optical system of Example 4.

In FIG. 23, the temperature characteristic of the recording reproducing optical system of the present example is shown. As can be seen from FIG. 23, when the high NA plastic objective lens and aberration correcting optical element are combined, the good light converging characteristic can be maintained in the temperature range of −2.0 to +85° C.

Figure 24:
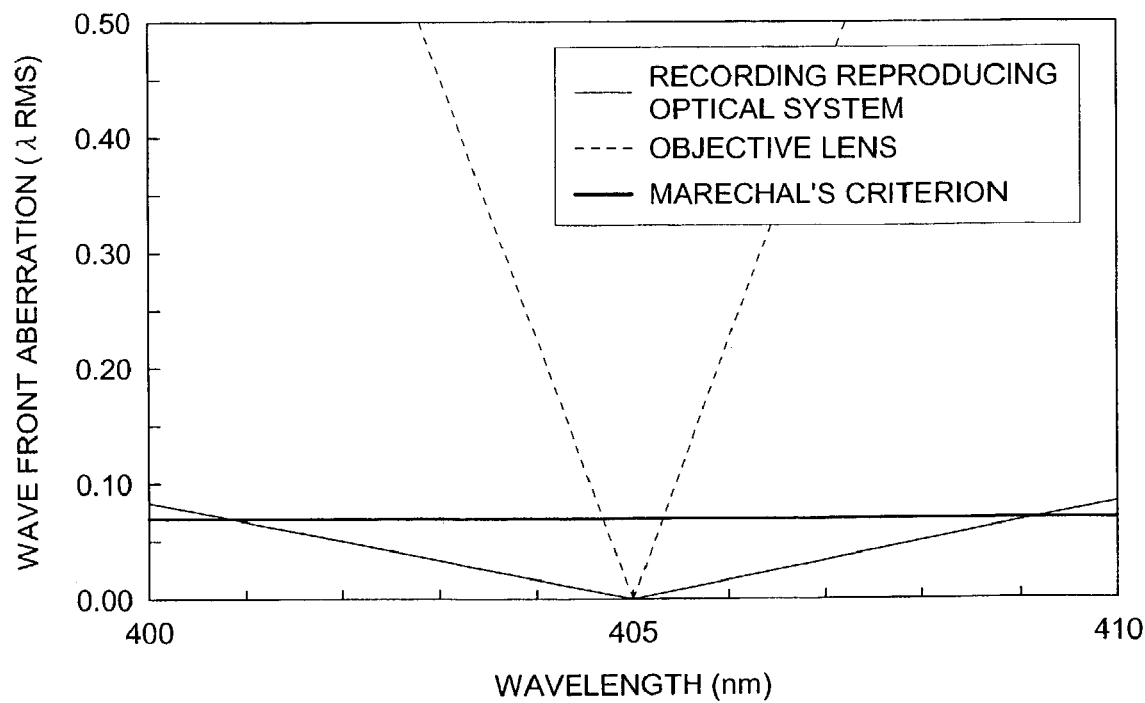
FIG. 24 is a view showing the wavelength characteristic of the recording reproducing optical system of Example 4.

In FIG. 24, the wavelength characteristic of the recording reproducing optical system of the present example is shown. As can be seen from FIG. 24, when the high NA plastic objective lens and aberration correcting optical element are combined, even when the wavelength change of 2 nm occurs, the good light converging characteristic can be maintained.

Example 5

Example 5 is an optical system in which the hybrid refractive-diffractive coupling lens as the aberration correcting optical element and the hybrid refractive-diffractive objective lens are combined, and as the aberration correction coupling lens, the plastic lens of one lens in one group composition of the focal distance 11.02 mm, light source side NA 0.19, and lateral magnification −0.074, is used, and as the hybrid refractive-diffractive objective lens, the plastic lens of one lens in one group composition of the focal distance 2.2 mm, optical disk side NA 0.85, and lateral magnification 0.015, is used. Then, the surface of the optical disk side of the hybrid refractive-diffractive coupling lens is the diffractive surface having the negative diffracting power, and both surfaces of the hybrid refractive-diffractive objective lens are the diffractive surfaces having the positive diffracting power. In Table 5, the data relating to the recording reproducing optical system of Example 5 is shown.

TABLE 5

| surface No. | r (mm) | d (mm) | Nλ | vd | Note |
|---|---|---|---|---|---|
| 0 | | 10.7681 | | | *1 |
| 1 | 27.4919 | 2.0000 | 1.52469 | 56.5 | *2 |
| 2 | −6.3582 | 10.0000 | | | |
| 3 | 1.6162 | 3.2200 | 1.52491 | 56.5 | *3 |
| 4 | −1.7141 | 0.4207 | | | |
| 5 | ∞ | 0.1000 | 1.61949 | 30.0 | *4 |
| 6 | ∞ | | | | |

Aspheric surface coefficient

| | 1st surface | 2nd surface | 3rd surface | 4-th surface |
|---|---|---|---|---|
| κ | −6.64490E+01 | −2.79130E−01 | −6.14610E−01 | −5.76940E+01 |
| A4 | 1.67874E−04 | 1.87140E−04 | 5.71410E−03 | 2.39310E−01 |
| A6 | | 9.71510E−06 | 9.50000E−04 | −3.94420E−01 |
| A8 | | | −1.05290E−04 | 3.25320E−01 |
| A10 | | | 2.46620E−04 | 1.12520E−01 |
| A12 | | | −4.86960E−05 | 5.53250E−05 |
| A14 | | | −4.08850E−06 | |
| A16 | | | 4.50230E−06 | |
| A18 | | | −1.17090E−07 | |
| A20 | | | −1.40850E−07 | |

Diffractive surface coefficient

| | 2nd surface | 3rd surface | 4th surface |
|---|---|---|---|
| b2 | 4.50000E−03 | −1.90000E−02 | −4.30000E−02 |
| b4 | −7.92940E−06 | −1.52060E−03 | |
| b6 | | 5.03590E−06 | |
| b8 | | −2.92080E−05 | |
| b10 | | 1.58820E−05 | |

Figure 25:
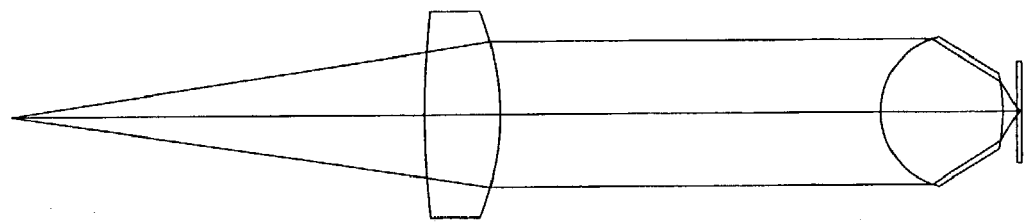
FIG. 25 is a view showing the optical path view of the recording reproducing optical system of Example 5.
Figure 26:
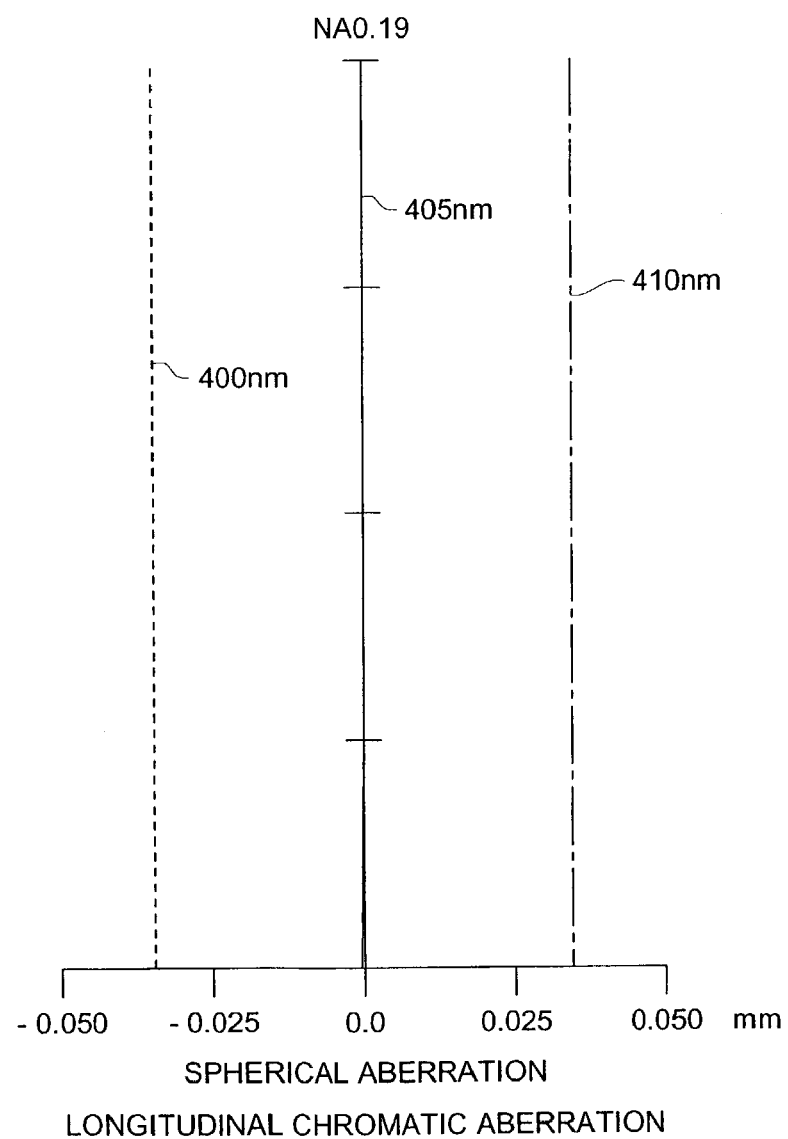
FIG. 26 is a graph showing the spherical aberration and longitudinal chromatic aberration in the wavelength 405±5 nm of the hybrid refractive-diffractive coupling lens of Example 5.
Figure 27:
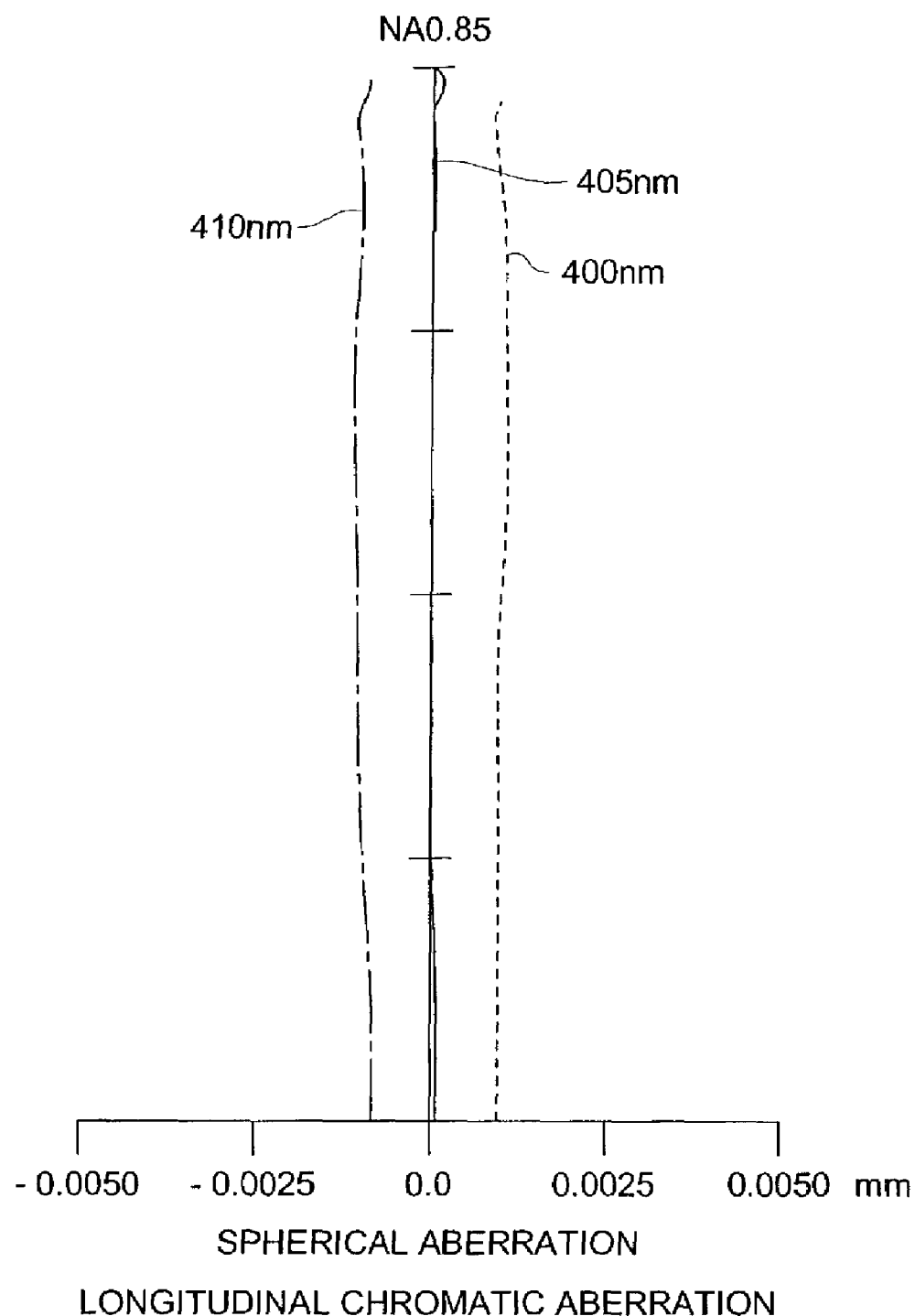
FIG. 27 is a graph showing the spherical aberration and longitudinal chromatic aberration in the wavelength 405±5 nm of the hybrid refractive-diffractive objective lens of Example 5.
Figure 28:
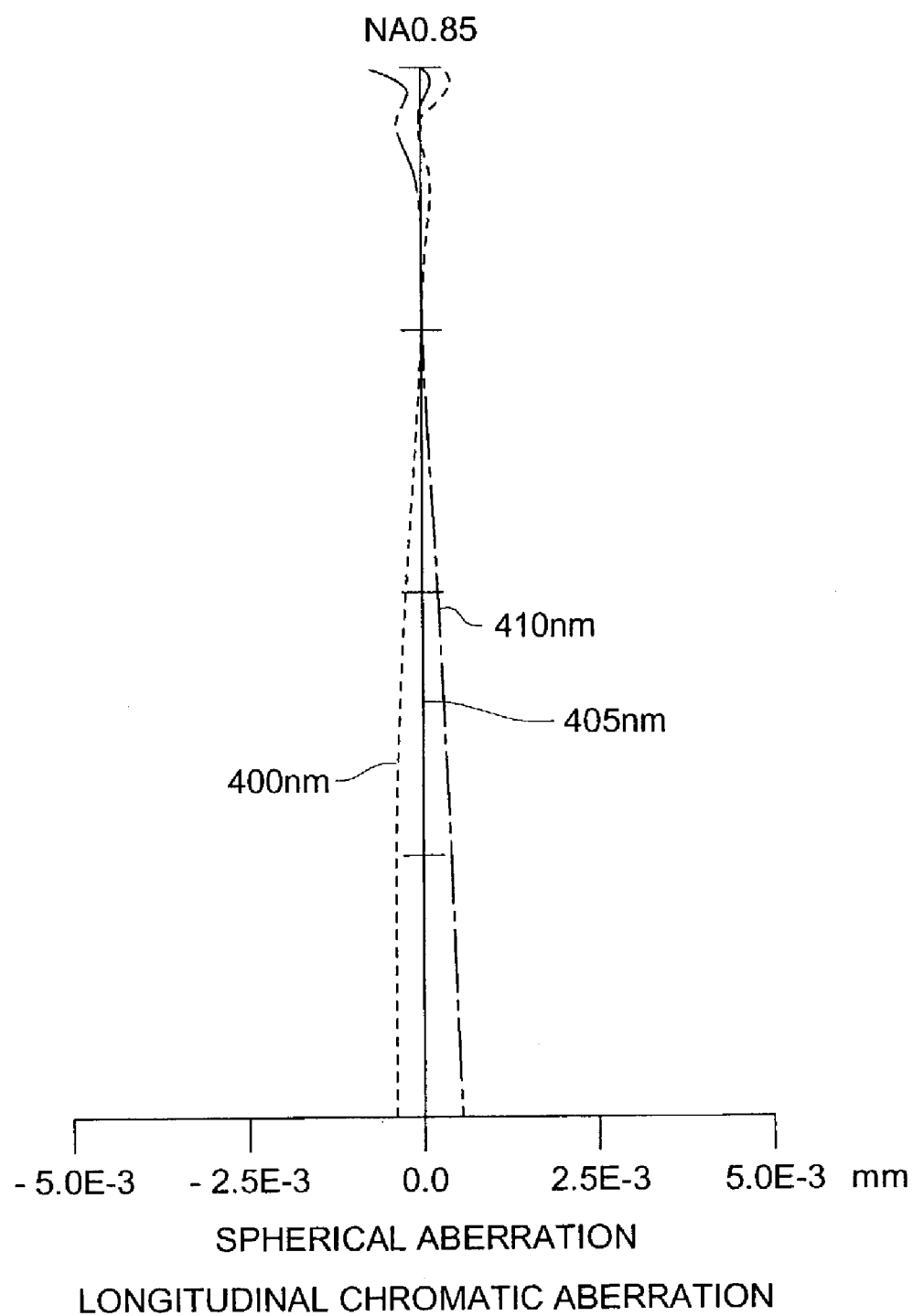
FIG. 28 is a graph showing the spherical aberration and longitudinal chromatic aberration in the wavelength 405±5 nm of the recording reproducing optical system in which the hybrid refractive-diffractive coupling lens of Example 5 and the hybrid refractive-diffractive objective lens are combined.

Note:
*1: light source
*2: coupling lens
*3: objective lens
*4: protective layer In FIG. 25, the optical path view of the recording reproducing optical system of Example 5 is shown. FIG. 26 is a graph showing the spherical aberration and longitudinal chromatic aberration in wavelength 405±5 nm of the hybrid refractive-diffractive coupling lens of the present example, FIG. 27 is a graph showing the spherical aberration and longitudinal chromatic aberration in wavelength 405±5 nm of the hybrid refractive-diffractive objective lens of the present example, and FIG. 28 is a graph showing the spherical aberration and longitudinal chromatic aberration in wavelength 405±5 nm of the recording reproducing optical system in which the hybrid refractive-diffractive coupling lens and hybrid refractive-diffractive objective lens are combined.

From FIG. 26, it can be seen that, in the hybrid refractive-diffractive coupling lens of the present example, when the wavelength of the incident ray is changed to the long wavelength side, the focal point position is moved to the over side, and when the wavelength of the incident ray is changed to the short wavelength side, the focal point position is moved to the under side. Further, from FIG. 27, it can be seen that, in the hybrid refractive-diffractive objective lens of the present example, when the wavelength of the incident ray is changed to the long wavelength side, the focal point position is moved to the under side, and when the wavelength of the incident ray is changed to the short wavelength side, the focal point position is moved to the over side. Further, from FIG. 28, it can be seen that, in the recording reproducing optical system in which the hybrid refractive-diffractive coupling lens and the hybrid refractive-diffractive objective lens are combined, the focal point position is hardly changed in spite of the wavelength.

Figure 29:
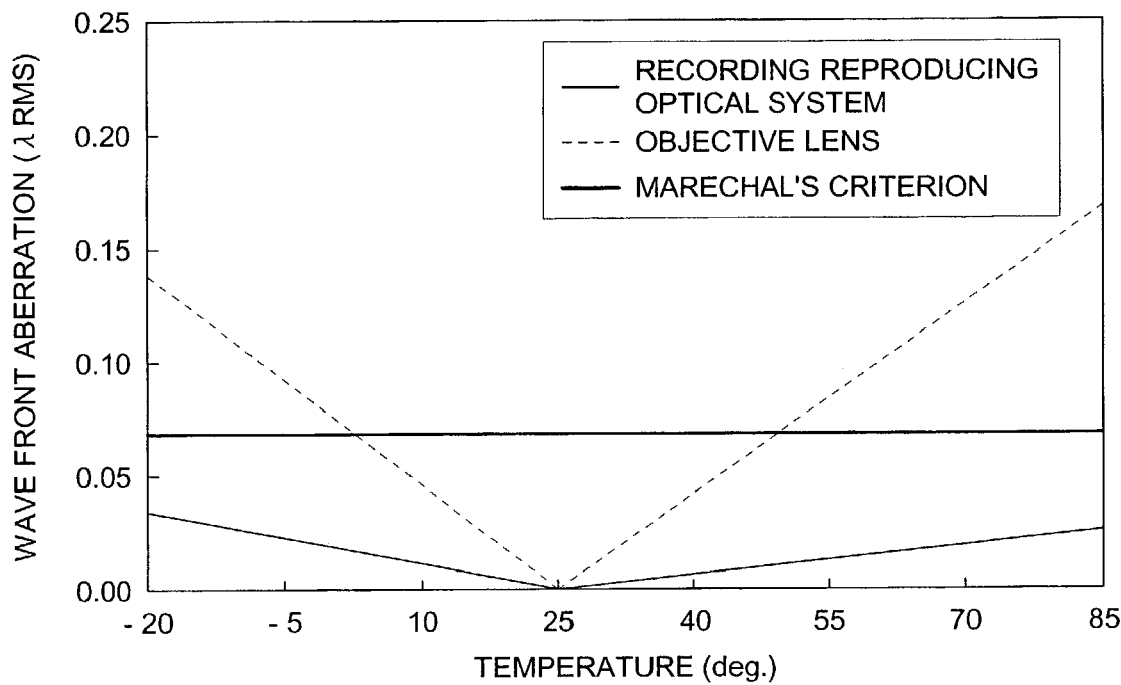
FIG. 29 is a view showing the temperature characteristic of the recording reproducing optical system of Example 5.

In FIG. 29, the temperature characteristic of the recording reproducing optical system of the present example is shown. As can be seen from FIG. 29, when the high NA plastic objective lens and aberration correcting optical element are combined, the good light converging characteristic can be maintained in the temperature range of −20 to +85° C.

Figure 30:
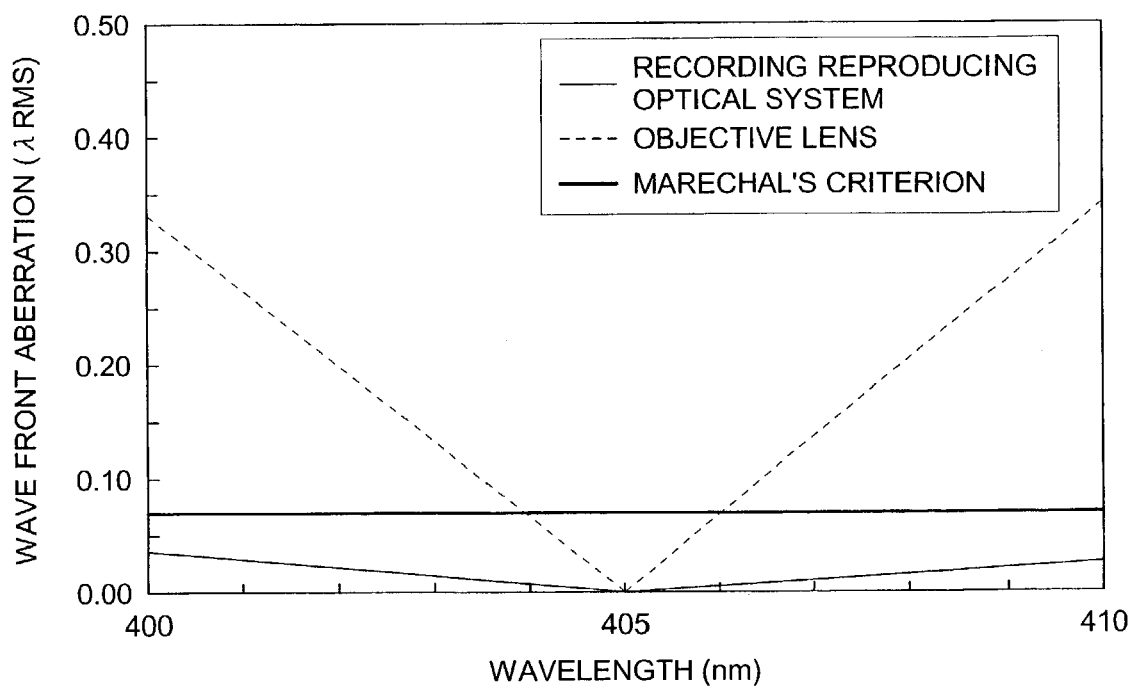
FIG. 30 is a view showing the wavelength characteristic of the recording reproducing optical system of Example 5.

In FIG. 30, the wavelength characteristic of the recording reproducing optical system of the present example is shown. As can be seen from FIG. 30, when the high NA plastic objective lens and hybrid refractive-diffractive coupling lens are combined, even when the wavelength change of 2 nm occurs, the good light converging characteristic can be maintained.

Example 6

Example 6 is an optical system in which the hybrid refractive-diffractive collimator lens as the aberration correcting optical element and junction type doublet lens as the chromatic aberration correcting optical element, and the hybrid refractive-diffractive objective lens are combined, and as the hybrid refractive-diffractive collimator lens, the plastic lens of one lens in one group composition of the focal distance 7 mm, and NA 0.375, is used, and as the hybrid refractive-diffractive objective lens, the plastic lens of one lens in one group composition of the focal distance 2.2 mm and optical disk side NA 0.85, is used. In the junction type doublet lens, the negative lens (made by HOYA co, FD110) of Abbe's number 25.7 and the positive lens (made by HOYA co, TAF5) of Abbe's number 46.6 are joined, and the refracting power is zero. Then, the surface of the optical disk side of the hybrid refractive-diffractive collimator lens is the diffractive surface having the negative diffracting power, and the surface of the light source side of the hybrid refractive-diffractive objective lens is the diffractive surfaces having the positive diffracting power. In Table &, the data relating to the recording reproducing optical system of Example 6 is shown.

TABLE 6

| surface No. | r (mm) | d (mm) | Nλ | νd | Note |
|---|---|---|---|---|---|
| 0 |  | 5.0896 |  |  | *1 |
| 1 | 20.1744 | 1.6000 | 1.52469 | 56.5 | *2 |
| 2 | −3.1876 | 1.0000 |  |  |  |
| 3 | −12.1975 | 0.8000 | 1.84203 | 25.7 | *3 |
| 4 | 5.7503 | 2.0000 | 1.84609 | 46.6 |  |
| 5 | −13.6813 | 7.0000 |  |  |  |
| 6 | 1.5307 | 3.2800 | 1.52491 | 56.5 | *4 |
| 7 | −1.2626 | 0.4020 |  |  |  |
| 8 | ∞ | 0.1000 | 1.61949 | 30.0 | *5 |
| 9 | ∞ |  |  |  |  |

Aspheric surface coefficient

|  | 1st surface | 2nd surface | 6-th surface | 7-th surface |
|---|---|---|---|---|
| κ | 0.00000E+00 | −9.51220E−01 | −5.88780E−01 | −3.07710E+01 |
| A4 | −5.06733E−04 | −8.21400E−04 | 2.13550E−03 | 2.44047E−01 |
| A6 | 9.24750E−06 | −1.66060E−05 | 1.15480E−03 | −4.09301E−01 |
| A8 |  |  | 6.20520E−05 | 3.28799E−01 |
| A10 |  |  | 8.80180E−05 | −1.07700E−01 |
| A12 |  |  | −3.10960E−05 | 5.53253E−05 |
| A14 |  |  | −4.08720E−07 |  |
| A16 |  |  | 3.55430E−06 |  |
| A18 |  |  | −4.12270E−07 |  |
| A20 |  |  | −8.96590E−08 |  |

Diffractive surface coefficient

|  | 2nd surface | 6-th surface |
|---|---|---|
| b2 | 1.00000E−02 | −1.20000E−02 |
| b4 | −3.76180E−05 | −2.51740E−03 |
| b6 | 5.50180E−06 | 2.72100E−04 |
| b8 |  | −2.22940E−05 |
| b10 |  | −1.57370E−05 |

Figure 31:
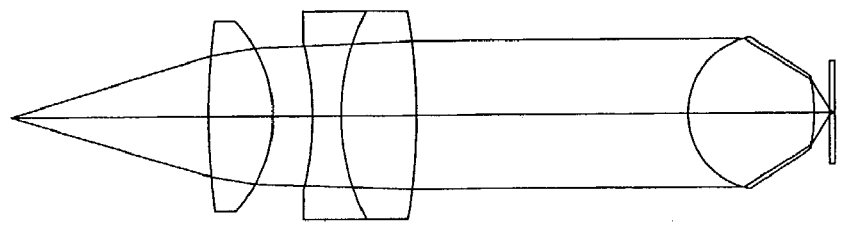
FIG. 31 is a view showing the optical path view of the recording reproducing optical system of Example 6.
Figure 32:
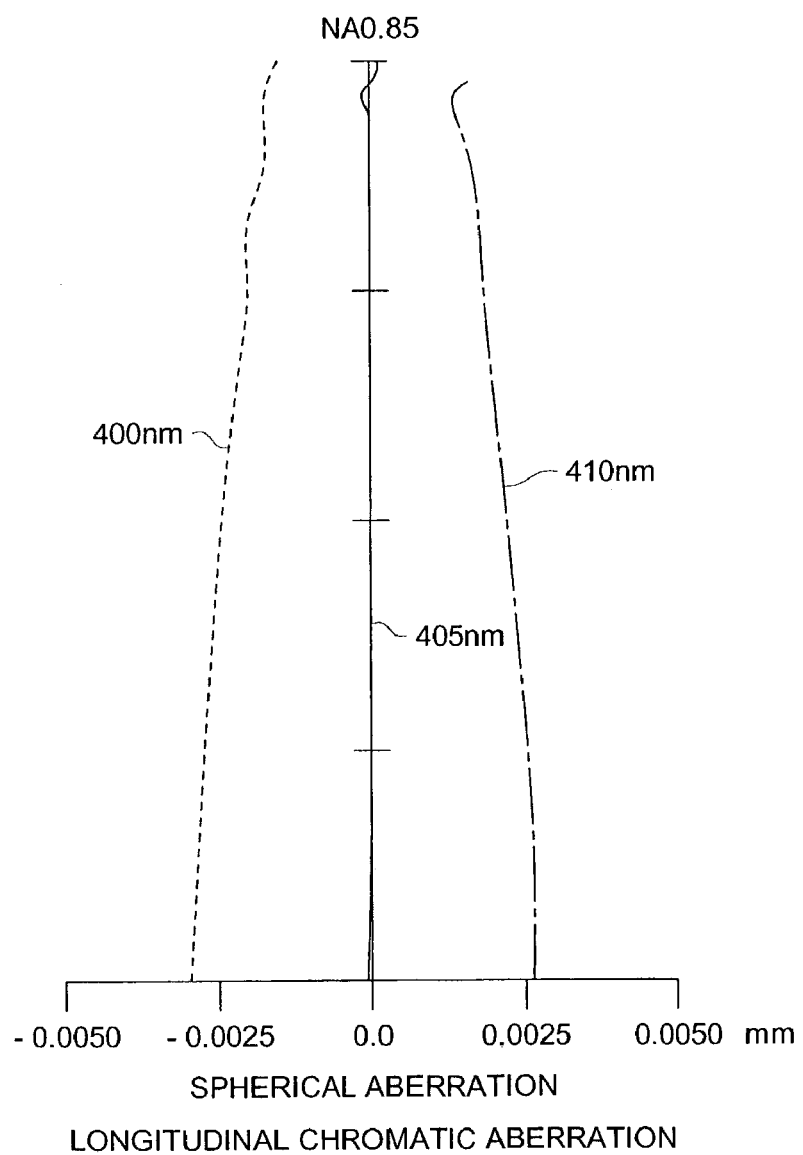
FIG. 32 is a graph showing the spherical aberration and longitudinal chromatic aberration in the wavelength 405±5 nm of the recording reproducing optical system in which the hybrid refractive-diffractive collimator lens of Example 6 and the hybrid refractive-diffractive objective lens are combined.
Figure 33:
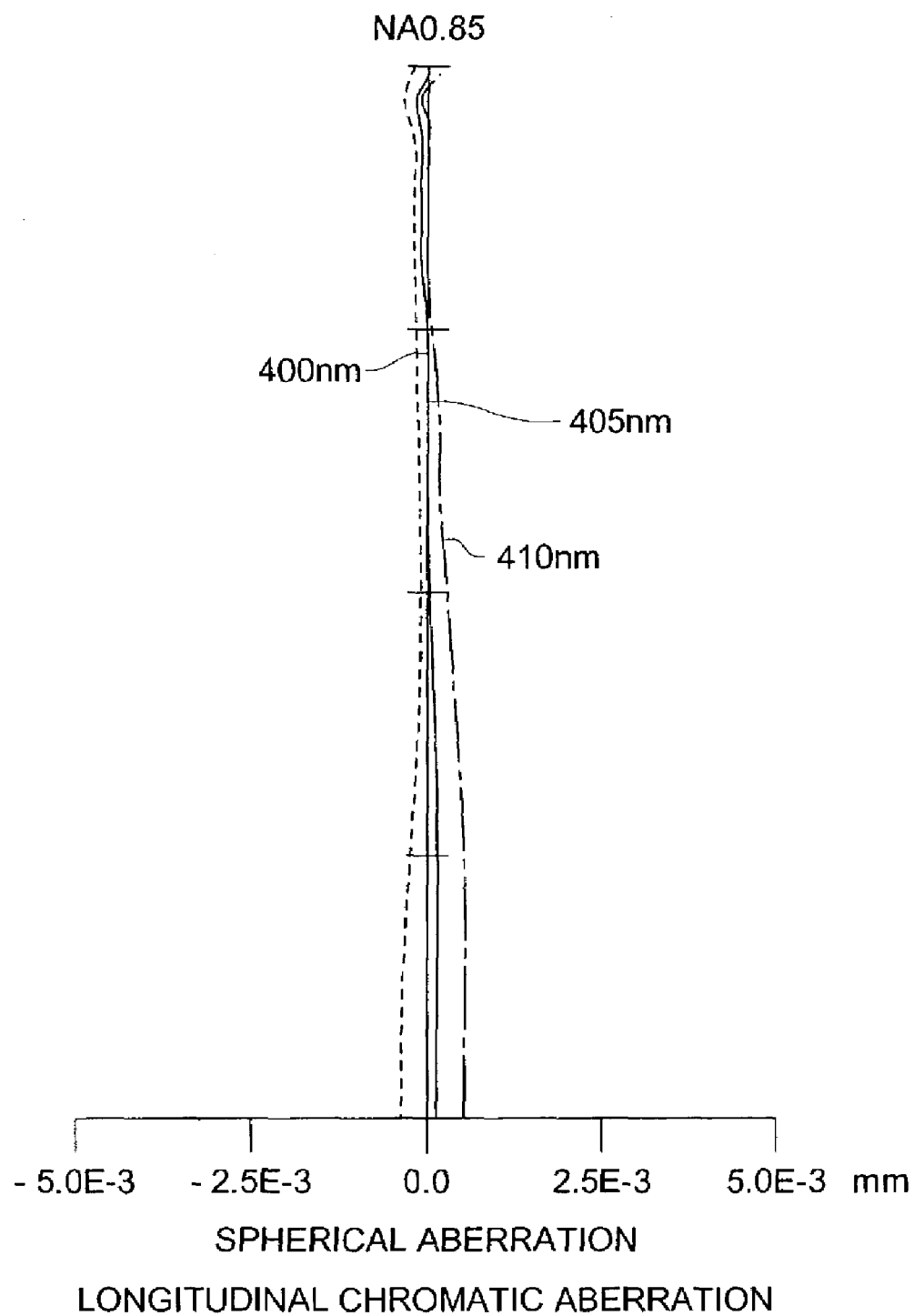
FIG. 33 is a graph showing the spherical aberration and longitudinal chromatic aberration in the wavelength 405±5 nm of the recording reproducing optical system in which the hybrid refractive-diffractive collimator lens of Example 6, junction type doublet lens and the hybrid refractive-diffractive objective lens are combined.

Note:
*1: light source
*2: collimator lens
*3: chromatic aberration correcting optical element
*4: objective lens
*5: protective layer In FIG. 31, the optical path view of the recording reproducing optical system of Example 6 is shown. FIG. 32 is a graph showing the spherical aberration and longitudinal chromatic aberration in wavelength 405±5 nm of the optical system in which the hybrid refractive-diffractive collimator lens of the present example, and hybrid refractive-diffractive objective lens are combined, FIG. 33 is a graph showing the spherical aberration and longitudinal chromatic aberration in wavelength 405±5 nm of the recording reproducing optical system in which the hybrid refractive-diffractive collimator lens, junction type doublet lens and hybrid refractive-diffractive objective lens are combined.

From FIG. 32, it can be seen that, in the optical system in which the hybrid refractive-diffractive collimator lens of the present example, and the hybrid refractive-diffractive objective lens are combined, when the wavelength of the incident ray is changed to the long wavelength side, the focal point position is moved to the over side, and when the wavelength of the incident ray is changed to the short wavelength side, the focal point position is moved to the under side. Further, from FIG. 33, it can be seen that, in the recording reproducing optical system in which the hybrid refractive-diffractive collimator lens and the junction type doublet lens and the hybrid refractive-diffractive objective lens are combined, the focal point position is hardly changed in spite of the wavelength.

Figure 34:
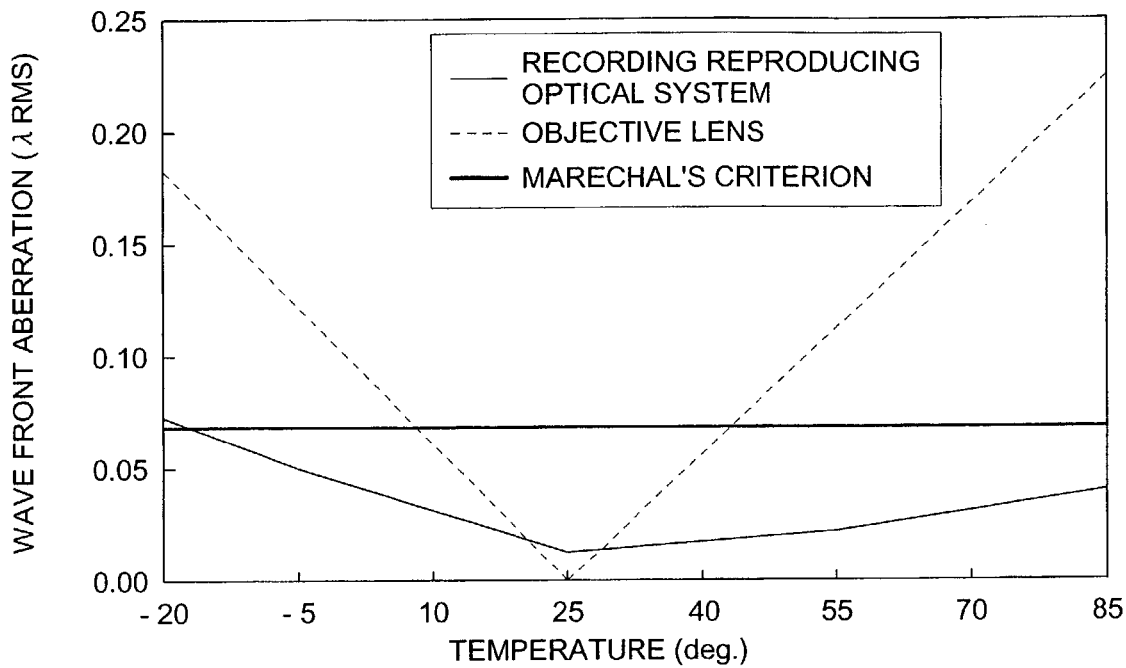
FIG. 34 is a view showing the temperature characteristic of the recording reproducing optical system of Example 6.

In FIG. 34, the temperature characteristic of the recording reproducing optical system of the present example is shown.

As can be seen from FIG. 34, when the high NA plastic objective lens and aberration correcting optical element are combined, the good light converging characteristic can be maintained in the temperature range of −20 to +85° C.

Figure 35:
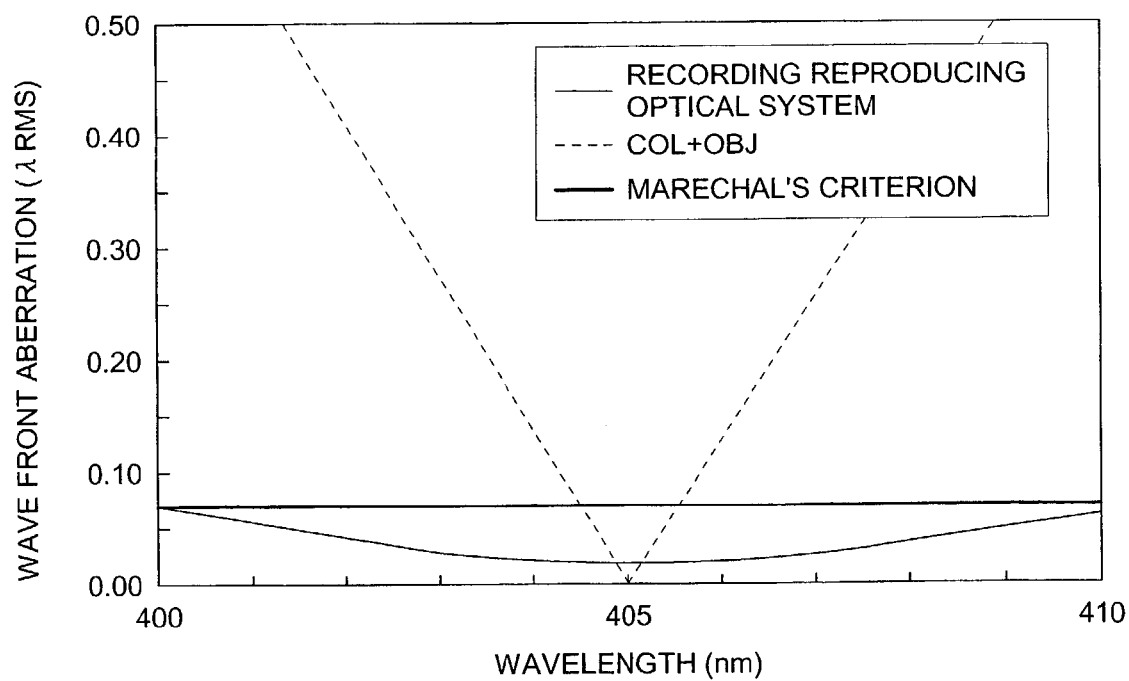
FIG. 35 is a view showing the wavelength characteristic of the recording reproducing optical system of Example 6.

In FIG. 35, the wavelength characteristic of the recording reproducing optical system of the present example is shown. As can be seen from FIG. 35, when the high NA plastic objective lens, junction type doublet lens and hybrid refractive-diffractive collimator lens are combined, even when the wavelength change of 2 nm occurs, the good light converging characteristic can be maintained. In this connection, in FIG. 35, the "recording reproducing optical system" shows the optical system in which the hybrid refractive-diffractive collimator lens, junction type doublet lens and hybrid refractive-diffractive objective lens are combined, and "COL+ OBJ" shows the optical system in which the hybrid refractive-diffractive collimator lens and the hybrid refractive-diffractive objective lens are combined.

Example 7

Example 7 is the recording reproducing optical system appropriate for the optical pick-up apparatus of FIG. 3. The present example is the recording reproducing optical system in which the recording reproducing of the information can be conducted compatibly by the one objective lens to the high density DVD, DVD and CD, and the hybrid refractive-diffractive collimator lens as the aberration correcting optical element, as the aberration correcting optical element, is arranged in the optical path between the blue violet semiconductor laser for the high density DVD and the hybrid refractive-diffractive objective lens. Further, when the recording reproducing of the information onto the DVD and CD is conducted, the divergent light flux emitted from the semiconductor laser for DVD and the semiconductor laser for CD is made to be incident on the hybrid refractive-diffractive objective lens, and made converge on respective information recording surfaces of DVD and CD.

As the hybrid refractive-diffractive collimator lens, a plastic lens of one lens in one group composition of the focal distance 7 mm, NA 0.321 is used, and as hybrid refractive-diffractive objective lens, the plastic lens of one lens in one group composition of the focal distance 2.0 mm is used. Further, NA of the hybrid refractive-diffractive objective lens is 0.85 at the time of recording reproducing onto the high density DVD, 0.65 at the time of recording reproducing onto DVD, and 0.50 at the time of recording reproducing onto CD. Then, the surface of the optical disk side of the hybrid refractive-diffractive collimator lens is the diffractive surface having the negative diffracting power, and the surface of the semiconductor laser side of the hybrid refractive-diffractive objective lens is the diffractive surface having the positive diffracting power.

Figure 36:
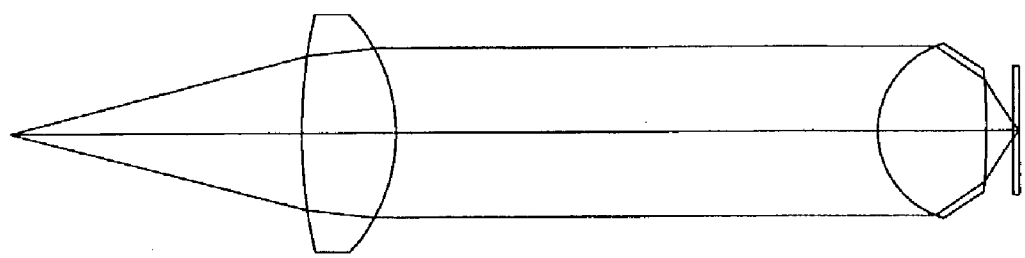
FIG. 36 is the optical path view when the recording reproducing of the information is conducted onto the high density DVD in Example 7.
Figure 37:
FIG. 37 is the optical path view when the recording reproducing of the information is conducted onto DVD in Example 7.
Figure 38:
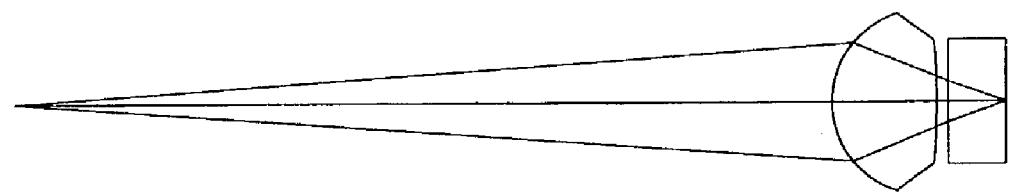
FIG. 38 is the optical path view when the recording reproducing of the information is conducted onto CD in Example 7.

In Table 7, the data relating to the recording reproducing optical system of Example 7 is shown, and in FIGS. 36 to 38, the optical path view of the recording reproducing optical system of the present example is shown. In the lens data in Table 7, the diffractive surface coefficient of the surface of the light source side of the objective lens is determined so that the second order diffracted ray is generated, when the ray from the blue violet semiconductor laser is incident. When, on the diffractive surface described in this manner, the ray from the red semiconductor laser for DVD and the infrared semiconductor laser for CD is incident, the primary order diffracted ray is generated. Further, because the reference wavelength (also called the production wavelength of the diffractive structure) of the diffractive surface coefficient of the surface of the light source side of the objective lens is set to 380 nm, the high diffraction efficiency can be obtained in respective wavelength regions of the ray from the blue violet semiconductor laser, the ray from the red semiconductor laser, and the ray from the infrared semiconductor laser.

TABLE 7

(High density DVD)

| Surface No. | r (mm) | d (mm) | Nλ | νd | Note |
|---|---|---|---|---|---|
| 0 | | 6.0081 | | | *1 |
| 1 | 12.9312 | 2.0000 | 1.52469 | 56.5 | *2 |
| 2 | −2.9472 | 10.0000 | | | |
| 3 | 1.5008 | 2.2000 | 1.52469 | 56.5 | *3 |
| 4 | −4.0931 | 0.6202 | | | |
| 5 | ∞ | 0.1000 | 1.61949 | 30.0 | *4 |
| 6 | ∞ | | | | |

Note:
*1: light source
*2: collimator lens
*3: objective lens
*4: protective layer (DVD)

| Surface No. | r (mm) | d (mm) | Nλ | νd | Note |
|---|---|---|---|---|---|
| 0 | | 28.0316 | | | **1 |
| 3 | 1.5008 | 2.2000 | 1.50661 | 56.5 | **2 |
| 4 | −4.0931 | 0.6202 | | | |
| 5 | ∞ | 0.1000 | 1.57756 | 30.0 | **3 |
| 6 | ∞ | | | | |

Note:
**1: light source
**2: objective lens
**3: protective layer (CD)

| Surface No. | r (mm) | d (mm) | Nλ | νd | Note |
|---|---|---|---|---|---|
| 0 | | 16.6423 | | | **1 |
| 3 | 1.5008 | 2.2000 | 1.50500 | 56.5 | **2 |
| 4 | −4.0931 | 0.6202 | | | |
| 5 | ∞ | 0.1000 | 1.57062 | 30.0 | **3 |
| 6 | ∞ | | | | |

Note:
**1: light source
**2: objective lens
**3: protective layer

Aspheric surface coefficient

| | 1st surface | 2nd surface | 3rd surface | 4-th surface |
|---|---|---|---|---|
| κ | 0.00000E+00 | −9.57120E−01 | −5.00280E−01 | −1.16557E+02 |
| A4 | −7.07536E−04 | −6.98220E−04 | 6.18070E−03 | 8.27146E−02 |
| A6 | 9.95558E−06 | 2.82640E−06 | −1.09230E−03 | −4.63821E−02 |
| A8 | | | 1.87750E−03 | −5.32148E−03 |
| A10 | | | −2.46160E−04 | 6.93290E−03 |
| A12 | | | −3.21180E−04 | 6.14497E−04 |
| A14 | | | 1.31040E−04 | 4.59428E−05 |
| A16 | | | −1.15460E−05 | −4.70737E−04 |
| A18 | | | 5.97860E−06 | |
| A20 | | | −2.93260E−06 | |

Diffractive surface coefficient

| | 2nd surface | 3rd surface |
|---|---|---|
| b2 | 3.50000E−02 | −2.50000E−02 |
| b4 | 1.46310E−04 | −1.66580E−03 |
| b6 | −3.51000E−05 | 2.26340E−05 |
| b8 | | −1.07980E−04 |
| b10 | | −1.40910E−05 |

Figure 39:
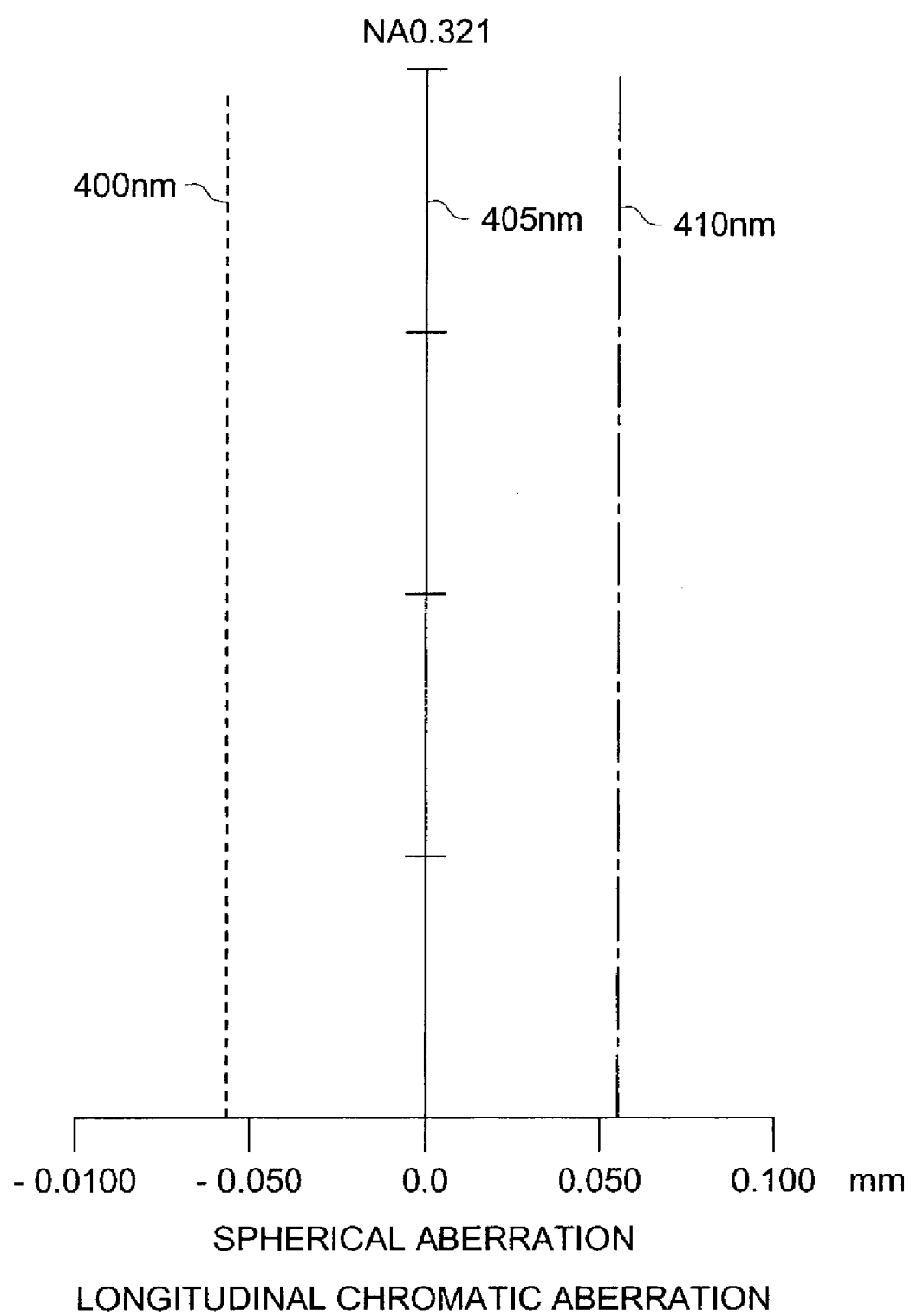
FIG. 39 is a graph showing the spherical aberration and longitudinal chromatic aberration in the wavelength 405±5 nm of the hybrid refractive-diffractive collimator lens of Example 7.
Figure 40:
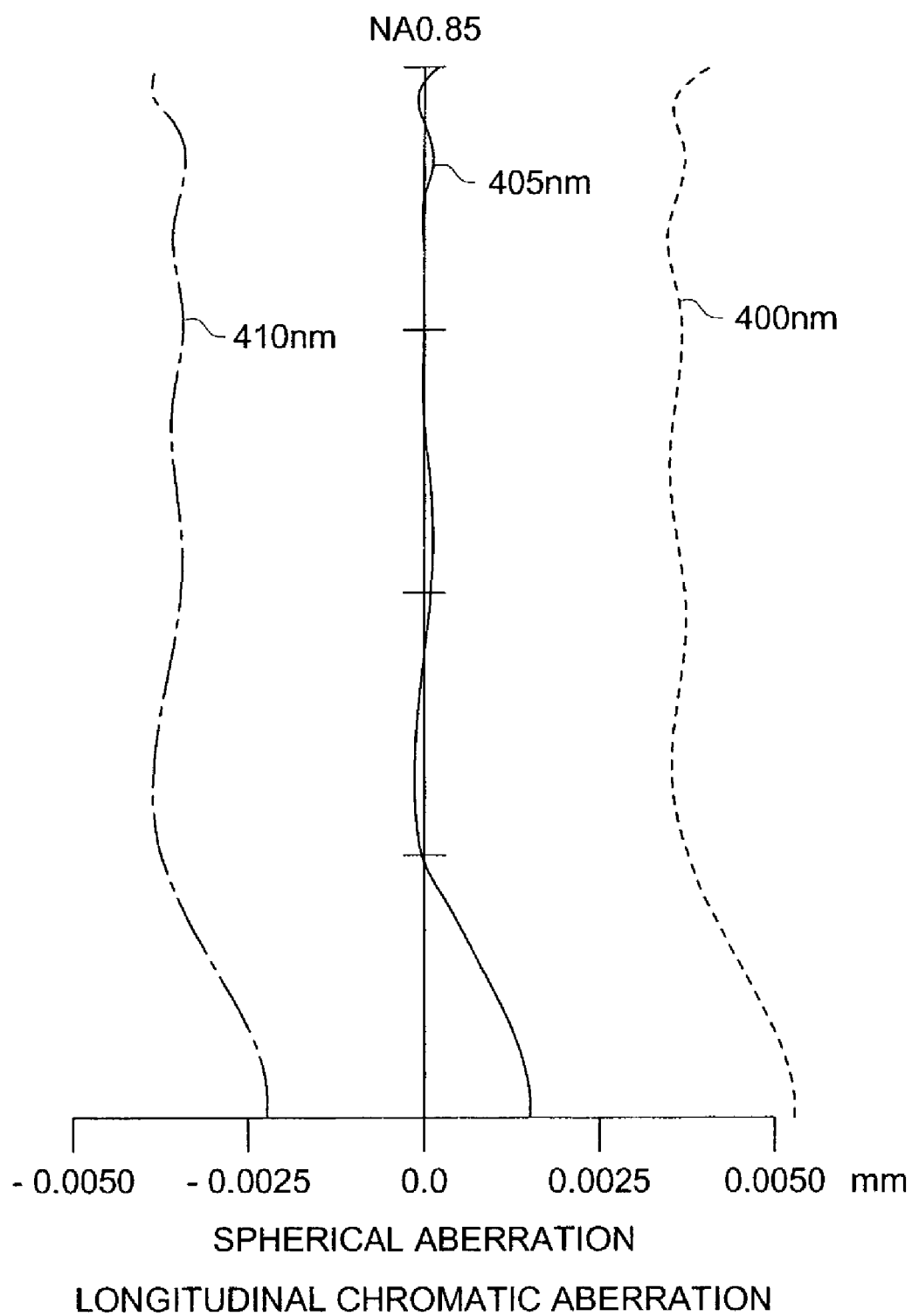
FIG. 40 is a graph showing the spherical aberration and longitudinal chromatic aberration in the wavelength 405±5 nm of the hybrid refractive-diffractive objective lens of Example 7.
Figure 41:
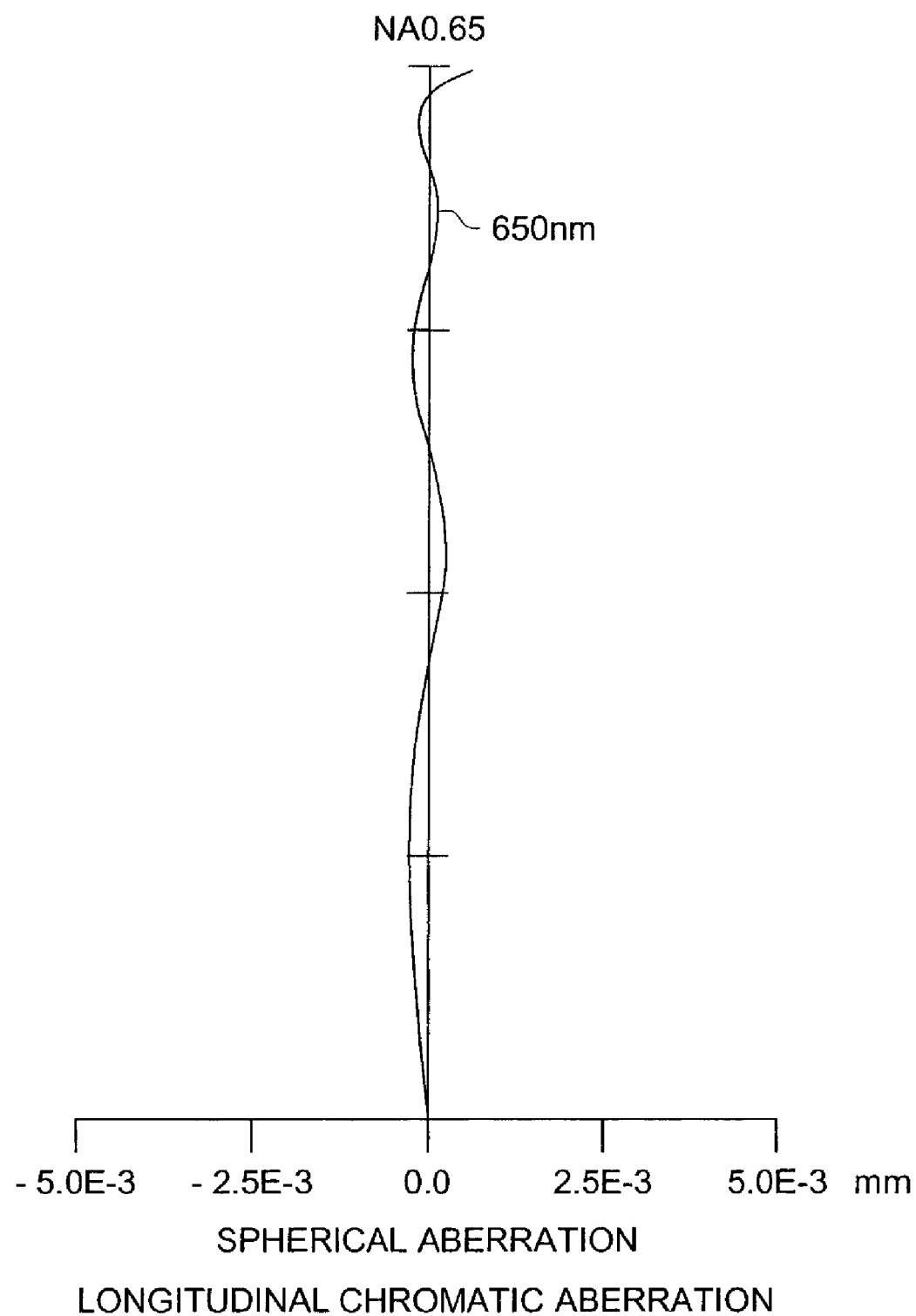
FIG. 41 is a graph showing the spherical aberration in the wavelength 650 nm of the hybrid refractive-diffractive objective lens of Example 7.
Figure 42:
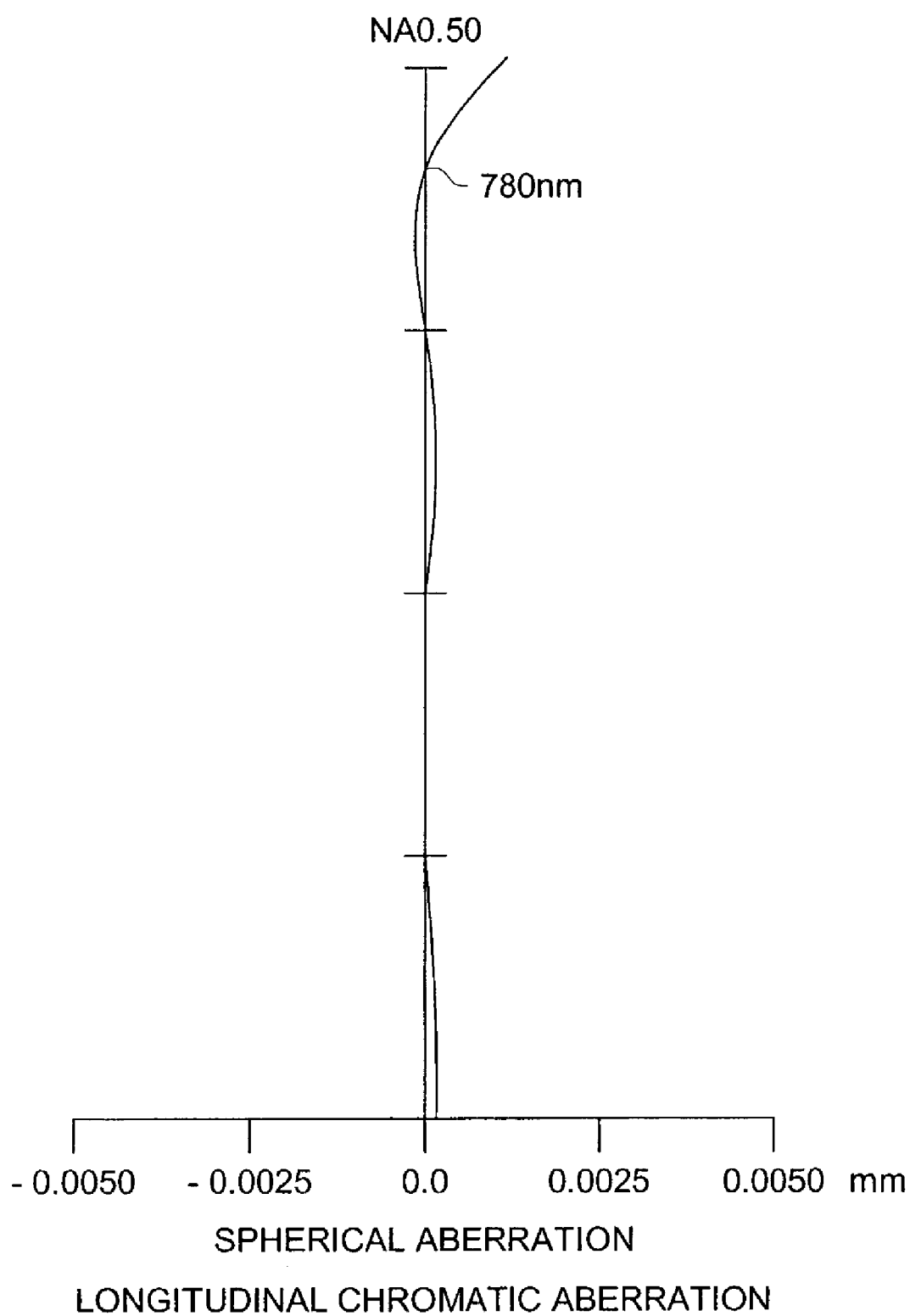
FIG. 42 is a graph showing the spherical aberration in the wavelength 780 nm of the hybrid refractive-diffractive objective lens of Example 7.
Figure 43:
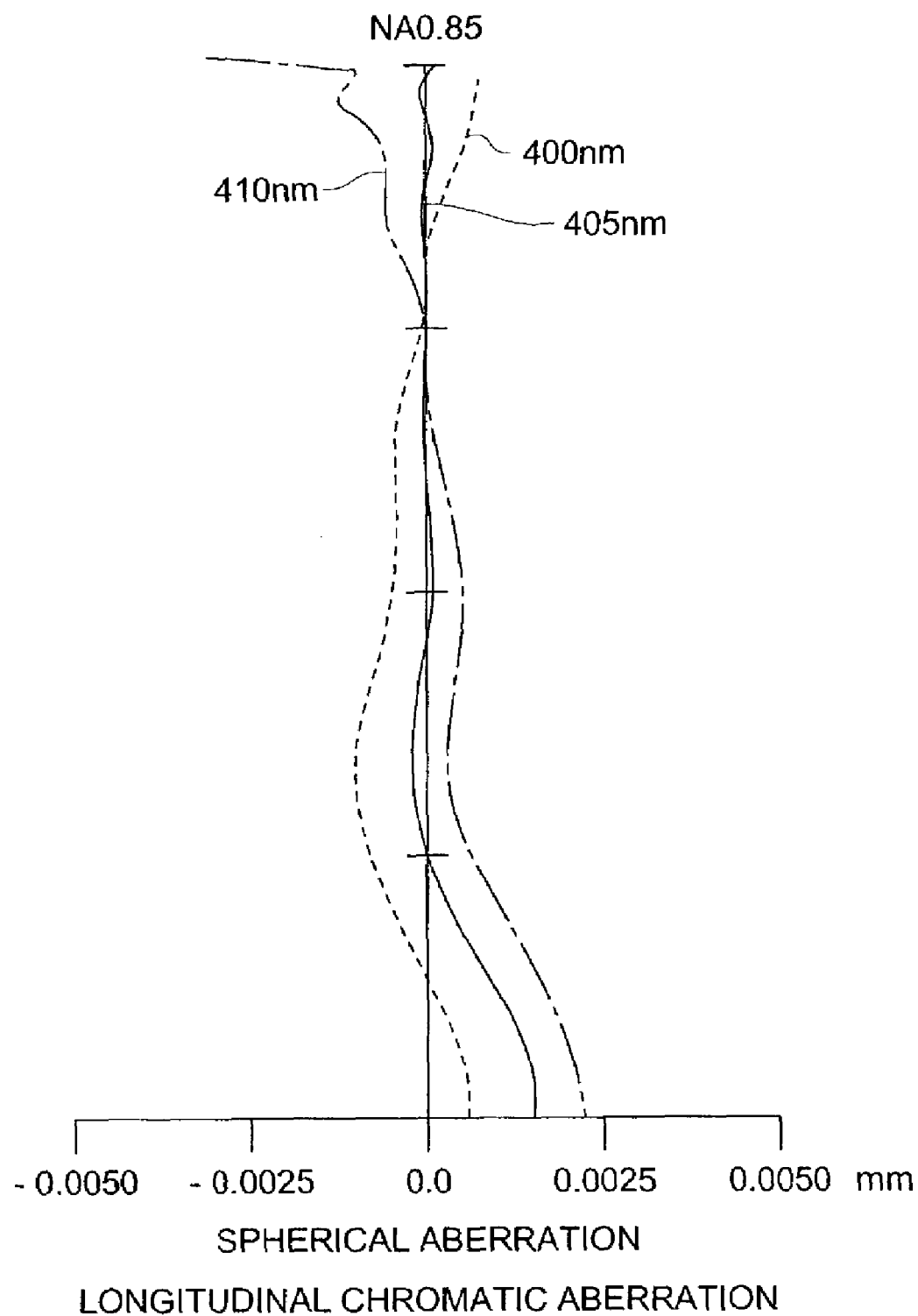
FIG. 43 is a graph showing the spherical aberration and longitudinal chromatic aberration in the wavelength 405±5 nm of the recording reproducing optical system in which the aberration correcting optical element of Example 7 and the hybrid refractive-diffractive objective lens are combined.

FIG. 36 is an optical path view when the recording reproducing of the information is conducted onto the high density DVD, and FIG. 37 is an optical path view when the recording reproducing of the information is conducted onto DVD, and FIG. 38 is an optical path view when the recording reproducing of the information is conducted onto CD. FIG. 39 is a graph showing the spherical aberration and longitudinal chromatic aberration in wavelength 405±5 nm of the hybrid refractive-diffractive collimator lens of the present example, FIG. 40 is a graph showing the spherical aberration and longitudinal chromatic aberration in wavelength 405±5 nm of the hybrid refractive-diffractive objective lens of the present example, FIG. 41 is a graph showing the spherical aberration in wavelength 650 nm of the hybrid refractive-diffractive objective lens of the present example, and FIG. 42 is a graph showing the spherical aberration in wavelength 780 nm of the hybrid refractive-diffractive objective lens of the present example. FIG. 43 is a graph showing the spherical aberration and longitudinal chromatic aberration in wavelength 405±5 nm of the recording reproducing optical system in which the aberration correcting optical element and hybrid refractive-diffractive objective lens are combined.

From FIG. 39, it can be seen that, in the hybrid refractive-diffractive collimator lens of the present example, when the wavelength of the ray from the blue violet semiconductor laser is changed to the long wavelength side, the focal point position is moved to the over side, and when the wavelength of the ray from the blue violet semiconductor laser is changed to the short wavelength side, the focal point position is moved to the under side.

Further, from FIG. 40, it can be seen that, in the hybrid refractive-diffractive objective lens of the present example, when the wavelength of the ray from the blue violet semiconductor laser is changed to the long wavelength side, the focal point position is moved to the under side, and when the wavelength of the ray from the blue violet semiconductor laser is changed to the short wavelength side, the focal point position is moved to the over side.

Further, from FIG. 43, it can be seen that, in the recording reproducing optical system in which the aberration correcting optical element and the hybrid refractive-diffractive objective lens are combined, the focal point position is hardly changed even when the wavelength of the ray from the blue violet semiconductor laser is changed.

Figure 44:
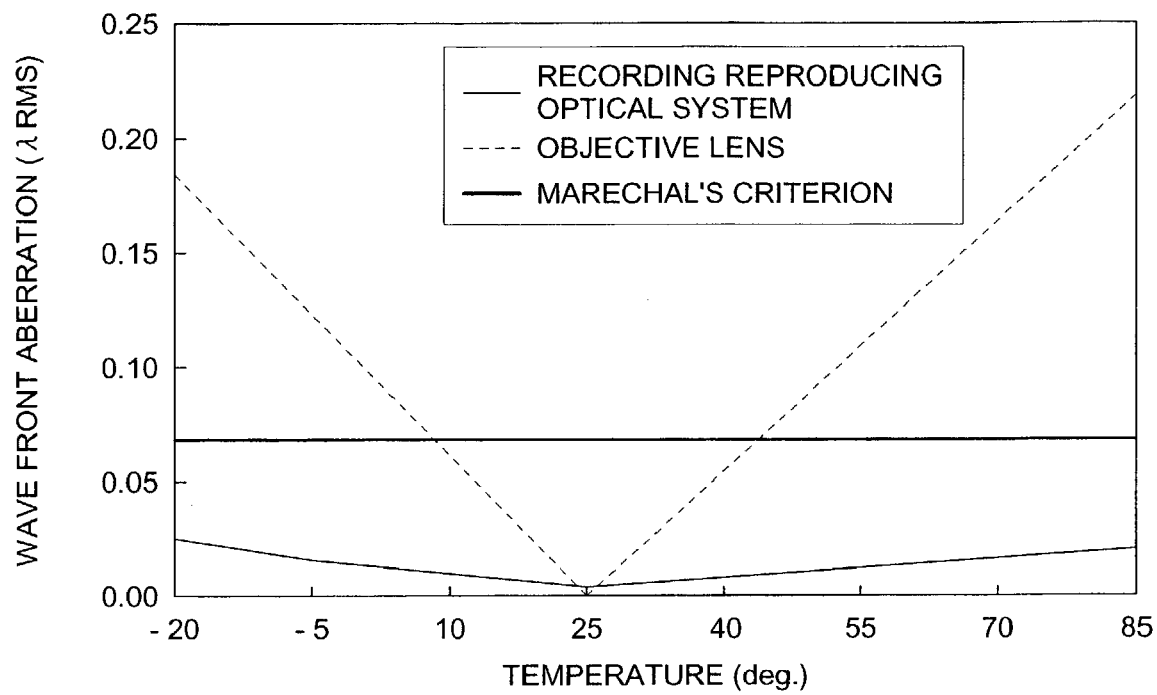
FIG. 44 is a view showing the temperature characteristic of the recording reproducing optical system of Example 7.

In FIG. 44, the temperature characteristic of the recording reproducing optical system of the present example when the recording reproducing of the information is conducted onto the high density DVD is shown. As can be seen from FIG. 44, when the high NA plastic objective lens and aberration correcting optical element are combined, the good light converging characteristic can be maintained in the temperature range of −20 to +85° C.

Figure 45:
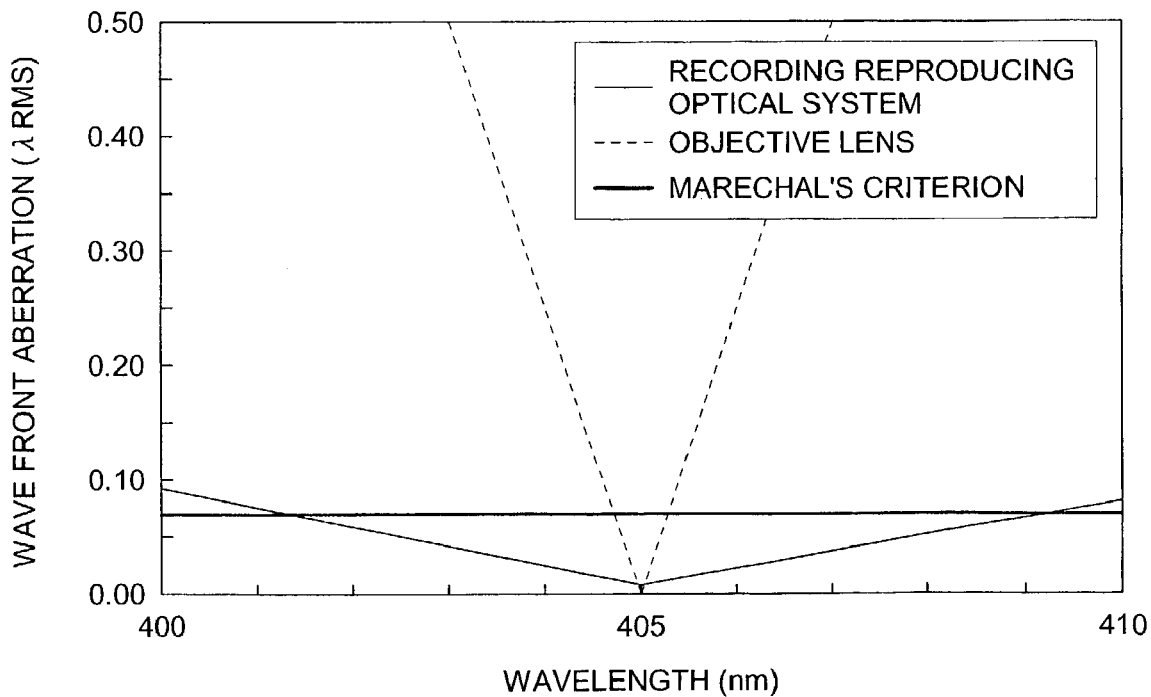
FIG. 45 is a view showing the wavelength characteristic of the recording reproducing optical system of Example 7.

In FIG. 45, the wavelength characteristic of the recording reproducing optical system of the present example when the recording reproducing of the information is conducted onto the high density DVD is shown. As can be seen from FIG. 44, when the high NA plastic objective lens and aberration correcting optical element are combined, the good light converging characteristic can be maintained in the temperature range of −20 to +85° C.

In FIG. 45, the wavelength characteristic of the recording reproducing optical system of the present example when the recording reproducing of the information is conducted onto the high density DVD is shown. As can be seen from FIG. 45, when the high NA plastic objective lens and aberration correcting optical element are combined, even when the wavelength change of 2 nm occurs, the good light converging characteristic can be maintained.

Example 8

Example 8 is an optical system for recording reproducing which is suitable for an optical pickup device shown in FIG. 46. The present example is the optical system for the recording reproducing which employs a single objective lens and is universally possible to record or reproduce information on a high density DVD, DVD, and CD which have a protective layer of 0.6 mm in thickness, wherein a hybrid refractive-diffractive collimator lens is arranged as an optical element for correcting for the aberration, in the optical path between a violet blue semiconductor laser for the high density DVD and a red semiconductor laser for the DVD. Further, in the case of recording reproducing of information on the CD, divergent light flux emitted from an infrared semiconductor laser for the CD enters an hybrid refractive-diffractive objective lens and converges on the information recording surface for the CD.

A plastic lens, structured in one element in one group whose focal length is 15 mm and NA is 0.173, is used for the hybrid refractive-diffractive collimator lens, while a plastic lens, structured in one element in one group whose focal length is 3.077 mm, is used for the hybrid refractive-diffractive objective lens. The NA of the hybrid refractive-diffractive objective lens, is 0.65 for the recording reproducing on the high density DVD, 0.61 for the DVD, and 0.50 for the CD. Still further, the surface of the hybrid refractive-diffractive collimator lens, facing the optical disk, is a diffractive surface having a negative diffractive power, while the surface of the hybrid refractive-diffractive objective lens, facing the semiconductor laser, is a diffractive surface having a positive diffractive power.

Table 8 shows data of the optical system for recording reproducing of Example 8.

TABLE 8

High density DVD

| surface No. | r (mm) | d (mm) | Nλ | vd | Note |
|---|---|---|---|---|---|
| 0 | | 14.1147 | | | *1 |
| 1 | 22.7830 | 2.0000 | 1.52469 | 56.5 | *2 |
| 2 | −5.0671 | 10.0000 | | | |
| 3 | 2.3622 | 2.0000 | 1.52469 | 56.5 | *3 |
| 4 | −17.6862 | 1.4434 | | | |
| 5 | ∞ | 0.6000 | 1.53017 | 64.2 | *4 |
| 6 | ∞ | | | | |

DVD

| surface No. | r (mm) | d (mm) | Nλ | vd | Note |
|---|---|---|---|---|---|
| 0 | | 16.4067 | | | *1 |
| 1 | 22.7830 | 2.0000 | 1.50650 | 56.5 | *2 |
| 2 | −5.0671 | 10.0000 | | | |
| 3 | 2.3622 | 2.0000 | 1.50650 | 56.5 | *3 |
| 4 | −17.6862 | 1.6755 | | | |
| 5 | ∞ | 0.6000 | 1.51436 | 64.2 | *4 |
| 6 | ∞ | | | | |

CD

| surface No. | r (mm) | d (mm) | Nλ | vd | Note |
|---|---|---|---|---|---|
| 0 | | 52.4247 | | | *1 |

TABLE 8-continued

| 3 | 2.3622 | 2.0000 | 1.50497 | 56.5 | *3 |
|---|---|---|---|---|---|
| 4 | −17.6862 | 1.3435 | | | |
| 5 | ∞ | 1.2000 | 1.51107 | 64.2 | *4 |
| 6 | ∞ | | | | |

Aspheric surface coefficient

| | first surface | second surface | third surface | fourth surface |
|---|---|---|---|---|
| κ | −1.15676E+01 | −9.99570E−01 | −6.70590E−01 | −1.75087E+02 |
| A4 | | −1.12430E−04 | 2.78110E−03 | 8.50063E−03 |
| A6 | | | 9.77230E−04 | −1.92307E−03 |
| A8 | | | −2.45380E−04 | −7.96272E−06 |
| A10 | | | 3.75040E−05 | 2.23071E−05 |
| A12 | | | −3.12700E−06 | |

Diffractive surface coefficient

| | second surface | third surface |
|---|---|---|
| b2 | −1.00000E−02 | −2.00000E−02 |
| b4 | −4.49650E−06 | −5.56790E−04 |
| b6 | | 1.47480E−04 |
| b8 | | −6.27760E−05 |
| b10 | | 7.11410E−06 |

Note:
*1: light source
*2: collimator lens
*3: objective lens
*4: protective layer In the lens data shown in Table 8, a diffractive surface coefficient, which is for the surface of the hybrid refractive-diffractive objective lens, facing the light source, is determined so that the second order diffracted ray is generated, when the light flux enters from the violet blue semiconductor laser. When the red semiconductor laser for the DVD and the infrared semiconductor laser for the CD enter the diffractive surface determined as mentioned above, the first order diffracted ray is generated. Further, the design basis wavelength (or manufacturing wavelength of the diffractive structure) of the diffractive surface coefficient of the surface of the hybrid refractive-diffractive objective lens, facing the light source, is determined to be 380 nm so that it is possible to obtain the higher diffractive efficiency in each wavelength area of the light emitted from the violet blue semiconductor laser, the light emitted from the red semiconductor laser, and the light emitted from the infrared semiconductor laser.

Still further, the hybrid refractive-diffractive collimator lens is arranged in the parallel light flux, emitted from the violet blue semiconductor laser and the red semiconductor laser, and functions as an optical element for correcting for the aberration, to correct for the spherical aberration change caused by the temperature change, and also to correct for a defocus error in case of a mode hop of the semiconductor laser, in the both cases of the information recording reproducing for the high density DVD, and the information recording reproducing for the DVD.

Still further, a diffractive surface coefficient, which is for the surface of the hybrid refractive-diffractive collimator lens, facing the optical disk, is determined so that the third diffracted ray is generated, when the light flux enters from the violet blue semiconductor laser. When the light from the red semiconductor laser enters the diffractive surface determined as mentioned above, the second order diffracted ray is generated. Further, the design basis wavelength (or manufacturing wavelength of the diffractive structure) of the diffractive surface coefficient of the surface of the hybrid refractive-diffractive collimator lens, facing the optical disk, is determined to be 415 nm so that it is possible to obtain the higher diffractive efficiency in each wavelength area of the light emitted from the violet blue semiconductor laser, and the light emitted from the red semiconductor laser.

Concerning the hybrid refractive-diffractive collimator lens of the present example, when the wavelength of the violet blue semiconductor laser and the wavelength of the red semiconductor laser change to the longer wavelength side, the focal point shifts to an over side, and when the wavelength of the violet blue semiconductor laser and the wavelength of the red semiconductor laser change to the shorter wavelength side, the focal point shifts to an under side. Further concerning the hybrid refractive-diffractive objective lens of the present example, when the wavelength of the violet blue semiconductor laser and the wavelength the red semiconductor laser change to the longer wavelength side, the focal point shifts to the under side, and when the wavelength of the violet blue semiconductor laser and the wavelength the red semiconductor laser change to the shorter wavelength side, the focal point shifts to the over side.

In the optical system for the recording reproducing in which the hybrid refractive-diffractive objective lens and the hybrid refractive-diffractive collimator lens are paired, and both of whose focal points depend upon the wavelength, the focal point hardly shifts, even when the wavelength of the violet blue semiconductor laser and the wave length of the red semiconductor laser change.

Figure 47:
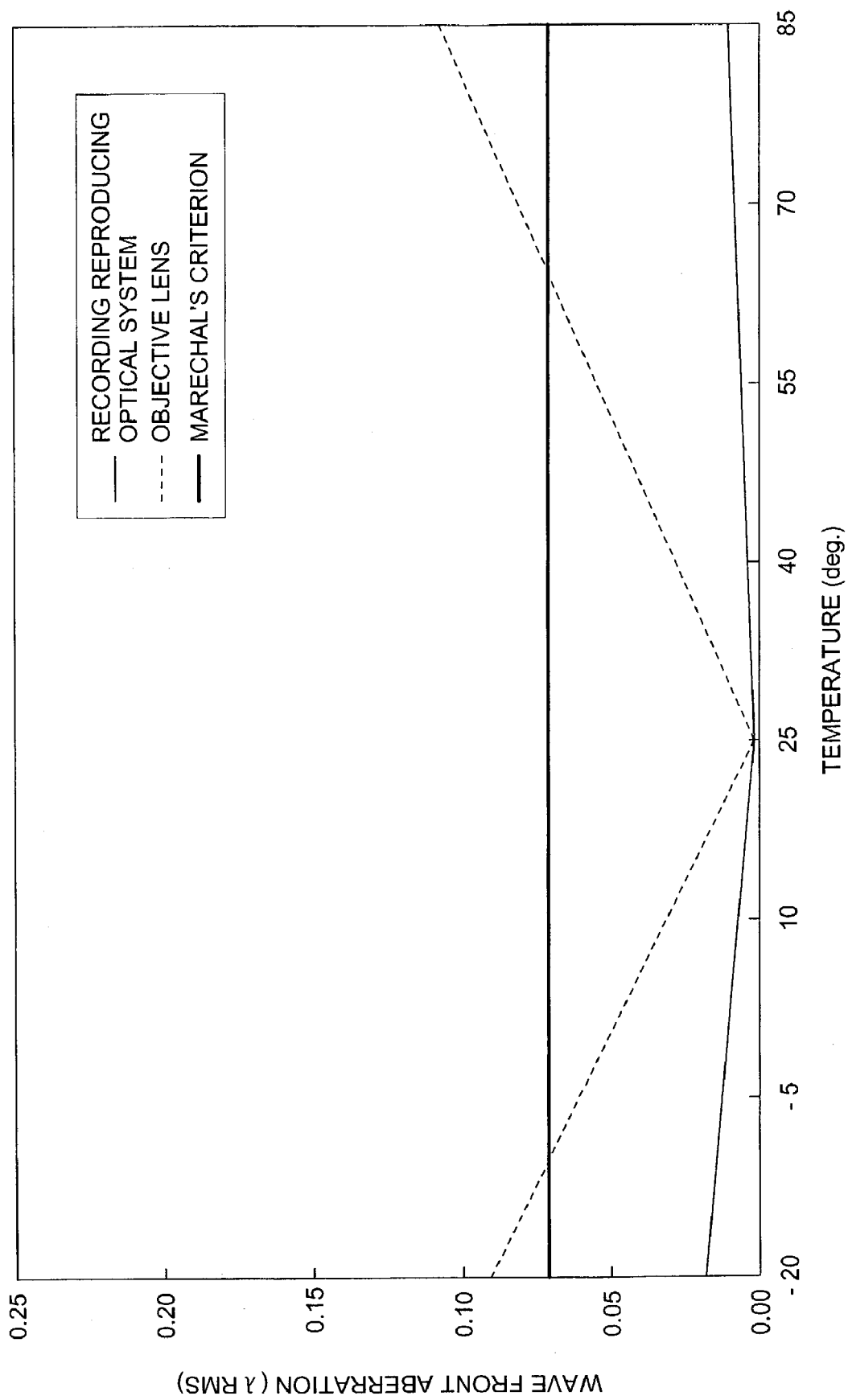
FIG. 47 is a view showing the temperature characteristic of the recording reproducing optical system of Example 8 for a high density DVD.
Figure 48:
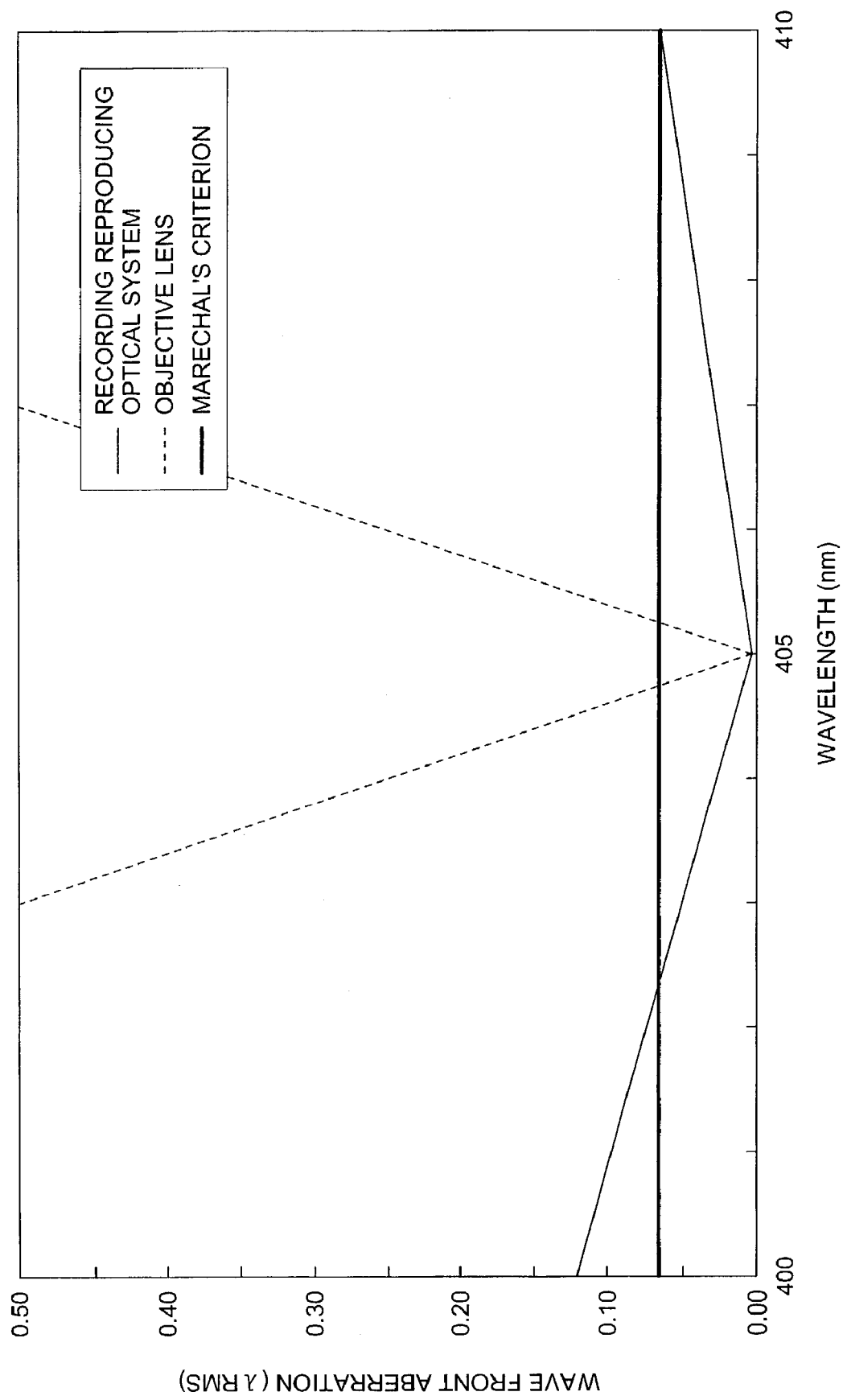
FIG. 48 is a view showing the temperature characteristic of the recording reproducing optical system of Example 8 for DVD.

FIG. 47 shows a temperature characteristic of the optical system for the recording reproducing of the present example, when the recording reproducing of information are performed on the high density DVD, and FIG. 48 shows a temperature characteristic of the optical system for the recording reproducing of the present example, when the recording reproducing of information are performed on the DVD. As understood by FIGS. 47 and 48, in case of recording reproducing on both optical disks, it is possible to preserve the preferable light converging characteristic in the temperature range of −20° C. to 85° C.

In FIGS. 47 and 48, for calculating the wave front aberration during the temperature change, considered are the refractive index change (the changing ratio of $-1.1 \times 10^{-4}$/° C.) of the plastic lens to the change of temperature, and the wavelength change (the changing ratio of +0.05 nm /° C. for the violet blue semiconductor laser, and +0.2 nm /° C. for the red semiconductor laser) of the semiconductor laser, but the change of a form of the plastic lens is not considered.

Figure 49:
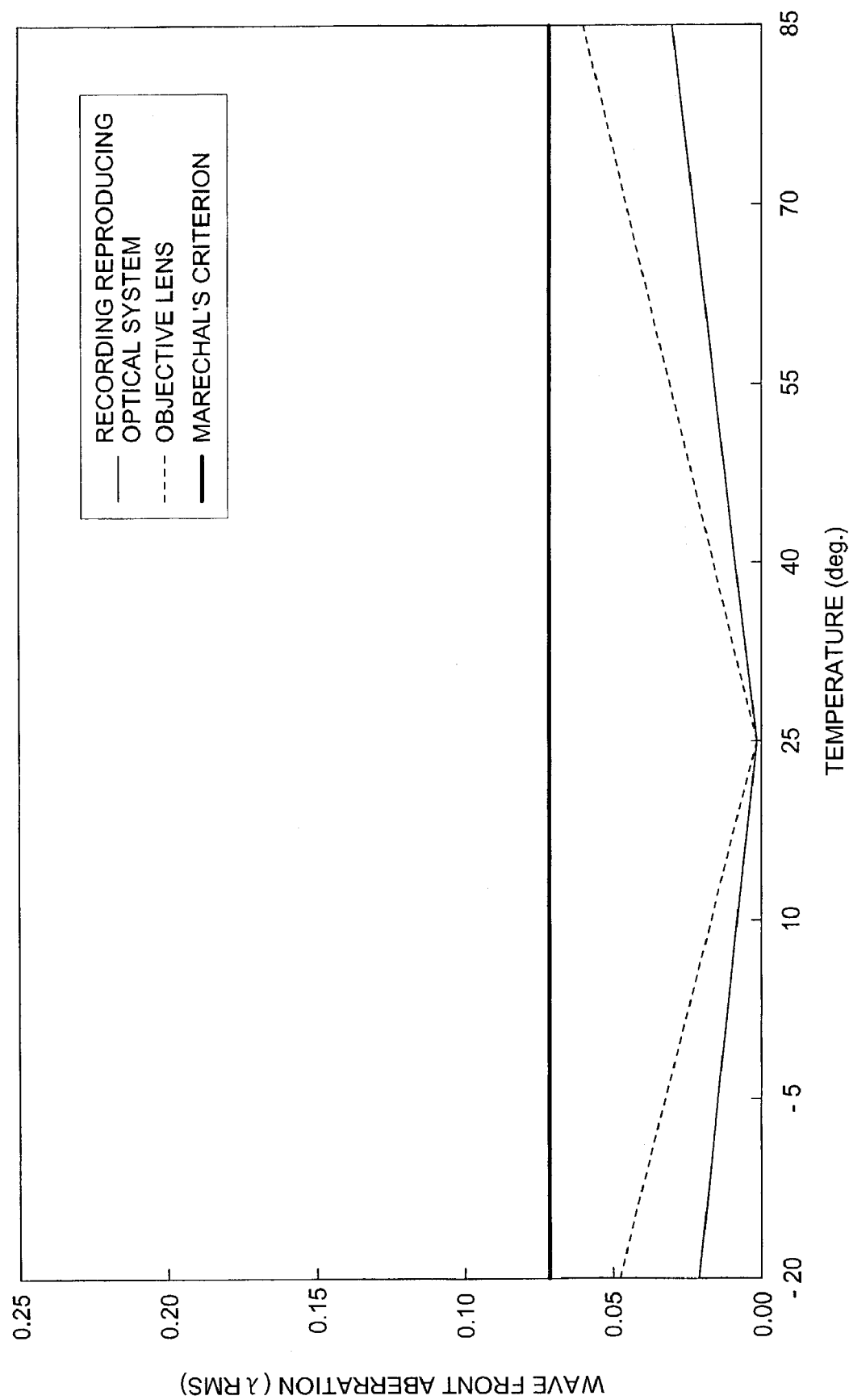
FIG. 49 is a view showing the wavelength characteristic of the recording reproducing optical system of Example 8 for a high density DVD.
Figure 50:
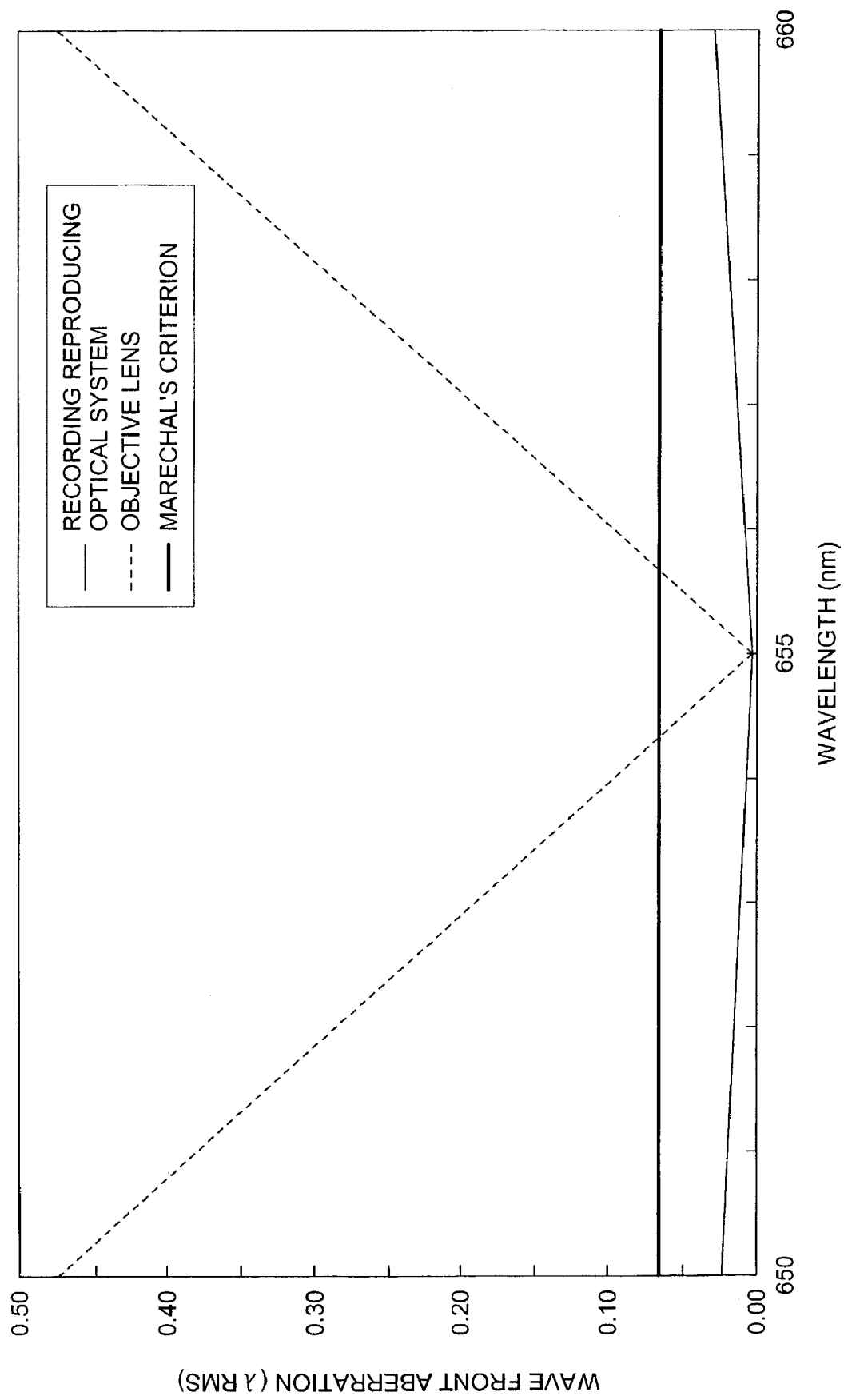
FIG. 50 is a view showing the wavelength characteristic of the recording reproducing optical system of Example 8 for DVD.

FIG. 49 shows a wavelength characteristic of the optical system for the recording reproducing of the present example, when the recording reproducing of information are performed on the high density DVD, and FIG. 50 shows a wavelength characteristic of the optical system for the recording reproducing of the present example, when the recording reproducing of information are performed on the DVD. As understood by FIGS. 49 and 50, in case of recording reproducing on both optical disks, it is possible to preserve the preferable light converging characteristic, even when the wavelength changes about 2 nm.

In FIGS. 49 and 50, when the wave front aberration is calculated in the course of the wavelength change generated by the mode hopping, it is determined that the focusing of the objective lens is not performed, therefore, the objective lens is fixed at the best focal point on the design basis wavelength (405 nm for the violet blue semiconductor laser, and 655 nm for the red semiconductor laser) of the semiconductor laser, and the wave front aberration values in FIGS. 49 and 50 include the defocus components caused by the shift of the best focal point.

In the lens data of above-described Examples 1 to 8, the diffractive surface coefficient of the diffractive surface of the aberration correcting optical element and objective lens is, except the diffractive surface of Example 7, when the ray from the blue violet semiconductor laser is incident, determined so that the primary order diffracted ray has the maximum diffracted-light amount, and the reference wavelength of the diffractive surface coefficient is 405 nm. When actual diffractive structure is produced, every when the optical path difference function expressed by using these diffractive surface coefficient is changed by m times of the reference wavelength of the diffractive surface coefficient when m is a positive integer, the ring-shaped zone step difference is provided. When m=n (n is an integer not smaller than 2), because the ring-shaped zone pitch is n times of the case where m=1, it is preferable because the lowering of the diffraction efficiency by the shape error of the ring-shaped zone step difference can be decreased, and in this case, in the diffracted light of the ray incident on the diffractive structure, n order diffracted ray is generated so that it has the maximum diffracted-light amount. However, when n is too large, because the wavelength dependency of the diffraction efficiency is increased, 2 to 10 is a preferable range of n.

In above-described Tables 1 to 8, r (mm) is the paraxial radius of curvature of each surface, d (mm) is the surface interval, Nλ is the refractive index in 405 nm, and νd is Abbe's number in d ray. Further, in Table 7, it is expressed that r (mm) is the paraxial radius of curvature of each surface, d (mm) is the surface interval, and Nλ is the refractive index in 405 nm in the high density DVD, refractive index in 650 nm in DVD, and refractive index in 780 nm in CD.

In this connection, in the above-described each Table or drawing, for the expression of the exponent of 10, E (or e) is used, for example, there is a case where it is expressed like as E-02 (=$10^{-2}$).

According to the present invention, in the recording reproducing optical system of the optical disk for which the plastic objective lens of one lens in one group composition of the high NA is used, the change of the wave front aberration of the objective lens due to the temperature change can be compensated. Particularly, it is not necessary that the change of the wave front aberration of the objective lens due to the temperature change is dynamically detected, and the recording reproducing optical system can be produced at a low cost.

Further, the optical pick-up apparatus for the optical disk in which this recording reproducing optical system is mounted, and the recording reproducing apparatus for the optical disk in which this optical pick-up apparatus is mounted, can be provided.

Further, there can be provided the objective lens and the aberration correcting optical element which are appropriate for the recording reproducing optical system by which the change of the wave front aberration of the plastic objective lens of one lens in one group composition of the high NA due to the temperature change can be compensated.

What is claimed is:

1. A recording reproducing optical system for conducting recording and/or reproducing information for an optical information recording medium, comprising:

a light source;

an objective lens to converge a light flux emitted from the light source onto an information recording plane of the optical information recording medium; and an aberration correcting optical element provided on an optical path between the light source and the objective lens;

wherein the objective lens includes an aspherical surface on at least one surface thereof and at least one diffractive surface on which a diffractive structure structured by a plurality of concentric ring-shaped zonal steps is formed and the objective lens is a plastic lens structured in one element in one group, wherein the aberration correcting optical element comprises at least one plastic lens on which a diffractive structure structured by a plurality of concentric ring-shaped zonal steps is formed on at least one surface thereof, and wherein the following formulas are satisfied:

$PD1>0$ $PD2<0$ $PR2>0$ where PD1 is a diffractive power (mm$^{-1}$) as a diffractive lens defined by the formula of $PD1=\Sigma(-2 \cdot b_{2i} \cdot ni)$ when an optical path difference $\phi_{bi}$ (mm) added to a wavefront having transmitted through a diffractive structure formed on an i-th surface of the objective lens is expressed as a function of a height hi (mm) from the optical axis by an optical path difference function defined by $\phi_{bi}=ni \cdot (b_{2i} \cdot hi^2 + b_{4i} \cdot hi^4 + b_{6i} \cdot hi^6 + \ldots)$ (herein, ni is a diffraction order of a diffracted ray having the maximum diffraction efficiency among diffracted rays generated by the diffractive structure formed on the i-th surface, and $b_{2i}$, $b_{4i}$, $b_{6i}$, . . . are optical path difference function coefficients of second order, fourth order, sixth order, . . . respectively), PD2 is a diffractive power (mm$^{-1}$) as a diffractive lens defined by the formula of $PD2=\Sigma(-2 \cdot b_{2j} \cdot nj)$ when an optical path difference $\phi_{bj}$ (mm) added to a wavefront having transmitted through a diffractive structure formed on an j-th surface of the aberration correcting optical element is expressed as a function of a height hi (mm) from the optical axis by an optical path difference function defined by $\phi_{bj}=nj \cdot (b_{2j} \cdot hj^2 + b_{4j} \cdot hj^4 + b_{6j} \cdot hj^6 + \ldots)$ (herein, nj is a diffraction order of a diffracted ray having the maximum diffraction efficiency among diffracted rays generated by the diffractive structure formed on the j-th surface, and $b_{2j}$, $b_{4j}$, $b_{6j}$, . . . are optical path difference function coefficients of second order, fourth order, sixth order, . . . respectively), and PR2 is a refractive power (mm$^{-1}$) as a refractive lens of the plastic lens of the aberration correcting optical element.

2. The recording reproducing optical system of claim 1, wherein the light source emits a light flux having a wavelength of 500 nm or less and the objective lens has an optical information recording medium-side numerical aperture of 0.75 or more.

3. The recording reproducing optical system of claim 2, wherein the objective lens has an optical information recording medium-side numerical aperture of 0.80 or more.

4. The recording reproducing optical system of claim 1, wherein the objective lens satisfies the following formula:

$f2<f0<f1$ where f0 is a focal length (mm) of an entire system of the objective lens for the wavelength of a light flux emitted from the light source, f1 is a focal length (mm) of an entire system of the objective lens for a wavelength shorter by a predetermined wavelength difference than the wavelength of a light flux emitted from the light source, and f2 is a focal length (mm) of an entire system of the objective lens for a wavelength longer by a predetermined wavelength difference than the wavelength of a light flux emitted from the light source.

5. The recording reproducing optical system of claim 1, wherein the light source comprises at least two kinds of light source different in wavelength, wherein the objective lens converges at least two light fluxes having respective different wavelengths on respective information recording planes of at least two kinds of optical information recording mediums different in thickness of a protective layer to protect an information recording plane and the objective lens has a wavelength characteristic to make diffracted rays of the at least two light fluxes to form a good wavefront on the respective information recording planes within an optical information recording medium-side numerical aperture necessary for conducting recording and/or reproducing information for the two kinds of optical information recording mediums, and wherein the aberration correcting optical element is provided on an optical path between a light source emitting a light flux having the shortest wavelength among the at least two light fluxes and the objective lens, and wherein the following formulas are satisfied:

$$PD1' > 0$$

$$PD2' < 0$$

$$PR2' > 0$$

where PD1' is a diffractive power (mm$^{-1}$) as a diffractive lens defined by the formula of $PD1' = \Sigma(-2 \cdot b_{2i}' \cdot ni')$ when an optical path difference $\phi_{bi}'$ (mm) added to a wavefront having transmitted through a diffractive structure formed on an i-th surface of the objective lens is expressed as a function of a height hi (mm) from the optical axis by an optical path difference function defined by $\phi_{bi}' = ni' \cdot (b_{2i}' \cdot hi^2 + b_{4i}' \cdot hi^4 + b_{6i}' \cdot hi^6 + \ldots)$ (herein, ni' is a diffraction order of a diffracted ray having the maximum diffraction efficiency among diffracted rays generated by the diffractive structure formed on the i-th surface, and $b_{2i}'$, $b_{4i}'$, $b_{6i}'$, ... are optical path difference function coefficients of second order, fourth order, sixth order, ... respectively, (they are called also diffractive surface coefficients)), PD2' is a diffractive power (mm$^{-1}$) as a diffractive lens defined by the formula of $PD2' = \Sigma(-2 \cdot b_{2j}' \cdot nj')$ when an optical path difference $\phi_{bj}'$ (mm) added to a wavefront having transmitted through a diffractive structure formed on an j-th surface of the aberration correcting optical element is expressed as a function of a height hi (mm) from the optical axis by an optical path difference function defined by $\phi_{bj}' = nj' \cdot (b_{2j}' \cdot hj^2 + b_{4j}' \cdot hj^4 + b_{6j}' \cdot hj^6 + \ldots)$ (herein, nj' is a diffraction order of a diffracted ray having the maximum diffraction efficiency among diffracted rays generated by the diffractive structure formed on the j-th surface, and $b_{2j}'$, $b_{4j}'$, $b_{6j}'$, ... are optical path difference function coefficients of second order, fourth order, sixth order, ... respectively, (they are called also diffractive surface coefficients)), and PR2' is a refractive power (mm$^{-1}$) as a refractive lens of the plastic lens of the aberration collecting optical element.

6. The recording reproducing optical system of claim 5, wherein the objective lens has the wavelength characteristic with which diffracted rays of a light flux having a shorter wavelength forms a good wavefront on an optical information recording medium having a thinner protective layer and diffracted rays of a light flux having a longer wavelength forms a good wavefront on an optical information recording medium having a thicker protective layer.

7. The recording reproducing optical system of claim 5, wherein the light source emitting a light flux having the shortest wavelength emits a light flux having a wavelength of 500 nm or less and the objective lens has an optical information recording medium-side numerical aperture of 0.75 or more necessary for conducting recording and/or reproducing information for an optical information recording medium having the thinnest protective layer.

8. The recording reproducing optical system of claim 7, wherein the optical information recording medium-side numerical aperture is 0.80 or more.

9. The recording reproducing optical system of claim 5, wherein the objective lens satisfies the following formula:

$$f2' < f0' < f1'$$

where f0' is a focal length (mm) of an entire system of the objective lens for the shortest wavelength of a light flux, f1' is a focal length (mm) of an entire system of the objective lens for a wavelength shorter by a predetermined wavelength difference than the shortest wavelength of a light flux, and f2' is a focal length (mm) of an entire system of the objective lens for a wavelength longer by a predetermined wavelength difference than the shortest wavelength of a light flux.

10. The recording reproducing optical system of claim 1, wherein the light source comprises at least two kinds of light source different in wavelength, wherein the objective lens converges at least two light fluxes having respective different wavelengths on respective information recording planes of at least two kinds of optical information recording mediums different in recording density, wherein the objective lens has at least one diffractive surface on which a diffractive structure comprising a plurality of concentric ring-shaped zonal steps designed in such a way that a diffraction order of a diffracted ray having the maximum diffraction efficiency among diffracted rays generated when a light flux having a longer wavelength among the at least two light fluxes comes to be incident is a lower order than that of a diffracted ray having the maximum diffraction efficiency among diffracted rays generated when a light flux having a shortest wavelength comes to be incident is formed, wherein the objective lens has a wavelength characteristic to make diffracted rays of a light flux having the shortest wavelength to form a good wavefront on the information recording plane of the optical information recording medium having a highest recording density and to make diffracted rays of a light flux having the longer wavelength to form a good wavefront on the information recording plane of the optical information recording medium having a low recording density, and wherein the aberration correcting optical element is provided on at least an optical path on which a light flux having the shortest wavelength passes among the optical path between the light source and the objective lens, and wherein the following formulas are satisfied:

PD1">0

PD2"<0

PR2">0 where PD1" is a diffractive power (mm$^{-1}$) as a diffractive lens defined by the formula of PD1"=$\Sigma(-2 \cdot b_{2i}" \cdot ni")$ when an optical path difference $\phi_{bi}"$ (mm) added to a wavefront having transmitted through a diffractive structure formed on an i-th surface of the objective lens is expressed as a function of a height hi (mm) from the optical axis by an optical path difference function defined by $\phi_{bi}"=ni" \cdot (b_{2i}" \cdot hi^2 + b_{4i}" \cdot hi^4 + b_{6i}" \cdot hi^6 + \ldots)$ (herein, ni" is a diffraction order of a diffracted ray having the maximum diffraction efficiency among diffracted rays generated by the diffractive structure formed on the i-th surface, and $b_{2i}"$, $b_{4i}"$, $b_{6i}"$, . . . are optical path difference function coefficients of second order, fourth order, sixth order, . . . respectively, (they are called also diffractive surface coefficients)), PD2" is a diffractive power (mm$^{-1}$) as a diffractive lens defined by the formula of PD2"=$\Sigma(-2 \cdot b_{2j}" \cdot nj")$ when an optical path difference $\phi_{bj}"$ (mm) added to a wavefront having transmitted through a diffractive structure formed on an j-th surface of the aberration correcting optical element is expressed as a function of a height hi (mm) from the optical axis by an optical path difference function defined by $\phi_{bj}"=nj" \cdot (b_{2j}" \cdot hj^2 + b_{4j}" \cdot hj^4 + b_{6j}" \cdot hj^6 + \ldots)$ (herein, nj" is a diffraction order of a diffracted ray having the maximum diffraction efficiency among diffracted rays generated by the diffractive structure formed on the j-th surface, and $b_{2j}"$, $b_{4j}"$, $b_{6j}"$, . . . are optical path difference function coefficients of second order, fourth order, sixth order, . . . respectively, (they are called also diffractive surface coefficients)), and PR2" is a refractive power (mm$^{-1}$) as a refractive lens of the plastic lens of the aberration collecting optical element.

11. The recording reproducing optical system of claim 10, wherein the shortest wavelength is 380 nm to 420 nm and the longer wavelength is 630 nm to 670 nm.

12. The recording reproducing optical system of claim 11, wherein n1 is a diffraction order of a diffracted ray having the maximum diffraction efficiency among diffracted rays generated when a light flux having a wavelength of 380 nm to 420 nm comes to be incident and n2 is a diffraction order of a diffracted ray having the maximum diffraction efficiency among diffracted rays generated when a light flux having a wavelength of 630 nm to 670 nm comes to be incident, a combination of n1 and n2 is one of (n1, n2)=(2, 1), (3, 2), (4, 2), (5, 3), (6, 4), (7, 4), (8, 5), (9, 6), (10, 6).

13. The recording reproducing optical system of claim 10, wherein the shorter wavelength is 380 nm to 420 nm and the longer wavelength is 630 nm to 670 nm and 760 nm to 800 nm.

14. The recording reproducing optical system of claim 13, wherein n1 is a diffraction order of a diffracted ray having the maximum diffraction efficiency among diffracted rays generated when a light flux having a wavelength of 380 nm to 420 nm comes to be incident, n2 is a diffraction order of a diffracted ray having the maximum diffraction efficiency among diffracted rays generated when a light flux having a wavelength of 630 nm to 670 nm comes to be incident, and n3 is a diffraction order of a diffracted ray having the maximum diffraction efficiency among diffracted rays generated when a light flux having a wavelength of 760 nm to 800 nm comes to be incident, a combination of n1, n2 and n3 is one of (n1, n2, n3)=(2, 1, 1), (4, 3, 2), (6, 4, 3), (8, 5, 4), (10, 6, 5).

15. The recording reproducing optical system of claim 10, wherein the aberration correcting optical element is provided on an optical path on which both of a light flux having the shortest wavelength and a light flux having the longer wavelength pass among the optical path between the light source and the objective lens, and wherein the diffractive structure formed on the surface of the aberration correcting optical element is designed in such a way that a diffraction order of a diffracted ray having the maximum diffraction efficiency among diffracted rays generated when a light flux having a longer wavelength among the at least two light fluxes comes to be incident is a lower order than that of a diffracted ray having the maximum diffraction efficiency among diffracted rays generated when a light flux having a shortest wavelength comes to be incident.

16. The recording reproducing optical system of claim 10, wherein the objective lens has a predetermined optical information recording medium-side numerical aperture of 0.60 to 0.70 necessary for conducting recording and/or reproducing information for the optical information recording medium having a highest recoding density and converge diffracted rays of the light flux having the shortest wavelength through a protective layer having a thickness of 0.55 to 0.65 mm so as to form a good wavefront on an information recoding plane of an optical information recoding medium having a highest recording density.

17. The recording reproducing optical system of claim 10, wherein the objective lens has a predetermined optical information recording medium-side numerical aperture of more than 0.80 necessary for conducting recording and/or reproducing information for the optical information recording medium having a highest recoding density and converge diffracted rays of the light flux having the shortest wavelength through a protective layer having a thickness of 0.07 to 0.13 mm so as to form a good wavefront on an information recoding plane of an optical information recoding medium having a highest recording density.

18. The recording reproducing optical system of claim 10, wherein the objective lens satisfies the following formula:

f2"<f0"<f1"

where f0" is a focal length (mm) of an entire system of the objective lens for the shortest wavelength of a light flux, f1" is a focal length (mm) of an entire system of the objective lens for a wavelength shorter by a predetermined wavelength difference than the shortest wavelength of a light flux, and f2" is a focal length (mm) of an entire system of the objective lens for a wavelength longer by a predetermined wavelength difference than the shortest wavelength of a light flux.

19. The recording reproducing optical system of claim 1, wherein the following formula is satisfied:

0.05<PD1/PT1<0.7 where PT1 is a power (mm$^{-1}$) of an entire system of the objective lens.

20. The recording reproducing optical system of claim 1, wherein a lateral magnification of the objective lens satisfies the following formula:

$$0 < M < 1$$

21. The recording reproducing optical system of claim 1, wherein the aberration correcting optical element is a coupling lens to change a divergence of the divergent light flux emitted from the light source.

22. The recording reproducing optical system of claim 1, further comprising:
a coupling lens to change a divergence of the divergent light flux emitted from the light source, wherein the aberration correcting optical element is provided on an optical path between the coupling lens and the objective lens and is comprised of a positive lens group and a negative lens group.

23. The recording reproducing optical system of claim 1, further comprising:
a coupling lens to change a divergence of the divergent light flux emitted from the light source, wherein the aberration correcting optical element is provided on an optical path between the coupling lens and the objective lens and is a plastic lens structured in one element in one group.

24. An objective lens for use in a recording reproducing optical system for conducting recording and/or reproducing information for an optical information recording medium, consisting of:
an aspherical plastic lens structured in one element in one group and including at least one diffractive surface on which a diffractive structure structured by a plurality of concentric ring-shaped zonal steps is formed,
wherein the objective lens has an optical information recording medium-side numerical aperture of 0.80 or more and satisfies the following formula:

$$f2 < f0 < f1$$

where f0 is a focal length (mm) of an entire system of the objective lens for the wavelength of a light flux emitted from the light source,
f1 is a focal length (mm) of an entire system of the objective lens for a wavelength shorter by a predetermined wavelength difference than the wavelength of a light flux emitted from the light source, and
f2 is a focal length (mm) of an entire system of the objective lens for a wavelength longer by a predetermined wavelength difference than the wavelength of a light flux emitted from the light source.

25. The objective lens of claim 24, wherein the objective lens is used in a recording reproducing optical system conducting recording and/or reproducing information for an optical information medium by using a light flux having a wavelength of 500 nm or less.

26. The objective lens of claim 24, wherein the objective lens has a wavelength characteristic to make diffracted rays of at least two kinds of light fluxes different in wavelength to form a good wavefront on the respective information recording planes within an optical information recording medium-side numerical aperture necessary for conducting recording and/or reproducing information for the two kinds of optical information recording mediums different in thickness of a protective layer, and wherein the objective lens satisfies the following formula:

$$f2' < f0' < f1'$$

where f0' is a focal length (mm) of an entire system of the objective lens for the shortest wavelength of a light flux among the two kinds of light fluxes,
f1' is a focal length (mm) of an entire system of the objective lens for a wavelength shorter by a predetermined wavelength difference than the shortest wavelength of a light flux, and
f2' is a focal length (mm) of an entire system of the objective lens for a wavelength longer by a predetermined wavelength difference than the shortest wavelength of a light flux.

27. The objective lens of claim 26, wherein the objective lens has the wavelength characteristic with which diffracted rays of a light flux having a shorter wavelength forms a good wavefront on an optical information recording medium having a thinner protective layer and diffracted rays of a light flux having a longer wavelength forms a good wavefront on an optical information recording medium having a thicker protective layer.

28. The objective lens of claim 26, wherein the shortest wavelength is 500 nm or less and the objective lens has an optical information recording medium-side numerical aperture of 0.80 or more necessary for conducting recording and/or reproducing information for an optical information recording medium having the thinnest protective layer.

29. The objective lens of claim 24, wherein the following formula is satisfied:

$$0.05 < PD1/PT1 < 0.7$$

where PD1 is a diffractive power ($mm^{-1}$) as a diffractive lens defined by the formula of $PD1 = \Sigma(-2 \cdot b_{2i} \cdot ni)$ when an optical path difference $\phi_{bi}$ (mm) added to a wavefront having transmitted through a diffractive structure formed on an i-th surface of the objective lens is expressed as a function of a height hi (mm) from the optical axis by an optical path difference function defined by $\phi_{bi} = ni \cdot (b_{2i} \cdot hi^2 + b_{4i} \cdot hi^4 + b_{6i} \cdot hi^6 + \ldots)$ (herein, ni is a diffraction order of a diffracted ray having the maximum diffraction efficiency among the diffracted rays generated by the diffractive structure formed on the i-th surface, and $b_{2i}$, $b_{4i}$, $b^{6i}$, . . . are optical path difference function coefficients of second order, fourth order, sixth order, . . . respectively, (they are called also diffractive surface coefficients)), and
PT1 is a power ($mm^{-1}$) of an entire system of the objective lens.

30. The objective lens of claim 24, wherein at lease one diffractive surface of diffractive surfaces of the objective lens satisfied the following formula:

$$0 < |(Ph/Pf) - 2| < 10$$

where Pf is a distance (mm) between adjacent ring-shaped zones of the diffractive surface in a direction perpendicular to the optical axis at the optical information recording medium-side maximum numerical aperture, and
Ph is a distance (mm) between adjacent ring-shaped zones of the diffractive surface in a direction perpendicular to the optical axis at a numerical aperture being half of the optical information recording medium-side maximum numerical aperture.

31. The objective lens of claim 24, wherein the following formula is satisfied:

$$0.8 \leq d/f \leq 2.4$$

where d is a lens thickness (mm) of the objective lens on the optical axis, and
f is a focal length (mm).

32. The objective lens of claim 24, wherein the ring-shaped diffractive structure is formed on both surfaces of the objective lens.

33. The objective lens of claim 24, wherein a diffraction efficiency of n-th order diffracted rays of a predetermined wavelength is larger than that of any other order diffracted rays generated by the diffractive structure and the objective lens converges the n-th order diffracted rays on an information recording plane so as to conduct recording and/or reproducing information for the optical information recording medium, wherein n is an integer except 0, 1 and −1.

34. The objective lens of claim 24, wherein a lateral magnification of the single body of the objective lens satisfies the following formula:

$$0 < M < 0.25$$

35. The objective lens of claim 24, wherein the diffractive structure formed on the objective lens has a saw-shaped blaze structure produced by a patter drawing technique with an electron beam or molded by a mold produced by a patter drawing technique with an electron beam.

36. An objective lens for use in a recording reproducing optical system for conducting recording and/or reproducing information for at least two kinds of optical information recording mediums different in recording density, consisting of:

a plastic lens structured in one element in one group and including at least one aspherical surface and at least one diffractive surface on which a diffractive structure comprising a plurality of concentric ring-shaped zonal steps designed such that a diffraction order of a diffracted ray having the maximum diffraction efficiency among diffracted rays generated when a light flux having a longer wavelength among the at least two light fluxes comes to be incident is a lower order than that of a diffracted ray having the maximum diffraction efficiency among diffracted rays generated when a light flux having a shortest wavelength comes to be incident is formed, wherein the objective lens satisfies the following formula:

$$f2'' < f0'' < f1''$$

where f0" is a focal length (mm) of an entire system of the objective lens for the shortest wavelength of a light flux among the two kinds of light fluxes, f1" is a focal length (mm) of an entire system of the objective lens for a wavelength shorter by a predetermined wavelength difference than the shortest wavelength of a light flux, and f2" is a focal length (mm) of an entire system of the objective lens for a wavelength longer by a predetermined wavelength difference than the shortest wavelength of a light flux.

37. The objective lens of claim 36, wherein the shortest wavelength is 380 nm to 420 nm and the longer wavelength is 630 nm to 670 nm.

38. The objective lens of claim 36, wherein n1 is a diffraction order of a diffracted ray having the maximum diffraction efficiency among diffracted rays generated when a light flux having a wavelength of 380 nm to 420 nm comes to be incident and n2 is a diffraction order of a diffracted ray having the maximum diffraction efficiency among diffracted rays generated when a light flux having a wavelength of 630 nm to 670 nm comes to be incident, a combination of n1 and n2 is one of (n1, n2)=(2, 1), (3, 2), (4, 2), (5, 3), (6, 4), (7, 4), (8, 5), (9, 6), (10, 6).

39. The objective lens of claim 36, wherein the shortest wavelength is 380 nm to 420 nm and the longer wavelength is 630 nm to 670 nm and 760 nm to 800 nm.

40. The objective lens of claim 39, wherein n1 is a diffraction order of a diffracted ray having the maximum diffraction efficiency among diffracted rays generated when a light flux having a wavelength of 380 nm to 420 nm comes to be incident, n2 is a diffraction order of a diffracted ray having the maximum diffraction efficiency among diffracted rays generated when a light flux having a wavelength of 630 nm to 670 nm comes to be incident, and n3 is a diffraction order of a diffracted ray having the maximum diffraction efficiency among diffracted rays generated when a light flux having a wavelength of 760 nm to 800 nm comes to be incident, a combination of n1, n2 and n3 is one of (n1, n2, n3)=(2, 1, 1), (4, 3, 2), (6, 4, 3), (8, 5, 4), (10, 6, 5).

41. The objective lens of claim 36, wherein the objective lens has a predetermined optical information recording medium-side numerical aperture of 0.60 to 0.70 necessary for conducting recording and/or reproducing information for the optical information recording medium having a highest recoding density and converge diffracted rays of the light flux having the shortest wavelength through a protective layer having a thickness of 0.55 to 0.65 mm so as to form a good wavefront on an information recoding plane of an optical information recoding medium having a highest recording density.

42. The objective lens of claim 36, wherein the objective lens has a predetermined optical information recording medium-side numerical aperture of more than 0.80 necessary for conducting recording and/or reproducing information for the optical information recording medium having a highest recoding density and converge diffracted rays of the light flux having the shortest wavelength through a protective layer having a thickness of 0.07 to 0.13 mm so as to form a good wavefront on an information recoding plane of an optical information recoding medium having a highest recording density.

43. The objective lens of claim 36, wherein a lateral magnification of the single body of the objective lens satisfies the following formula:

$$0 < M < 0.25$$

44. The objective lens of claim 36, wherein the diffractive structure formed on the objective lens has a saw-shaped blaze structure produced by a patter drawing technique with an electron beam or molded by a mold produced by a patter drawing technique with an electron beam.

45. An aberration correcting optical element for use in a recording reproducing optical system for conducting recording and/or reproducing information for an optical information recording medium, wherein the recording reproducing optical system comprises a light source to emit a light flux having a wavelength of 500 nm or less and an objective lens being a plastic lens structured in one lens in one group having an optical information recording medium-side numerical aperture of 0.80 or more to converge the light flux from the light source onto an information recording plane of the optical information recording medium, the aberration correcting optical element comprising:

at least one plastic lens on which a diffractive structure structured by a plurality of concentric ring-shaped zonal steps is formed on at least one surface thereof, wherein the aberration correcting optical element satisfies the following formula:

PD2<0

PR2>0 where PD2 is a diffractive power (mm$^{-1}$) as a diffractive lens defined by the formula of PD2=$\Sigma(-2 \cdot b_{2j} \cdot nj)$ when an optical path difference $\phi_{bj}$ (mm) added to a wavefront having transmitted through a diffractive structure formed on an j-th surface of the aberration correcting optical element is expressed as a function of a height hi (mm) from the optical axis by an optical path difference function defined by $\phi_{bj}=nj \cdot (b_{2j} \cdot hj^2 + b_{4j} \cdot hj^4 + b_{6j} \cdot hj^6 + \ldots)$ (herein, nj is a diffraction order of a diffracted ray having the maximum diffraction efficiency among diffracted rays generated by the diffractive structure formed on the j-th surface, and $b_{2j}$, $b_{4j}$, $b_{6j}$, ... are optical path difference function coefficients of second order, fourth order, sixth order, ... respectively, and PR2 is a refractive power (mm$^{-1}$) as a refractive lens of the plastic lens of the aberration collecting optical element.

46. The aberration collecting optical element of claim 45, wherein the aberration correcting optical element is a coupling lens to change a divergence of the divergent light flux emitted from the light source and the coupling lens is a plastic lens on which a diffractive structure structured by a plurality of concentric ring-shaped zonal steps is formed on at least one surface thereof.

47. The aberration collecting optical element of claim 46, wherein the coupling lens has a light source-side numerical aperture of 0.15 to 0.50.

48. The aberration collecting optical element of claim 45, wherein the recording reproducing optical system comprises a coupling lens to change a divergence of the divergent light flux emitted from the light source and the aberration correcting optical element is provided on an optical path between the coupling lens and the objective lens and is comprised of a positive lens group and a negative lens group.

49. The aberration collecting optical element of claim 48, wherein each of the positive lens group and the negative lens group is a plastic lens and one of the positive lens group and the negative lens group is the plastic lens on which the diffractive structure structured by a plurality of concentric ring-shaped zonal steps is formed on at least one surface thereof.

50. The aberration collecting optical element of claim 48, wherein the positive lens group is a plastic lens on which the diffractive structure structured by a plurality of concentric ring-shaped zonal steps is formed on at least one surface thereof and the negative lens group is a glass lens having Abbe constant smaller that of the plastic lens of the positive lens group and wherein aberration collecting optical element satisfies the following formula:

$1.2 \leq |fP/fN| \leq 2.4$ where fP is a focal length (mm) of the positive lens group and fN is a focal length (mm) of the negative lens group.

51. The aberration collecting optical element of claim 48, wherein the recording reproducing optical system comprises a coupling lens to change a divergence of the divergent light flux emitted from the light source and the aberration correcting optical element is provided on an optical path between the coupling lens and the objective lens and is a plastic lens structured in one element in one group on which a diffractive structure structured by a plurality of concentric ring-shaped zonal steps is formed on at least one surface thereof.

52. The aberration collecting optical element of claim 45, wherein the diffractive structure is provided on at least two surfaces of the aberration collecting optical element.

53. The aberration collecting optical element of claim 45, wherein a diffraction efficiency of n-th order diffracted ray of a predetermined wavelength is larger than that of any other order diffracted rays generated by the diffractive structure formed on the aberration correcting optical element, wherein n is an integer except 0, 1 and −1.

54. The aberration collecting optical element of claim 45, wherein the diffractive structure formed on the aberration correcting optical element is formed on a surface viewed macroscopically in a convex shape.

55. An optical pickup apparatus, comprising:
   a light source;
   a converging optical system to converge a light flux emitted from the light source on an information recording plane of an optical information recording medium; and
   a photodetector to receive a light flux reflected from the information recording plane and to output an electric signal corresponding to an amount of the received light flux,
   wherein the converging optical system is the recording reproducing optical system of claim 1 for the optical information recording medium.

56. An audio and/or image recording apparatus and/or an audio and/or image reproducing apparatus, comprising:
   the optical pickup apparatus of claim 37.

* * * * *